US007874658B2

(12) United States Patent
Yoshino et al.

(10) Patent No.: US 7,874,658 B2
(45) Date of Patent: Jan. 25, 2011

(54) LIQUID INJECTION APPARATUS AND METHOD FOR DRIVING THE SAME

(75) Inventors: Keiichiro Yoshino, Nagano-ken (JP); Toshio Kumagai, Nagano-ken (JP); Takeo Seino, Nagano-ken (JP); Koji Morikoshi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 355 days.

(21) Appl. No.: 12/028,387

(22) Filed: Feb. 8, 2008

(65) Prior Publication Data

US 2008/0136863 A1 Jun. 12, 2008

Related U.S. Application Data

(60) Division of application No. 11/159,211, filed on Jun. 23, 2005, now Pat. No. 7,699,449, which is a continuation-in-part of application No. 10/871,611, filed on Jun. 21, 2004, now abandoned.

(30) Foreign Application Priority Data

| | | |
|---|---|---|
| Jun. 20, 2003 | (JP) | 2003-177049 |
| Jun. 20, 2003 | (JP) | 2003-177050 |
| Sep. 5, 2003 | (JP) | 2003-314609 |
| Mar. 31, 2004 | (JP) | 2004-105796 |
| Jun. 23, 2004 | (JP) | 2004-185519 |

(51) Int. Cl.

| | |
|---|---|
| ***B41J 2/175*** | (2006.01) |
| ***B41J 2/165*** | (2006.01) |
| ***B41J 2/05*** | (2006.01) |
| ***F16K 31/00*** | (2006.01) |

(52) U.S. Cl. ............................ 347/85; 347/29; 347/65; 251/61.1

(58) Field of Classification Search .................. 347/29, 347/65, 85; 251/61.1
See application file for complete search history.

(56) References Cited

U.S. PATENT DOCUMENTS

| | | | | |
|---|---|---|---|---|
| 4,161,947 | A * | 7/1979 | Copson | 128/205.12 |
| 4,558,326 | A | 12/1985 | Kimura et al. | |
| 5,650,811 | A | 7/1997 | Seccombe et al. | |
| 5,847,736 | A | 12/1998 | Kanbayashi et al. | |
| 6,170,939 | B1 | 1/2001 | Ujita et al. | |

(Continued)

FOREIGN PATENT DOCUMENTS

| | | |
|---|---|---|
| JP | 3-258554 A | 11/1991 |

(Continued)

*Primary Examiner*—Julian D Huffman
*Assistant Examiner*—Sarah Al-Hashimi
(74) *Attorney, Agent, or Firm*—Sughrue Mion, PLLC

(57) ABSTRACT

A liquid ejection apparatus comprises a liquid cartridge for storing a liquid, a liquid ejection head for ejecting the liquid toward a target, a liquid supply path for guiding the liquid to the liquid ejection head from the liquid cartridge, and a capping device for drawing the liquid from the liquid ejection head. The liquid supply path comprises a plurality of wall surfaces, and a part of the wall surface is formed of a flexible member that is flexed by the inside-and-outside pressure difference of the liquid supply path. A pressure pump for adjusting the pressure of a fluid within the liquid supply path in the upstream side of the flexible member is provided.

2 Claims, 36 Drawing Sheets

U.S. PATENT DOCUMENTS

| | | | |
|---|---|---|---|
| 6,302,531 | B1 | 10/2001 | Usui et al. |
| 6,315,402 | B1 | 11/2001 | Kawase |
| 6,375,315 | B1 | 4/2002 | Steinmetz et al. |
| 6,547,379 | B2 | 4/2003 | Chan et al. |
| 6,648,459 | B2 | 11/2003 | Usui et al. |
| 6,705,712 | B2 | 3/2004 | Usui et al. |
| 6,955,426 | B2 | 10/2005 | Kaga et al. |
| 6,986,568 | B2 | 1/2006 | Usui et al. |
| 7,156,507 | B2 | 1/2007 | Aruga et al. |
| 7,278,718 | B2 | 10/2007 | Aruga et al. |
| 2002/0036680 | A1 | 3/2002 | Hall et al. |
| 2002/0122101 | A1* | 9/2002 | Yabe ........................... 347/65 |
| 2003/0058313 | A1 | 3/2003 | Iida |
| 2003/0146958 | A1 | 8/2003 | Aruga et al. |
| 2007/0115333 | A1 | 5/2007 | Aruga et al. |

FOREIGN PATENT DOCUMENTS

| | | | |
|---|---|---|---|
| JP | 8-336981 | A | 12/1996 |
| JP | 09-011488 | | 1/1997 |
| JP | 10-146963 | | 6/1998 |
| JP | 10-315504 | | 12/1998 |
| JP | 2001018419 | | 1/2001 |
| JP | 2001-38925 | A | 2/2001 |
| JP | 2002172802 | | 6/2002 |
| WO | 03/041964 | A1 | 5/2003 |

* cited by examiner

352

| | | Deactivation Time | | | | |
|---|---|---|---|---|---|---|
| | | 1 hr | 2 hrs | 3 hrs | 4 hrs | 5 hrs or longer |
| Activation Time | 1 hr | Normal | Normal | Normal | Normal | Choke |
| | 2 hrs | Normal | Normal | Normal | Normal | Choke |
| | 3 hrs | Normal | Normal | Normal | Choke | Choke |
| | 4 hrs | Choke | Choke | Choke | Choke | Choke |
| | 5 hrs or longer | Choke | Choke | Choke | Choke | Choke |

351

353

LIQUID INJECTION APPARATUS AND METHOD FOR DRIVING THE SAME

CROSS-REFERENCES TO RELATED APPLICATIONS

This is a divisional of application Ser. No. 11/159,211 filed Jun. 23, 2005, which in turn is a continuation-in-part of prior copending patent application Ser. No. 10/871,611, filed Jun. 21, 2004. The entire disclosures of the prior applications, application Ser. Nos. 11/159,211 and 10/871,611 are considered part of the disclosure of the accompanying divisional application and are hereby incorporated by reference.

BACKGROUND OF THE INVENTION

The present invention relates to a liquid ejection apparatus and a driving method thereof.

Heretofore, in general, as a liquid ejection apparatus for ejecting a liquid from a nozzle toward a target, an ink jet recording apparatus has been widely used. This ink jet recording apparatus comprises a carriage and a recording head mounted on the carriage. While moving the carriage on the recording head, the apparatus ejects ink from the nozzle formed on the recording head and performs printing on a recording medium.

Such an ink jet recording apparatus, when not being operated, often suffers an increase in viscosity of the ink in the nozzle and solidification of the ink because of evaporation of the ink solvent, such as water vapor and the like from the nozzle of the recording head. As a result, there is the possibility of poor performance of the printing, such as dust deposition on the nozzle and poor ink ejection.

To solve these problems, an ink jet recording apparatus comprising capping means has been known. In more detail, the capping means comprises a cap capable of covering the nozzle surface of the recording head and a suction pump capable of depressurizing the inside of the cap. When not being operated, the nozzle surface of the recording head is covered by this cap with humidity in the space formed by the recording head and the cap being maintained, thereby preventing the ink from being solidified.

Moreover, the depressurization of the inside of the cap by the suction pump in a state of covering the nozzle surface of the recording head by the cap allows ink, dust and the like to be drawn from the nozzle. This protects the ink from increased viscosity, dust and the like in the vicinity of the nozzle, thereby making it possible to maintain the performance of the nozzle in an optimum state.

In the ink jet recording apparatus as described above, there are often cases where bubbles and impurities mixed in the ink are stagnated in the ink flow path from an ink cartridge to the recording head. Because of these bubbles and impurities, it is feared that the ink filling factor in the ink flow path is reduced, supply property of the ink to the recording head is reduced, bubbles and impurities flow out of the nozzle during printing, and printing quality is reduced.

Hence, to increase the ink filling factor in the ink flow path, an ink jet recording apparatus comprising a valve unit, which is a "choke valve", has been known (for example, see Japanese Laid-Open Patent Application Publication No. 2001-38925). To describe it in detail, this valve unit is provided in the ink flow path between an ink cartridge and the recording head, and is capable of opening and closing the ink flow path.

By putting the valve unit into a closed state, and covering the nozzle surface of the recording by the cap, and depressurizing the inside of the cap by suction means, a negative pressure accumulates within the ink flow path in a section downstream from the valve unit. After that, by putting the valve unit into an open state while the negative pressure is in an accumulated state, the flow speed of the ink in the ink flow path is increased instantaneously. Thus, "choke cleaning" is performed, which discharges from the nozzle the bubbles and impurities stagnated together with the ink flow speed sped up instantaneously. As a result, it is possible to increase the filling factor of the ink in the ink flow path.

More specifically, as shown in FIG. 51(*a*), the inkjet recording apparatus described in Japanese Laid-Open Patent Publication No. 2001-38925 includes a valve device 403 arranged between the recording head 401 and the ink cartridge 402. The recording head 401 is connected to a lower end portion of the valve device 403. A passage 401*a* defined in the recording head 401 thus communicates with a passage 403*a* defined in the valve device 403. An ink supply needle 404 is formed at an upper end portion of the valve device 403 and communicates with the passage 403*a*. An ink cartridge 402 is connected to the ink supply needle 404. Ink is supplied from the ink cartridge 402 to a passage 401*b* defined in the recording head 401 via the ink supply needle 404 and the passage 403*a*. The ink is then ejected from nozzles 401*b* of the recording head 401. Further, a columnar shaft 405 is rotatably passed through the valve device 403 in such a manner as to cross the passage 403*a* from a side surface of the valve device 403. The shaft 405 includes a communication hole 405*a* communicating with the passage 403*a*. As illustrated in FIG. 51(*b*), the shaft 405 disconnects the communication hole 405*a* from the passage 403*a* when being rotated. The supply of the ink to the recording head 401 is thus blocked.

When the above-described cleaning operation is performed, the shaft 405 is rotated for stopping the ink supply to the recording head 401. Further, the nozzles 401*b* are sealed by a capping member 406 and negative pressure is applied from a non-illustrated suction pump to the nozzles 401*b* through the capping member 406. When the negative pressure is accumulated on the nozzles 401*b*, the shaft 405 is rotated in such a manner as to resume the ink supply to the recording head 401, as shown in FIG. 51(*a*). As a result, the accumulated negative pressure causes the ink to be rapidly ejected from the nozzles 401*b* of the recording head 401. At this stage, the bubbles and impurities trapped in the passages 401*a*, 403*a* are ejected from the nozzles 401*b*, together with the ink.

Incidentally, the valve unit disclosed in the above publication is configured such that the switching of its valve opening and closing is usually performed by an actuator and the like. Consequently, it is necessary not only to perform the drive control for the cap and the absorption pump, but also to perform the drive control for the actuator of the valve unit, which is a cause of making the control complicated. Further, there is a need to consider arrangement of space for the actuator, and this can increase the size of the apparatus.

The present invention has been made in view of the above-described problems, and an objective of the invention is to provide a liquid ejection apparatus and a driving method thereof, which is capable of choke cleaning with simple control without increasing the size of the size of the apparatus.

SUMMARY OF THE INVENTION

To achieve the above-described objective, the present invention provides a liquid ejection apparatus comprising liquid reservoir means for storing liquid, a liquid ejection head for ejecting liquid toward a target, a liquid supply path for guiding liquid to the liquid ejection head from the liquid reservoir means, and suction means for drawing liquid from the liquid ejection head. In the liquid injection apparatus, the liquid supply path comprises a plurality of wall surfaces, and a flexible member that is flexed by the inside-and-outside pressure difference of the liquid supply path, which forms a part of the wall surface. Pressure adjusting means for adjusting the pressure of the fluid within the liquid supply path in the upstream side of the flexible member is provided.

According to the present invention, the pressure of the fluid within the liquid supply path in the upstream side of the flexible member is reduced by the pressure adjusting means, and liquid from a liquid ejection head is drawn by the suction means, so that the pressure within the liquid supply path is totally reduced. The pressure difference is generated inside and outside of the liquid supply path, and the flexible member is flexed in a direction to reduce a flow path cross-sectional area of the liquid supply path. Consequently, flow path resistance of the liquid supply path is increased, thereby reducing flow amount within the liquid supply path in the vicinity of the flexible member.

In this state, by allowing a suction operation by the suction means to continue, it is possible to accumulate the negative pressure within the liquid supply path in the section downstream of the portion where the flexible member is provided. Consequently, after accumulating negative pressure, by the pressure adjusting means, the pressure of liquid in the section upstream of the flexible member is increased, so that the negative pressure accumulated within the liquid supply path is eliminated instantly, thereby increasing the flow speed of liquid within the liquid supply path instantaneously. As a result, the choke cleaning for discharging the bubbles and impurities together with liquid stagnated within the liquid supply path is performed instantly.

According to the present invention, since such a choke cleaning is performed, no opening and closing valve, opened and closed by an actuator and the like are provided, and therefore, the size of the apparatus is not increased. Further, the choke cleaning is simply performed only by controlling the pressure adjusting means and the suction means.

According to another aspect of the present invention, a driving method for a liquid ejection apparatus is provided. The liquid ejection apparatus comprises liquid reservoir means for storing liquid, a liquid ejection head for ejecting liquid toward a target from a nozzle, a liquid supply path for guiding liquid to the liquid ejection head from the liquid reservoir means, and suction means for drawing liquid from the nozzle of the liquid ejection head, and the liquid supply path is formed by a flexible member in which a part of the wall surface constituting the liquid supply path is flexed by the pressure difference between the inside and the outside of the liquid supply path. The driving method of the liquid ejection apparatus has a pressure reducing step for reducing the pressure of the fluid within the liquid supply path in the upstream side of the flexible member by the pressure adjusting means, a drawing step for drawing liquid from the nozzle of the liquid ejection head by the suction means when the pressure of the fluid within the liquid supply path in the upstream side of the flexible member decreases below a predetermined value, and a pressure increasing step for increasing the pressure of the fluid within the liquid supply path in the upstream side of the flexible member by the pressure adjusting means subsequent to the drawing step.

According to this aspect, by advancing to the drawing step after the pressure reducing step, it is possible to totally reduce the pressure within the liquid supply path. By reducing the pressure within the liquid supply path, the flexible member is flexed in a direction to reduce the flow path cross-sectional area of the liquid supply path. Consequently, flow path resistance of the liquid supply path is increased, thereby reducing flow amount of liquid within the liquid supply path. By allowing this state to continue, it is possible to accumulate negative pressure within the liquid supply path in the section downstream of the portion where the flexible member is provided. As a result, volume of bubbles stagnated within the liquid supply path is increased, which is put into a state that is easy to be discharged to the outside through the liquid ejection head. Further, after this, by advancing to the pressure increasing step, it becomes possible to eliminate the accumulation of negative pressure within the liquid supply path and discharge bubbles stagnated within the liquid supply path from the nozzle instantly. As a result, choke cleaning is effectively performed.

According to still another aspect of the present invention, a liquid ejection apparatus is provided, which comprises liquid reservoir means for storing liquid, a liquid ejection head for ejecting liquid toward the target, and a liquid supply path for guiding liquid to the liquid ejection head from the liquid reservoir means. The liquid supply path comprises a bubble trap flow path comprising a bubble accumulator capable of trapping bubbles contained in liquid, and a bubble non-trap flow path in which a flow path cross-sectional surface is determined so as to be able to move bubbles against buoyancy of the bubbles, and the bubble trap flow path and the bubble non-trap flow path are mutually arranged in parallel. Further, distribution means for changing a distribution factor of flow amount of liquid, which flows through the bubble trap flow path and the bubble non-trap flow path, is provided.

According to this liquid ejection apparatus, when liquid is ejected from the liquid ejection head toward the target, by the distribution means, a greater amount of liquid flows to the bubble trap flow path than to the bubble non-trap flow path. As a result, a bubble contained in the liquid supplied to the liquid ejection head has a high probability of being trapped in the bubble trap flow path, and it is possible to prevent ejection performance from being reduced due to the discharging of the bubble together with liquid from the liquid ejection head.

Further, when the volume of the bubble trapped in the bubble trap flow path is increased, and there arises a limit on the trapping ability of the bubble in the bubble trap flow path, a greater amount of liquid flows to the bubble non-trap flow path than to the bubble trap flow path by the distribution means. By the flow of liquid from the bubble non-trap flow path to the liquid ejection head, the bubble trapped in the bubble trap flow path is guided to the bubble non-trap path. At this time, the bubble non-trap flow path is formed in such a manner as to become a flow path cross-sectional surface not easy to trap the bubble, and therefore, the bubble guided to the bubble non-trap flow path is moved to the liquid ejection head. As a result, elimination of the bubble stagnated in the bubble trap flow path is performed much accurately.

According to another aspect of the present invention, a driving method of the liquid ejection apparatus is provided, which comprises liquid reservoir means for storing liquid, a liquid ejection head for ejecting the liquid toward a target, a liquid supply path for guiding liquid to the liquid ejection head from the liquid reservoir means, a bubble trap flow path in which the liquid supply path traps the bubble contained in liquid, and a bubble non-trap flow path, which is connected in parallel to the bubble trap flow path and determines a flow path cross-sectional area so as to be able to move the bubble against buoyancy of the bubble. This method comprises a flow path changing step for changing a distribution factor of the flow amount of liquid so that the flow amount of the liquid flowing the bubble non-trap flow path is larger than that of the liquid flowing the bubble trap flow path, a flow amount reducing step for reducing the flow amount of the liquid flowing the liquid supply path in the section upstream of the bubble trap low path and the bubble non-trap flow path, a drawing step for drawing liquid from the liquid ejection head, and a flow increasing step for increasing the flow amount of the liquid flowing the liquid supply path subsequent to the drawing step.

According to this method, in a state where the flow amount of liquid flowing to the bubble non-trap flow path is high, the flow amount of liquid flowing into the liquid supply path is reduced, and at the same time, liquid is drawn from the liquid ejection head, thereby accumulating the negative pressure within the liquid supply path. As a result, the volume of the bubble stagnated in the liquid supply path is increased such that the bubble is in a state easy to be discharged outside through the liquid ejection head. After that, by advancing to the flow amount increasing step, the accumulation of the negative pressure within the liquid supply path is eliminated, and the bubble stagnated within the liquid supply path is discharged from the liquid ejection head instantly. As a result, the choke cleaning is performed, and the elimination of the bubble trapped in the bubble trap flow path is more accurately performed.

Another aspect of the present invention is a liquid ejection apparatus including liquid reservoir means for retaining a liquid, a liquid ejection head for ejecting the liquid retained in the liquid reservoir means, a valve arranged between the liquid reservoir means and the liquid ejection head, a capping member for sealing the liquid ejection head, and negative pressure generating means for applying negative pressure to the liquid ejection head through the capping member. The valve includes a valve housing having a recess defined in an upper surface of the valve housing, the recess including a bottom. The valve also includes a film for sealing the recess of the valve housing. A liquid reservoir chamber is defined by the recess and the film. The valve further includes a projection projecting from the bottom of the recess, the projection having an upper surface opposed to the film. The upper surface of the projection is located lower than the upper surface of the valve housing. The valve further includes a first passage extending through the bottom of the recess for introducing a liquid into the liquid reservoir chamber, and a second passage extending through the projection and having an opening at the upper surface of the projection. The second passage sends the liquid out from the liquid reservoir chamber. The second passage is selectively opened or closed with respect to the liquid reservoir chamber by separating the film from the upper surface of the projection or bringing the film into contact with the upper surface of the projection.

According to this configuration, the projection in which the second passage is defined is formed in the liquid reservoir chamber of the valve in a position lower than the film. Therefore, if bubbles are contained in the liquid supplied from the liquid reservoir means to the liquid ejection head, the bubbles are retained in an upper portion of the liquid reservoir chamber of the valve. The bubble is thus maintained in the liquid reservoir chamber and prevented from flowing to the liquid ejection head. As a result, the liquid ejection apparatus becomes free from printing problems caused by the bubbles, such as missing dots.

Further, by blocking the liquid supply by means of the valve and applying the negative pressure from the negative pressure generating means to the liquid ejection head, the negative pressure can be accumulated on the liquid ejection head. Thus by resuming the liquid supply in this state, the liquid is rapidly discharged from the liquid ejection head, together with the bubbles retained in the liquid reservoir chamber.

Another aspect of the present invention is a method for cleaning a liquid ejection head used for the above-described liquid ejection apparatus. The method includes a step of applying negative pressure to a nozzle surface of the liquid ejection head with the second passage held in a state closed by the film, and a step of opening the second passage by separating the film from the upper surface of the projection, thus discharging the liquid retained in the liquid reservoir chamber from the liquid ejecting head, together with a bubble trapped in the liquid reservoir chamber.

That is, by closing the second passage and applying the negative pressure to the nozzle surface of the liquid ejection head, the negative pressure can be accumulated on the liquid ejection head. In this state, by resuming the ink supply from the liquid reservoir chamber by opening the second passage, the liquid is rapidly discharged from the liquid ejection head. In this manner, ink with increased viscosity can be discharged from the nozzle surface of the liquid ejection head. Further, the bubbles retained in the liquid reservoir chamber by the projection having the second passage, which is located lower than the film, are also discharged from the liquid ejection head, together with the liquid. Accordingly, the bubbles retained in the liquid reservoir chamber are prevented from flowing to the liquid ejection head, thus avoiding problems such as missing dots of the liquid ejection head.

BRIEF DESCRIPTION OF THE DRAWINGS

FIG. 51(*b*) is a front view for explaining the valve device of FIG. 51(*a*).

DETAILED DESCRIPTION OF THE PREFERRED EMBODIMENTS

First Embodiment

A first embodiment according to the present invention will be described below according to FIGS. 1 to 11.

Figure 1:
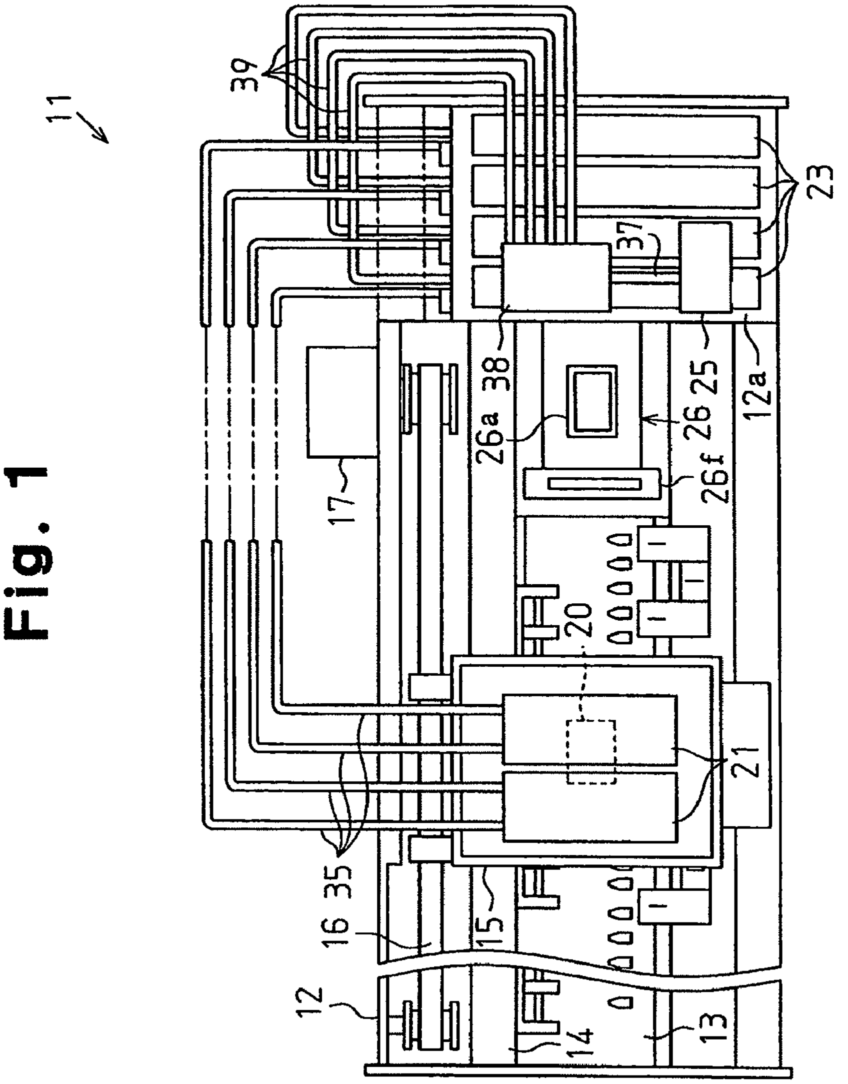
FIG. 1 is a top view of an ink ejection recording apparatus in a first embodiment.

As shown in FIG. 1, an ink jet recording apparatus 11 as a liquid ejection apparatus of the present embodiment comprises a main body case 12, a platen 13, a guide shaft 14, a carriage 15, a timing belt 16, a carriage motor 17, and a recording head 20 as a liquid ejection head. Further, the ink jet recording apparatus 11 comprises a valve unit 21 as a liquid supply valve unit, an ink cartridge 23 as liquid reservoir means and a liquid cartridge, a pressure pump 25, and a capping device 26 as suction means.

Figure 11:
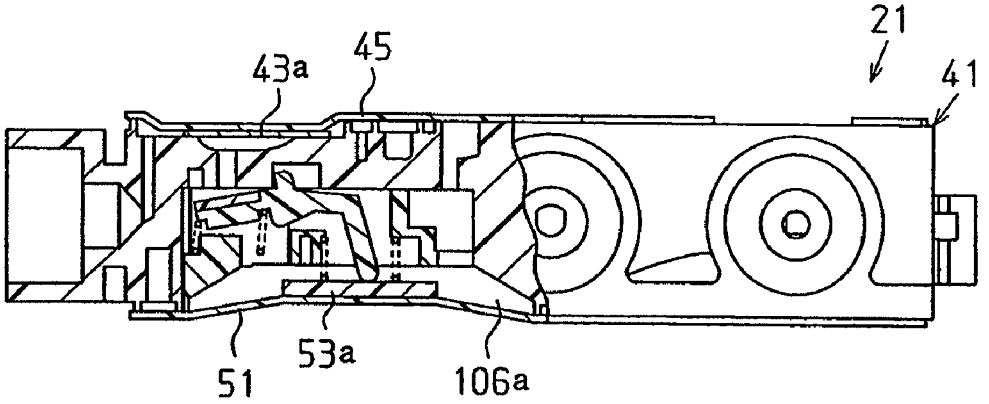
FIG. 11 is a partial cross-sectional view showing another operating state of the valve unit.

The main body case 12 is a substantially rectangular case, and a cartridge holder 12*a* is formed in the right side end portion shown in FIG. 11. In the present embodiment, the longitudinal direction of the main body case 12 is taken as the main scanning direction.

The platen 13 is provided along the main scanning direction within the main body case 12, and is a member for supporting a recording medium (not shown) as a target to be fed through paper feeding means (not shown). In the present embodiment, the recording medium is delivered in a direction orthogonal to the main scanning direction, that is, a secondary scanning direction.

The guide shaft 14 is formed in a bar shape, and is provided in parallel with the platen 13, that is, along the main scanning direction within the main body case 12. The carriage 15 is interposed relatively movable for the guide shaft 14 in a position opposing the platen 13, and reciprocates in the main scanning direction.

The carriage 15 is connected to the carriage motor 17 through the timing belt 16. The carriage motor 17 is supported by the main body case 12, and when the carriage motor 17 is driven, the carriage 15 is driven through the timing belt 16. As a result, the carriage 15 is reciprocated along the guide shaft 14.

The recording head 20 is provided on the surface opposing the platen 13 of the carriage 15, and comprises a plurality of unillustrated nozzles for ejecting an ink as a liquid toward the platen 13. The valve unit 21 is mounted on the carriage 15, and supplies temporarily stored ink for the recording head 20 in a pressure adjusted state. In the present embodiment, two valve units 21 are provided, and one of the valve units 21 is capable of adjusting the pressure of the ink of two colors. In the present embodiment, through the one valve unit 21 with respect to the ink of each color of black and yellow, and the other valve unit 21 with respect to the ink of each color of magenta and cyan adjust the pressures thereof and supply the ink to the recording head 20. Needless to mention, the colors may be changed to a combination of other colors.

Figure 2:
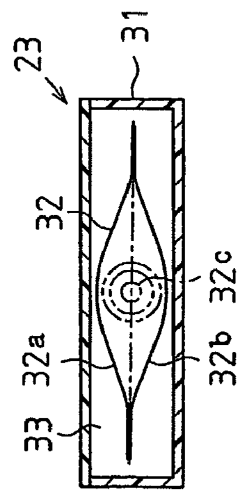
FIG. 2 is a cross-sectional view of an ink cartridge.

The ink cartridge 23 is detachably accommodated in the cartridge holder 12*a*, and four ink cartridges 23 are provided corresponding to the ink colors. In FIG. 2 one of the four cartridges 23 is shown, and the ink cartridge 23 comprises an ink case 31 as a pressure chamber and an ink pack 32 as a liquid accommodating portion. The ink case 31 is formed in a substantially rectangular shape. Further, the ink pack 32 is formed by superposing two sheets of film 32*a* and 32*b* as flexible portions, and the ink as a liquid is sealed inside thereof.

The ink pack 32 comprises an ink discharge port 32*c*, and is accommodated within the ink case 31. At this time, the ink discharge port 32*c* alone is in a state of being exposed from the ink case 31, and the other portion is accommodated within the ink case 31 so as to be in a sealed state. Consequently, a gap 33 is formed between the ink case 31 and the ink pack 32.

Further, the ink case 31 is provided with a communication port (not shown) communicating with the gap 33, and by allowing the air to flow through this communication port, pressure in the gap 33 is increased, thereby making it possible to generate a force such as that crushing the ink pack 32. The ink discharge port 32c of the ink pack 32, as shown in FIG. 1, is connected to the valve unit 21 through an ink supply tube 35 provided for each color. The ink supply tube 35 constitutes a liquid supply path. Consequently, by introducing air to the gap 33 within the ink case 31, the ink within the ink pack 32 is supplied to the valve unit 21 through the ink supply tube 35.

The pressure pump 25, in the present embodiment, is positioned on the ink cartridge 23, and is fixed to the main body case 12. The pressure pump 25 is capable of drawing air and discharging it as pressurized air. The pressurized air is supplied to a pressure detector 38 through a pressurization tube constituting an airflow path.

The pressure detector 38 detects the pressure of the air supplied from the pressure pump 25. In the present embodiment, based on the pressure detected in the pressure detector 38, the drive of the pressure pump 25 is adjusted. Consequently, the air supplied from the pressure pump 25 is adjusted to a pressure within a predetermined range by the pressure detector 38. The pressure detector 38 is connected to the communication hole of the ink cartridge 23 through four pieces of air supply tube constituting the airflow path, and the air adjusted to a pressure of predetermined range is introduced to the gap 33 of the ink cartridge 23.

Thus, the ink pack 32 of each ink cartridge 23 is pressurized by the pressurized air supplied from the pressure pump 25, and the ink within the ink pack 32 is supplied to the valve unit 21. The ink temporarily stored in the valve unit 21 is supplied to the recording head 20 in a pressure adjusted state.

At this time, while the recording medium is moved in the second scanning direction by the paper feeding means based on image data, the carriage 15 is moved to the main scanning direction, and the ink from the recording head 20 is ejected, so that printing on the recording medium becomes possible.

Figure 3:
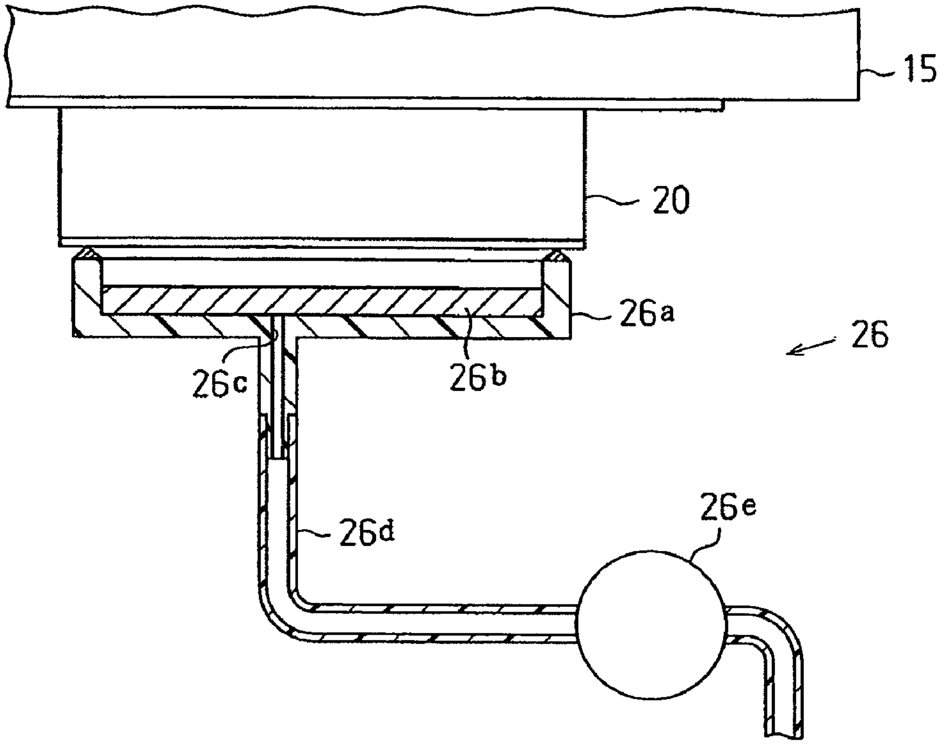
FIG. 3 is a partial cross-sectional view of an ink jet recording apparatus.

The capping device 26 is provided in a non-printing area (home position) in the moving path of the carriage 15. On the upper surface of the capping device 26, a cap 26a is arranged, which is formed by an elastic member such as elastomer capable of adhering to the nozzle surface of the recording head 20 and sealing thereof. As shown in FIG. 3, this cap 26a moves (lifts) to the recording head when the carriage 15 moves to the home position, and the cap 26a seals the nozzle surface of the recording head 20.

An absorber 26b containing the ink is provided in the inside of the cap 26a, and during idle periods of the ink jet recording apparatus 11, by sealing the nozzle surface of the recording head 20 with the cap 26a, the inside of the cap 26a is maintained in a high humidity state so as to prevent ink viscosity from increasing. As material for the absorber 26b, a sponge and the like are used, but no limit is imposed on this material as long as it absorbs the ink.

Further, a discharge port 26c for discharging the ink, bubbles, impurities and the like is provided on the underside of the cap 26a, and this discharge port 26c is connected to one end of an ink discharge tube 26d. The other end of the ink discharge tube 26d is connected to an unillustrated waste liquid tank.

A tube pump 26e is provided in the midst of the ink discharge tube 26d, and by the suction operation of the tube pump 26e, a negative pressure is formed within the cap 26a. Ink being increased in viscosity, dust, and bubbles produced by exchange of the cartridges in the recording head 20 are discharged into the waste liquid tank through the ink discharge tube 26d. This allows the "cleaning operation" to be performed.

In the meantime, as shown in FIG. 1, the capping device 26 is provided with a wiping member 26f formed in a rectangular shape from an elastic raw material such as rubber and the like in the vicinity of the printing area of the cap 26a. The wiping member 26f is constituted such that it advances into the moving path of the recording head 20 when the need arises, thereby wiping out and cleaning the nozzle surface.

Next, the valve unit 21 will be described in detail according to FIGS. 4 to 8.

As shown in FIGS. 4 to 8, the valve unit 21 comprises a flow path forming member 41, first and second filters 43a and 43b, a first film member 45 as a flexible member, and first and second fitting members 47a and 47b. Further, the valve unit 21 further comprises first and second valve members 49a and 49b as opening and closing valves, a second film member 51, first and second pressure receiving plates 53a and 53b.

Figure 4:
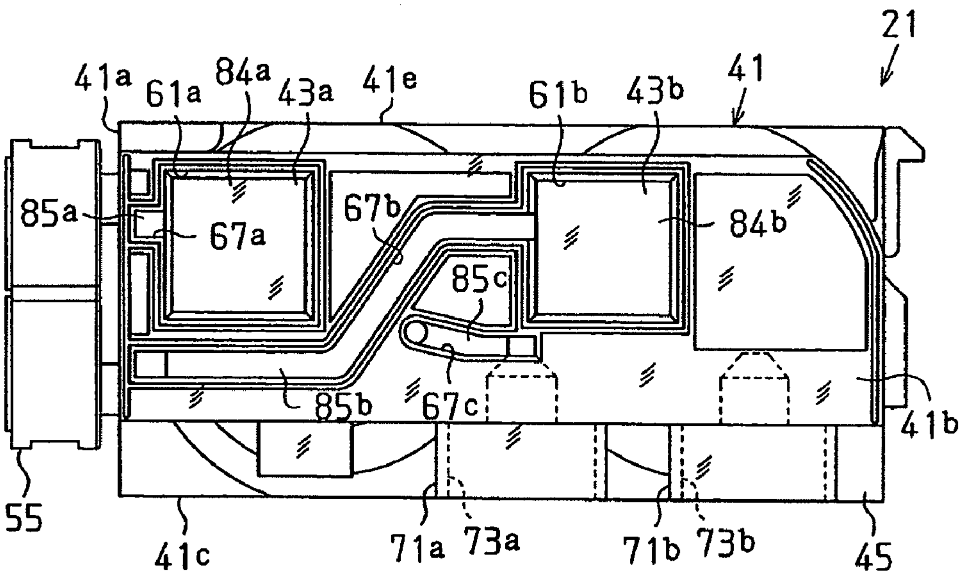
FIG. 4 is a view of one side of a valve unit.
Figure 6:
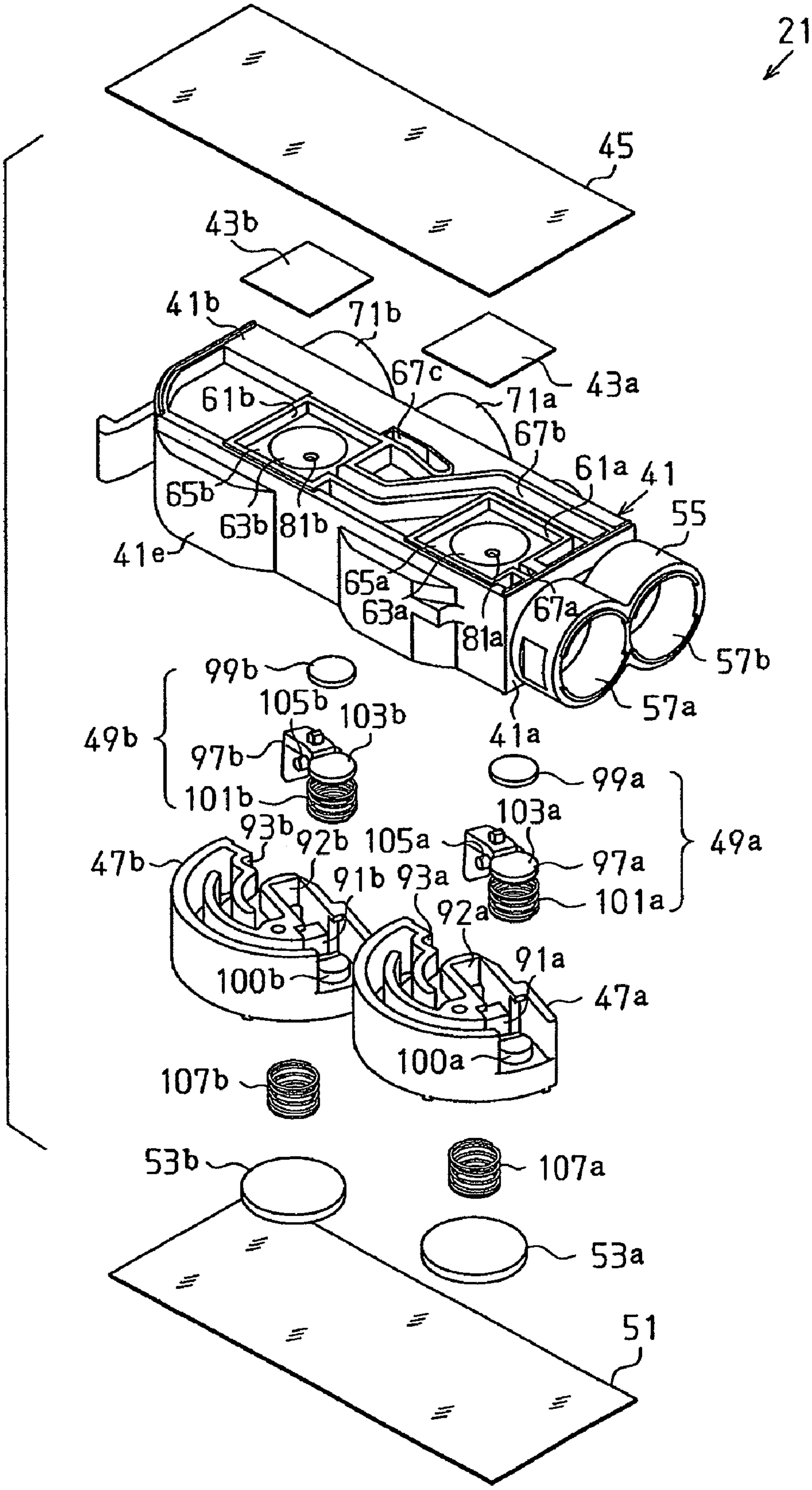
FIG. 6 is an exploded perspective view of the valve unit seen from one direction.
Figure 7:
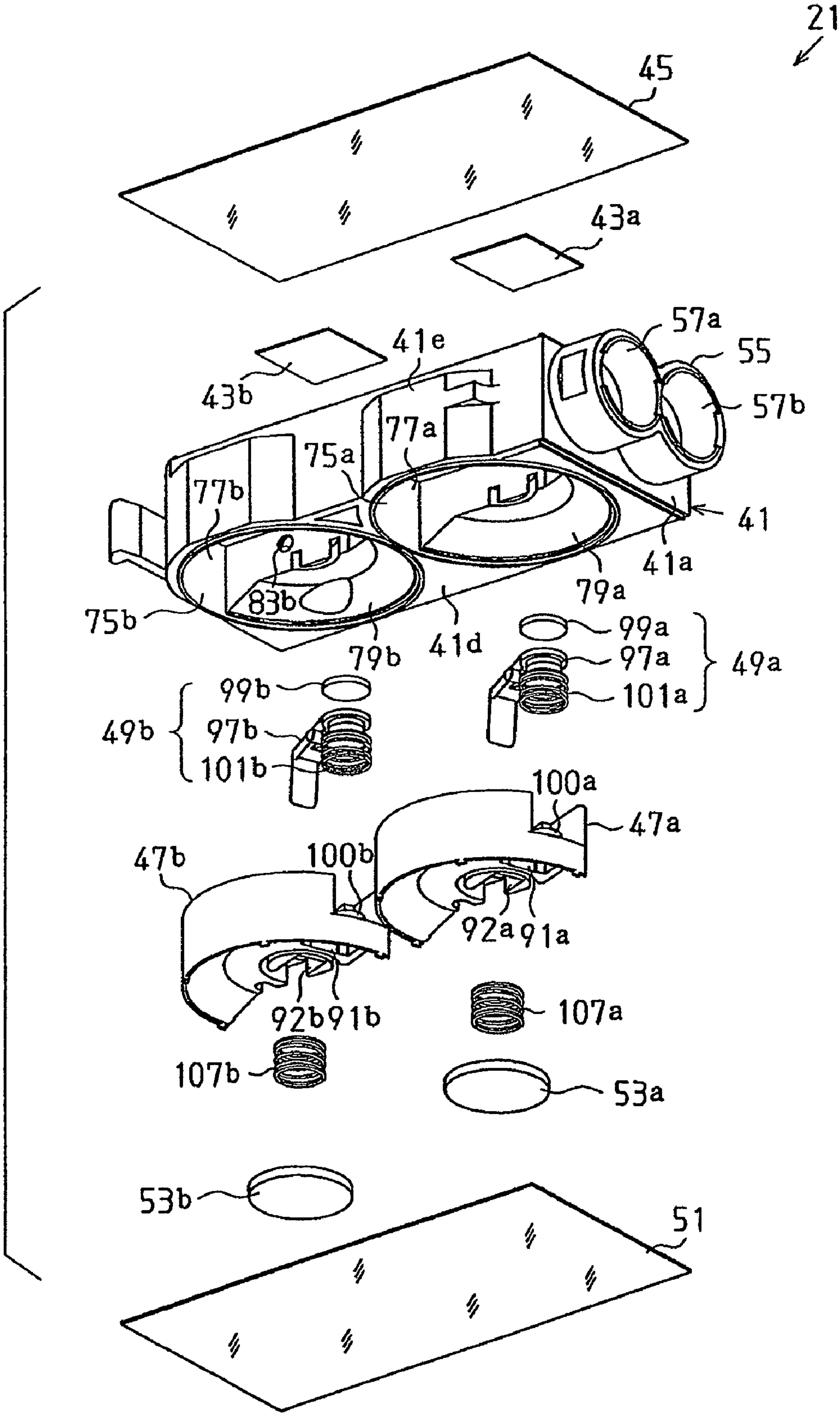
FIG. 7 is an exploded perspective view of the valve unit seen from another direction.

The flow path forming member 41 is formed in a substantially rectangular shape, and an ink introduction portion 55 is provided in its back surface 41a (the left side surface in FIG. 4). As shown in FIGS. 6 and 7, the ink introduction portion 55 has a shape as if having connected two cylinders, and comprises first and second ink introduction holes 57a and 57b. One piece each of the ink supply tube 35 (see FIG. 1) is connected to these first and second ink introduction holes 57a and 57b, so that ink of a total of two colors from the ink supply tube 35 is guided within the flow path forming member 41.

As shown in FIGS. 4 and 6, the flow path forming member 41 is provided with first and second square recess portions 61a and 61b as large cross-sectional area flow paths in its first side surface 41b. Further, as shown in FIG. 6, first and second spherical recess portions 63a and 63b as small cross-sectional flow paths, respectively are formed in the undersides of the first and second square recess portions 61a and 61b. These first and second spherical recess portions 63a and 63b are shaped into a spherical shape. Consequently, first and second step Surfaces 65a and 65b as substantially annular steps are formed between the first and second square recess portions 61a and 61b and the first and second spherical recess portions 63a and 63b.

Further, as shown in FIGS. 4 and 6, the flow path forming member 41 is provided with first to third grooves 67a to 67c in its first side surface 41b. The first groove 67a has one end connected with the first square recess portion 61a. Further, as shown in FIG. 8, the first groove 67a has its other end connected with the first ink introduction hole 57a through a communication hole 69 formed within the flow path forming member 41.

Further, as shown in FIGS. 4 and 6, the second groove 67b has one end connected with the second square recess portion 61b. Further, the second groove 67b, similarly to the first groove 67a, has its other end connected with the second ink introduction hole 57b through the communication hole (not shown) formed within the flow path forming member 41. The third groove 67c is provided in the vicinity of the second square recess portion 61b and the second groove 67b.

Figure 8:
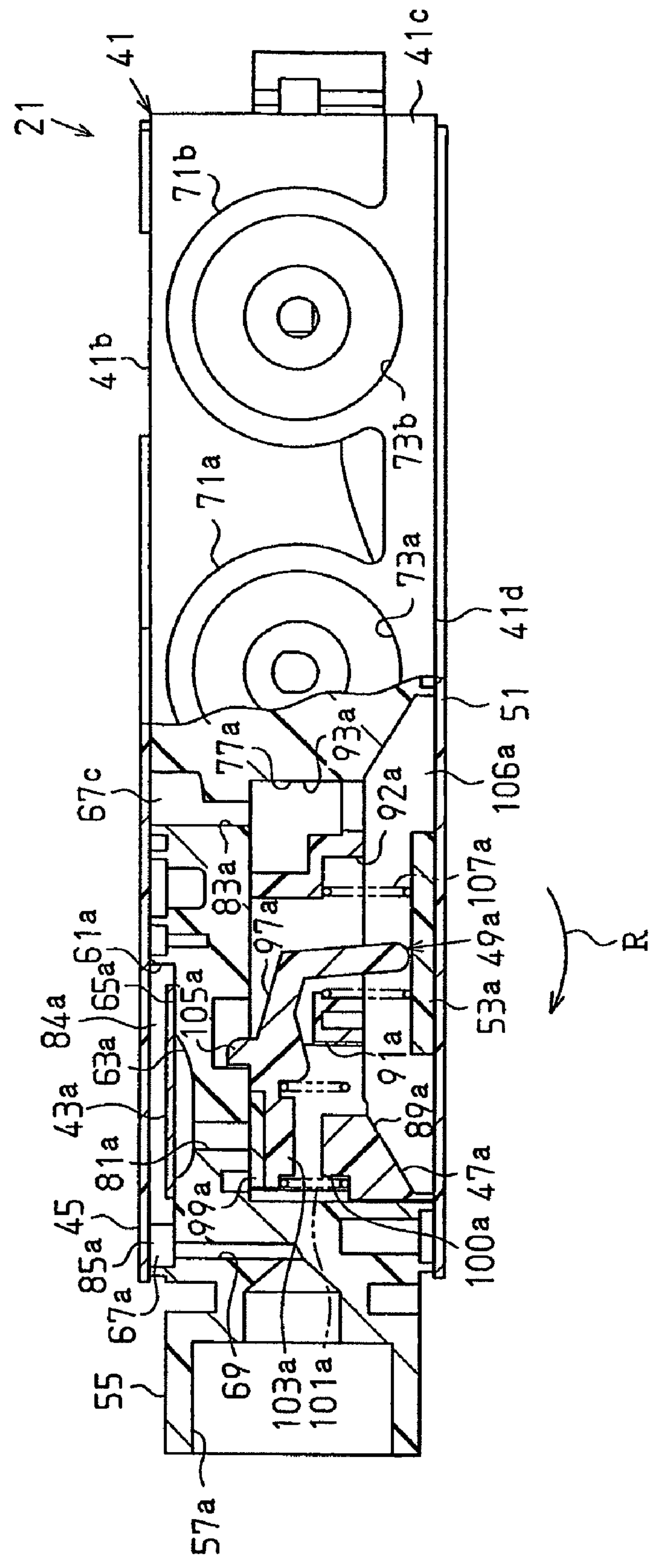
FIG. 8 is a cross-sectional view, with a part cut away, showing the valve unit.

As shown in FIGS. 4 and 8, the flow path forming member 41 comprises first and second ink discharge portions 71a and 71b in its under surface 41c. These first and second ink discharge portions 71a and 71b are formed in a cylindrical shape, respectively, and comprise first and second ink discharge holes 73a and 73b. The first ink discharge hole 73a communicates with the third groove 67c.

The first and second ink discharge holes 73a and 73b are connected to the nozzles provided in the recording head 20 (see FIG. 1) for each ink color. Consequently, the ink discharged from the first and second ink discharge holes 73a and 73b is guided to the recording head 20 for each color, and is ejected from the nozzle.

In the meantime, as shown in FIG. 7, the flow path forming member 41 is provided with first and second circular recess portions 75*a* and 75*b* in its second side surface 41*d*. The first and second circular recess portions 75*a* and 75*b* comprise the first and second engaging recess portions 77*a* and 77*b* and the first and second non-engaging recess portions 79*a* and 79*b*, respectively.

The first and second engaging recess portions 77*a* and 77*b* are formed in such a manner as to be semicircular in cross-section, and the undersides thereof are flat, respectively. In the meantime, the first and second non-engaging recess portions 79*a* and 79*b* are similarly formed in such a manner as to be semicircular in cross-section, but are formed shallower than the first and second engaging recess portions 77*a* and 77*b*. The first and second non-engaging recess portions 79*a* and 79*b* are formed in such a manner as to be substantially spherical on the undersides thereof.

As shown in FIG. 8, the first engaging recess portion 77*a* communicates with the first spherical recess portion 63*a* through the communication hole 81*a*. Further the second engaging recess portion 77*b* also communicates with the second spherical recess portion 63*b* through the communication hole 81*b* (see FIG. 6).

Further, the first engaging recess portion 77*a* communicates with the third groove 67*c* through the communication hole 83*c*. Consequently, the first engaging recess portion 77*a* communicates with the first ink discharge hole 73*a* (see FIG. 4) through the third groove 67*c*. Further, as shown in FIG. 7, the second engaging recess portion 77*b* is provided with the communication hole 83*b*, and this communication hole 83*b* communicates with the second ink discharge hole 73*b* (see FIG. 4).

As shown in FIGS. 4 and 6 to 8, the first and second filters 43*a* and 43*b* are formed in a substantially square slice shape. The first and second filters 43*a* and 43*b* are attached to the first and second step Surfaces 65*a* and 65*b* (see FIG. 6) in such a manner as to divide between the first and second square recess portions 61*a* and 61*b* and the first and second spherical recess portions 63*a* and 63*b*.

The first film member 45, in the present embodiment, is formed by a flexible member, which has a substantially rectangular shape and has a high gas barrier property, and is hot-welded to the first side surface 41*b* of the flow path forming member 41. At this time, with the openings of the first and second square recess portions 61*a* and 61*b* and the first to third grooves 67*a* to 67*c* sealed by the first film member 45, the first film member 45 is hot-welded to the flow path forming member 41.

In this way, as shown in FIGS. 4 and 8, the first film member 45, the first square recess portion 61*a* of the flow path forming member 41, and the first spherical recess portion 63*a* form a first ink introduction chamber 84*a*. Similarly, the first film member 45, the second square recess portion 61*b*, and the second spherical recess portion 63*b* form a second ink introduction chamber 84*b*.

This first film member 45 is allowed to bend by the pressure difference between the inside and the outside of the first and second ink introduction chambers 84*a* and 84*b*. That is, the first film member 45 is flexed in a direction to reduce the volume of the first and second ink introduction chambers 84*a* and 84*b* when the pressure inside the first and second ink introduction chambers 84*a* and 84*b* is reduced to lower than a predetermined pressure. As a result, the first film member 45 abuts against the first and second filters 43*a* and 43*b* within the first and second ink introduction chambers 84*a* and 84*b*, so that the flow of the ink passing through the first and second filers 43*a* and 43*b* is blocked. The first film member 45 if flexed by the pressure difference between the inside and the outside of the first and second ink introduction chambers 84*a* and 84*b* may be changed to a material other than the film member.

Further, as shown in FIG. 4, a first flow path 85*a* is formed by the first film member 45 and the first groove 67*a* of the flow path forming member 41, and a second flow path 85*b* by the first film member 45 and the second groove 67*b*, and a third flow path 85*c* by the first film member 45 and the third groove 67*c*.

Figure 5:
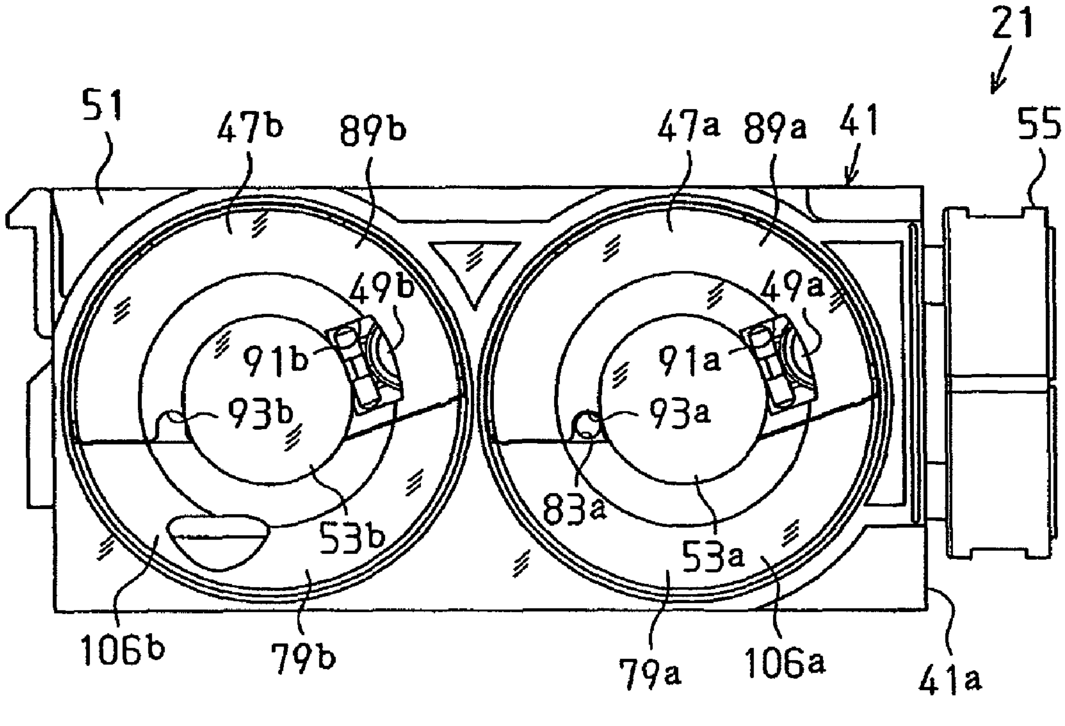
FIG. 5 is the other side view of the valve unit.

As shown in FIGS. 5 to 7, the first and second fitting members 47*a* and 47*b* are formed in a substantially semicircular shape, and are fitted in the first and second engaging recess portions 77*a* and 77*b* of the flow path forming member 41, respectively. As shown in FIGS. 5 and 8, first and second consecutive large spherical recess portions 89*a* and 89*b* are formed by the first and second fitting members 47*a* and 47*b* and the first and second non-engaging recess portions 79*a* and 79*b*.

Further, as shown in FIGS. 5 to 8, the first and second fitting members 47*a* and 47*b* are provided with the communication holes 81*a* and 81*b* formed in the flow path forming member 41, and first and second ink inflow holes 91*a* and 91*b* allowing the first and second large recess portions 89*a* and 89*b* to be connected, respectively. Further, the first and second fitting members 47*a* and 47*b* are provided with the first and second large recess portions 89*a* and 89*b* and the first and second ink flow holes 93*a* and 93*b* allowing the first and second large recess portions 89*a* and 89*b* and the communication holes 83*a* and 83*b* to be connected, respectively.

The first and second fitting members 47*a* and 47*b* are provided with first and second substantially cylindrical projecting portions 100*a* and 100*b* at a position opposing the communication holes 81*a* and 81*b*, respectively. Furthermore, the first and second fitting members 47*a* and 47*b* are provided with the first and second central holes 92*a* and 92*b* communicating with the first and second ink inflow holes 91*a* and 91*b* in respective central portions.

The valve unit 21 in the present embodiment is mounted on the carriage 15 (see FIG. 1) with the upper surface 41*e* shown in FIG. 4 positioned at the upper most portion of a vertical direction. The first and second ink inflow holes 91*a* and 91*b* and the first and second ink outflow holes 93*a* and 94*b* are provided in such a manner as to be connected with the central portions in a substantially vertical direction of the first and second large recess portions 89*a* and 89*b* relative to the first and second fitting members 47*a* and 47*b*, respectively.

As shown in FIGS. 6 to 8, the first and second valve members 49*a* and 49*b* comprise first and second valve member main bodies 97*a* and 97*b*, first and second adhering portions 99*a* and 99*b*, and first and second valve biasing springs 101*a* and 101*b*. The first and second valve member main bodies 97*a* and 97*b* are substantially L-shaped, and disc portions 103*a* and 103*b* are formed in the first ends thereof. Support shafts 105*a* and 105*b* are formed in the vicinity of the disc portions 103*a* and 103*b*.

As shown in FIG. 8, the first and second valve member main bodies 97*a* and 97*b* are rotatably supported for the first and second fitting members 47*a* and 47*b* through the support shafts 105*a* and 105*b*. At this time, the disc portions 103*a* and 103*b* of the first and second valve member main bodies 97*a* and 97*b* confront the communication holes 81*a* and 81*b*. Further, the second ends of the first and second valve member main bodies 97*a* and 97*b* penetrate the first and second central holes 92*a* and 92*b* of the first and second fitting members 47*a* and 47*b*.

As shown in FIGS. 6 to 8, the first and second adhering portions 99*a* and 99*b* are formed in a disc shape by the flexible member, and are fixed in such a manner as to be superposed on the surfaces at the side of the communication holes 81*a* and 81*b* of the disc portions 103*a* and 103*b* in the first and second valve member main bodies 97*a* and 97*b*.

The first and second valve biasing springs 101*a* and 101*b* have respective one ends thereof engagingly fixed from the outside on the first and second projecting portions 100*a* and 100*b* of the first and second fitting members 47*a* and 47*b*, and have the other ends thereof fixed on the disc portions 103*a* and 103*b* of the first and second valve member main bodies 97*a* and 97*b*. Consequently, the first and second valve member main bodies 97*a* and 97*b* are biased by the first and second valve biasing springs 101*a* and 101*b* in a direction of the arrow R shown in FIG. 8 with the support shafts 105*a* and 105*b* as rotational centers. The first and second valve member main bodies 97*a* and 97*b* when in a state of no force being applied from the outside are biased in the direction of the arrow mark R shown in FIG. 8, and the first and second adhering portions 99*a* and 99*b* abut against the communication holes 81*a* and 81*b*. Further, when a force is applied to the first and second valve member main bodies 97*a* and 97*b* in a direction opposite to the direction of the arrow R shown in FIG. 8, the first and second adhering portions 99*a* and 99*b* are isolated from the communication holes 81*a* and 81*b*. That is, when the force is not applied to the first and second valve member main bodies 97*a* and 97*b* or the force is applied in a direction opposite to the direction of the arrow R, a space between the communication holes 81*a* and 81*b* and the first and second ink inflow holes 91*a* and 91*b* is switched so as to be in a communication or a non-communication state.

As shown in FIGS. 5 to 8, the second film member 51 is formed almost in the same shape and by the same material as that of the first film member 45, and is hot-welded to the second side surface 41*d* of the flow path forming member 41. At this time, with the openings of the first and second large recess portions 89*a* and 89*b* sealed by the second film member 51, the first film member 45 is hot-welded to the flow path forming member 41. By so doing, as shown in FIGS. 5 and 8, the first and second pressure chambers 106*a* and 106*b* are formed by the second film member 51 and the first and second large recess portions 89*a* and 89*b*.

That is, as shown in FIGS. 4 to 8, in the valve unit 21, the ink flowed into the first ink introduction hole 57*a* flows into the first pressure chamber 106*a* through the communication hole 69, the first flow path 85*a*, the first ink introduction chamber 84*a*, the communication hole 81*a*, the first ink inflow hole 91*a*, and the first central hole 92*a*. Further, the ink flowed into the first pressure chamber 106*a* is supplied to the recording head 20 (see FIG. 1) through the first ink outflow hole 93*a*, the communication hole 83*a*, the third flow path 85*c*, and the first ink discharge hole 73*a*.

Similarly, the ink flowing into the second ink introduction hole 57*b* from the ink supply tube 35 flows into the second pressure chamber 106*b* through the communication hole, the second flow path 85*b*, the second ink introduction chamber 84*b*, the communication hole 81*b*, the second ink inflow hole 91*b*, and the second central hole 92*b*. The ink flowed into the second pressure chamber 106*b* is supplied to the recording head 20 through the second ink outflow hole 93*b*, the communication hole 83*b*, and the second ink discharge hole 73*b*. In the present embodiment, each flow path from these first and second ink introduction holes 57*a* and 57*b* to the recording head 20 constitute the liquid supply path.

The second film member 51 is allowed to bend by the pressure difference between the inside and the outside of the first and second pressure chambers 106*a* and 106*b*. That is, the second film member 51 is flexed in such a direction to reduce the volume of the first and second pressure chambers 106*a* and 106*b* when the pressure within the first and second pressure chambers 106*a* and 106*b* is reduced lower than the predetermined pressure.

The first and second pressure receiving plates 53*a* and 53*b* are formed in a disc shape, and as shown in FIGS. 5 and 8, are fixed to the second film member 51 so as to be positioned within the first and second pressure chambers 106*a* and 106*b*, respectively.

As shown in FIGS. 6 to 8, first and second pressure receiving springs 107*a* and 107*b* are located between the first and second pressure receiving plates 53*a* and 53*b* and the first and second large recess portions 89*a* and 89*b*. These first and second pressure receiving springs 107*a* and 107*b* bias the first and second pressure receiving plates 53*a* and 53*b* so as to be isolated from the first and second large recess portions 89*a* and 89*b*. Consequently, in a state of the external force being not applied, the first and second pressure receiving plates 53*a* and 53*b* are in a state of being isolated from the first and second large recess portions 89*a* and 89*b*.

The first and second pressure receiving plates 53*a* and 53*b* abut against the second ends of the first and second valve member main bodies 97*a* and 97*b*. When the first and second pressure receiving plates 53*a* and 53*b* move to approach the first and second large recess portions 89*a* and 89*b* against biasing forces of the first and second pressure receiving springs 107*a* and 107*b*, the first and second valve member main bodies 97*a* and 97*b* receive a force to rotate in a direction opposite to the direction of the arrow R shown in FIG. 8.

That is, when the pressure within the first and second pressure chambers 106*a* and 106*b* is reduced so that the second film member 51 is flexed, the first and second pressure receiving plates 53*a* and 53*b* move to approach the first and second large recess portions 89*a* and 89*b* against the biasing force of the first and second pressure receiving springs 107*a* and 107*b*. Then, the first and second valve member main bodies 97*a* and 97*b* rotate in the direction opposite to the direction of the arrow R shown in FIG. 8, and a communication state is established between the communication holes 81*a* and 81*b* and the first and second ink inflow holes 91*a* and 91*b*. Further, when the pressure within the first and second pressure chambers 106*a* and 106*b* is increased, the first and second pressure receiving plates 53*a* and 53*b* move so as to be isolated from the first and second large recess portions 89*a* and 89*b*, and a non-communication state is established between the communication holes 81*a* and 81*b* and the first and second ink inflow holes 91*a* and 91*b*.

Next, the electrical constitution for the ink jet recording apparatus 11 as constituted above will be described.

Figure 9:
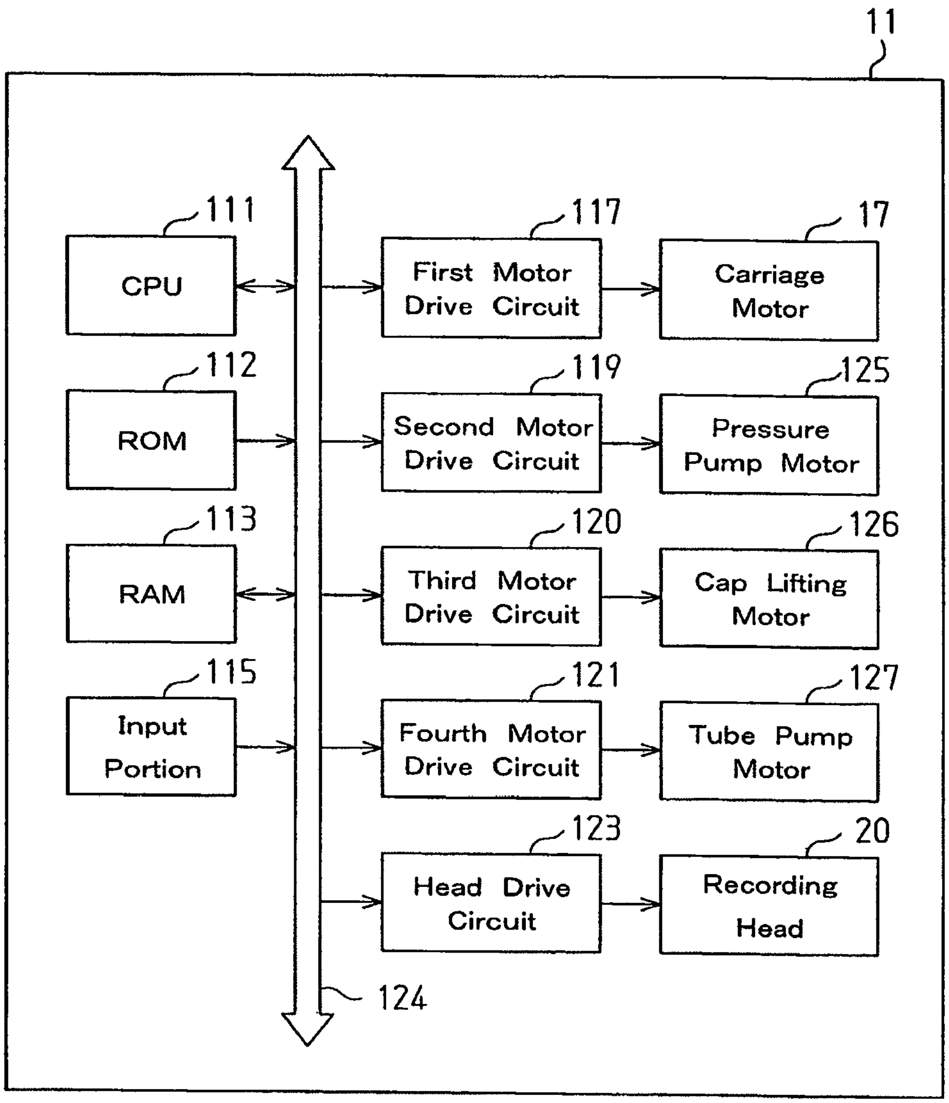
FIG. 9 is a block diagram showing an electrical arrangement for the ink jet recording apparatus.

As shown in FIG. 9, the ink jet recording apparatus 11 comprises a CPU 111, a ROM 112, and a RAM 113. Further, the ink jet recording apparatus 11 comprises an input portion 115, a first motor drive circuit 117, a second motor drive circuit 119, a third motor drive circuit 120, a fourth motor drive circuit 121, and a head drive circuit 123. These are mutually connected through a bus 124.

The CPU 111 receives an ON signal from the input portion 115. In the present embodiment, the input portion 115 is provided in the main body case 12 and the like of the ink jet recording apparatus 11, and is constituted such that the ON signal is inputted to the CPU 111 by the operation of a user. The CPU 111 is connected to the carriage motor 17 through the first motor drive circuit 117, and outputs a drive control signal for drive control to the carriage motor 17.

Further, the CPU 111 is connected to a pressure pump motor 125 through the second motor drive circuit 119, and outputs a drive control signal for driving the pressure pump motor 125. The pressure pump motor 125 is connected to the pressure pump 25 so as to be able to transmit power to the pressure pump 25. In the present embodiment, the pressure pump motor 125 is rotated in the normal direction so that pressurized air is delivered from the pressure pump 25. Further, the stopping of the drive of the pressure pump motor 125 stops the delivery of the pressurized air from the pressure pump 25.

Further, the CPU 111 is connected to a cap lifting motor 126 through the third motor drive circuit 120, and outputs a drive control signal for reciprocally rotating the cap lifting motor 126. The cap lifting motor 126 is connected to the cap 26*a* so as to be able to transmit the power. In the present embodiment, the cap lifting motor 126 is rotated in the normal direction so that the cap 26*a* is lifted. Further, the cap lifting motor 126 is rotated in the reverse direction so that the cap 26*a* is lowered.

Further, the CPU 111 is connected to a tube pump motor 127 through the fourth motor drive circuit 121, and outputs a drive control signal for reciprocally rotating the tube pump motor 127. The tube pump motor 127 is connected so as to be able to transmit the power to the tube pump 26*e*. In the present embodiment, the tube pump motor 127 is rotated in the normal direction so that negative pressure is formed within the cap 26*a* by the tube pump 26*e*. Further, by stopping the driving of the tube pump motor 127, the suction operation in the tube pump 26*e* is stopped.

Furthermore, the CPU 111 is connected to the recording head 20 through the head drive circuit 123, and outputs a nozzle drive signal to an unillustrated nozzle drive body for ejecting the ink from the nozzle provided in the recording head 20.

The CPU 111 operates according to various programs stored in the ROM 112, and temporarily stores an arithmetic processing result and the like in the RAM 113. To describe in more detail, the ROM 112 comprises a choke cleaning program and other programs.

A choke cleaning program is a program, which drives the carriage motor 17 through the first motor drive circuit 117 and moves the carriage 15 to a home position when the CPU 111 receives an ON signal from the input portion 115. Further, when the CPU 111 receives the ON signal from the input portion 115 based on the choke cleaning program, the pressure pump motor 125 is stopped through the second motor drive circuit 119 so as not to deliver the pressurized air from the pressure pump 25.

Further, when the carriage 15 moves to the home position based on the choke cleaning program, the CPU 111 drives the cap lifting motor 126 through the third motor drive circuit 120, and lifts the cap 26*a* so as to seal the nozzle surface of the recording head 20. Furthermore, when, based on the choke cleaning program, the cap 26*a* is lifted, the CPU 111 drives the tube pump motor 127 through the fourth motor drive circuit 121, and forms the negative pressure within the cap 26*a* by the suction operation of the tube pump 26*e*.

In addition, when, based on the choke cleaning program, a predetermined time elapses from the driving of the tube pump motor 127, the CPU 111 drives the pressure pump motor 125 through the second motor drive circuit 119, and starts the delivery of the pressurized air from the pressure pump 25.

That is, when the CPU 111 receives the ON signal from the input portion 115, first, according to a choke cleaning program, it outputs a drive signal to the carriage motor 17, and moves the carriage 15 to the home position. Further, the CPU 111 stops the pressure pump motor 125 based on the ON signal from the input portion 115, and stops the delivery of the pressurized air from the pressure pump 25.

Subsequently, the CPU 111 drives the cap lifting motor 126 according to the choke cleaning program, and lifts the cap 26*a* so as to seal the nozzle surface of the recording head 20. The CPU 111 drives the tube pump motor 127, and forms negative pressure within the cap 26*a* by the suction operation of the tube pump 26*c*.

Further, the CPU 111 measures the driving time of the tube pump motor 127 according to the choke cleaning program, and when a predetermined time elapses, it drives the pressure pump motor 125, and starts the delivery of the pressurized air from the pressure pump 25.

Next, the operation of the ink jet recording apparatus 11 constituted as described above will be described.

First, the operation of the ink jet recording apparatus 11 at the time of normal printing will be described. At the time of normal printing, the ink is in a state of filling from the ink pack 32 to the recording head 20 for each color. The pressure pump motor 125 is in a state of being driven through the second motor drive circuit 119 by the CPU 111, and the ink within the ink pack 32 is maintained in a pressurized state by the pressurized air introduced into the gap 33 of the ink cartridge 23. Consequently, during printing, the ink is in a state of being supplied in a pressurized state from the ink cartridge 23 to the valve unit 21.

The valve unit 21 is supplied with the ink introduced in a pressurized state from the ink pack 32 for each color. As shown in FIG. 8, for example, the ink supplied to the first ink introduction chamber 84*a* through the first ink introduction hole 57*a* is maintained in a state of having a high pressure. Consequently, the first film member 45 of the valve unit 21 is maintained in a state of not being flexed. As a result, the ink supplied within the first ink introduction hole 57*a* is in a state capable of passing through the first filter 43*a*.

In this state, when printing is started based on image data, ejection of ink is performed from the recording head 20, and according to the ejection amount of the ink, the ink within the first pressure chamber 106*a* of the valve unit 21 is supplied to the recording head 20 through the first ink discharge hole 73*a* and the like. As a result, the ink within the first pressure chamber 106*a* is reduced, and the pressure within the first pressure chamber 106*a* is reduced.

Figure 10:
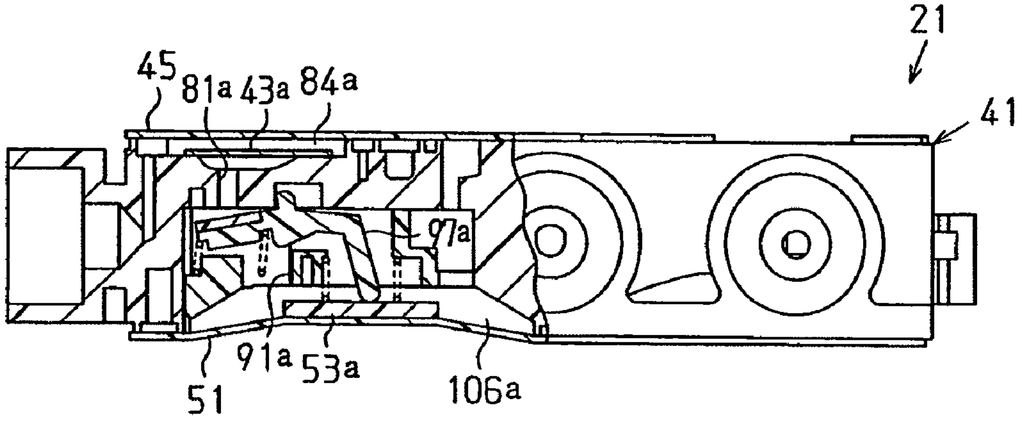
FIG. 10 is a partial cross-sectional view showing an operating state of the valve unit.

When the pressure of the ink within the first pressure chamber 106*a* is reduced lower than the predetermined pressure, as shown in FIG. 10, the second film member 51 is flexed in a direction to reduce the volume within the first pressure chamber 106*a*. As a result, the first valve member main body 97*a* is rotated by the first pressure receiving plate 53*a*, and a communication state is established between the communication hole 81*a* and the first ink inflow hole 91*a*. The ink stored in a pressurized state within the first ink introduction chamber 84*a* flows within the first pressure chamber 106*a*, and the ink is caused to fill the first pressure chamber 106*a*.

When the ink within the first ink introduction chamber 84*a* flows within the first pressure chamber 106*a*, the ink passes through the first filter 43*a*. At this time, since the first filter 43*a* has a structure difficult for the air to penetrate, the bubbles and impurities mixed in the ink are almost all in a trapped state within the first ink introduction chamber 84*a*.

Further, when the ink flows within the first pressure chamber 106*a*, the ink pressure within the first pressure chamber 106*a* is increased. As a result, the flexing of the second film member 51 is eliminated, and the first valve member main body 97*a* rotates toward the original position, and a non-communication state is established again between the communication hole 81*a* and the first ink inflow hole 91*a*.

That is, when the ink within the first pressure chamber 106*a* is reduced, and the inner pressure decreases to below the predetermined value, a communication state is established between the communication hole 81*a* and the first ink inflow hole 91*a*, and the ink is supplied to the first pressure chamber 106*a*. Further, the ink is supplied to the first pressure chamber 106*a*, so that the pressure of the ink within the first pressure chamber 106*a* is increased, and when it becomes equal to or more than the predetermined value, a non-communication state is established between the communication hole 81*a* and the first ink inflow hole 91*a*, and the supply of the ink to the first pressure chamber 106*a* is stopped.

As a result, during printing, the ink adjusted to have a pressure value within a predetermined range is in an accumulated state within the first pressure chamber 106*a*, and stability of the ink supply to the recording head 20 is secured.

With respect to the ink supplied to the second ink introduction chamber 84*b* through the second ink introduction hole 57*b*, similarly to the ink supplied to the first ink introduction chamber 84*a*, it is adjusted to fall within the predetermined range of the pressure in the second pressure chamber 106*b*, and is supplied to the recording head 20 in a stable state.

Next, the operation of the ink jet recording apparatus 11 at the choke cleaning will be described. In the present embodiment, the input portion 115 (see FIG. 9) is operated by the user, so that the choke cleaning is performed. When the input portion 115 is operated by the user, and an ON signal is inputted to the CPU 111, the CPU 111 first drives the carriage motor 17 so as to move the carriage 15 to the home position according to a choke cleaning program.

Further, the CPU 111 advances to a pressure reducing step, and stops the pressure pump motor 125 so as not to allow the pressurized air to be delivered from the pressure pump 25. As a result, the ink is supplied in a non-pressurized state from the ink cartridge 23 to the valve unit 21. Subsequently, the CPU 111 advances to a capping step, and drives the cap lifting motor 126 so as to lift the cap 26*a* and seal the nozzle surface of the recording head 20. When the CPU 111 lifts the cap 26*a*, it advances to a drawing step, and drives the tube pump motor 127, and forms negative pressure within the cap 26*a*.

As a result, the ink is drawn through the recording head 20, and the ink within the first and second pressure chambers 106*a* and 106*b* of the valve unit 21 begin to be reduced. In FIG. 11 an ink reduced state is shown in the first pressure chamber 106*a*, and with respect to the second pressure chamber 106*b*, since it is similar to the first pressure chamber 106*a*, the illustration thereof is omitted. As shown in FIG. 11, when the pressure within the first and second pressure chambers 106*a* and 106*b* decrease to below the predetermined pressure, similarly to the printing time, the second film member 51, the first and second valve member main bodies 97*a* and 97*b* and the like begin to operate, and a communication state is established between the communication holes 81*a* and 81*b* and the first and second ink inflow holes 91*a* and 91*b*.

As a result, the ink within the first and second ink introduction chambers 84*a* and 84*b* is allowed to flow into the first and second pressure chambers 106*a* and 106*b*. However, at this choke cleaning, as described above, the ink from the ink cartridge 23 is supplied in a non-pressurized state within the first and second ink introduction chambers 84*a* and 84*b*. Consequently, the pressure within the first and second ink introduction chambers 84*a* and 84*b* begin to be reduced as a communication state is established between the communication holes 81*a* and 81*b* and the first and second ink inflow holes 91*a* and 91*b*.

When the pressure within the first and second ink introduction chambers 84*a* and 84*b* is reduced lower than the predetermined pressure, the first film member 45 is flexed, and the first film member 45 abuts against the first and the second filters 43*a* and 43*b*. As a result, the ink flow passing through the first and second filters 43*a* and 43*b* is blocked.

In this state, by allowing the suction operation to be still continued by the tube pump 26*e*, with the first and second ink introduction chambers 84*a* and 84*b* as a boundary, the negative pressure is accumulated in the downstream side thereof. The CPU 111 measures the driving time of the tube pump motor 127 according to the choke cleaning program, and when the predetermined time elapses, it advances to a pressure increasing step, and starts the driving of the pressure pump motor 125. The CPU 111 completes the processing of the choke cleaning program when the driving of the pressure pump motor 125 is started.

As a result, the delivery of the pressurized air from the pressure pump 25 is started, and the ink is supplied in a pressurized state from the ink cartridge 23 to the valve unit 21. Then, the ink is supplied to the first and second ink introduction chambers 84*a* and 84*b* in the valve unit 21, and the bending of the first film member 45 is eliminated. In this way, the first film member 45 is isolated from the first and second filters 43*a* and 43*b*, and the flow of the ink passing through the first and second filters 43*a* and 43*b* is allowed.

The ink flows instantly from the upstream side to eliminate the negative pressure accumulated in the section downstream of the first and second ink introduction chambers 84*a* and 84*b*, and the ink flow speeds up instantaneously and begins to flow. As a result, the bubbles and impurities stagnated in the section downstream of the first and second ink introduction chambers 84*a* and 84*b* are discharged instantly together with the ink from the nozzle of the recording head 20. As a result, the filling factor for the ink in the ink jet recording apparatus 11 is enhanced.

According to the first embodiment, the following effect is obtained.

(1) In the first embodiment, the ink jet recording apparatus 11 comprises the pressure pump 25 and the like, and becomes an apparatus of an air pressurized system for pressure-transferring the ink toward the recording head 20 by introducing the pressurized air into the ink cartridge 23 from the pressure pump 25. The first and second ink introduction chambers 84*a* and 84*b* formed in the valve unit 21 are provided in the ink flow path between the ink cartridge 23 and the recording head 20. The first and second ink introduction chambers 84*a* and 84*b* have a part of wall surfaces thereof formed by the first film member 45 which is flexed by the difference between the pressure of the ink of the inside thereof and the atmospheric pressure.

Consequently, according to the present embodiment, in a state of the nozzle of the recording head 20 being covered by the cap 26*a*, the driving of the pressure pump 25 is stopped, so that the pressure of the fluid within the ink supply tube 35 is reduced. In the present embodiment and each of the embodiments to be described later, various types of fluid such as an ink, an ink solvent, a water vapor, and the air are included as the fluid. In this state, by performing the suction operation of the tube pump 26*c*, the pressure of the fluid within the valve unit 21 and the ink supply tube 35 is totally reduced. In this way, the pressure within the first and second ink introduction chambers 84*a* and 84*b* is reduced lower than the predetermined pressure, and the first film member 45 is flexed inside.

As a result, the first film member 45 abuts against the first and second filters 43*a* and 43*b*, and the ink flow passing through the first and second filters 43*a* and 43*b* is blocked. In this state, by allowing the suction operation to be continued by the tube pump 26*e*, the negative pressure is accumulated in the section downstream of the abutting portion between the first film member 45 and the first and second filters 43*a* and 43*b*. Further, in a state of negative pressure being accumulated, the driving of the pressure pump 25 is started, so that the flexing of the first film member 45 is restored, and the accumulated negative pressure is eliminated instantly. As a result, the bubbles and impurities stagnated in the section downstream of the first and second ink introduction chambers 84*a* and 84*b* is discharged together with the ink instantly from the nozzle of the recording head 20, and the choke cleaning is performed. As a result, the filling factor of the ink in the ink jet recording apparatus 11 is enhanced.

In the present embodiment, it is not the driving of the choke valve to open and close by an actuator, but the driving of the pressure pump 25 usually provided for a pressure supply system apparatus that performs the choke cleaning. Consequently, the choke cleaning is performed by a simple control without increasing the size of the apparatus by a new choke valve and the like.

(2) In the first embodiment, the first and second ink introduction chambers 84*a* and 84*b* comprise the first and second square recess portions 61*a* and 61*b* and the first and second spherical recess portions 63*a* and 63*b*. The first and second step Surfaces 65*a* and 65*b* are formed between these first and second square recess portions 61*a* and 61*b* and first and second spherical recess portions 63*a* and 63*b*. Further, the first film member 45 is provided so as to confront these first and second step Surfaces 65*a* and 65*b*.

Consequently, when the pressure within the first and second ink introduction chambers 84*a* and 84*b* is lowered, and the first film member 45 is flexed, the first film member 45 moves in a direction to abut against the first and second step Surfaces 65*a* and 65*b*. As a result, responsibility for increase and decrease of a flow path resistance for the increase and decrease of the pressure within the first and second ink introduction chambers 84*a* and 84*b* is made more reliably, thereby performing the choke cleaning more reliably.

(3) In the first embodiment, the first and second step Surfaces 65*a* and 65*b* are positioned in the section downstream of the first film member 45. Consequently, when the choke cleaning is performed, a drawing force toward the downstream side is applied to the first film member 45, but at this time, the first film member 45 more reliably approaches the first and second step Surfaces 65*a* and 65*b*. As a result, compared to the case where the first film member 45 is positioned at the upstream side of the first and second step Surfaces 65*a* and 65*b*, the first film member 45 is allowed to approach the first and second step Surfaces 65*a* and 65*b* more reliably. As a result, the choke cleaning is more reliably performed.

(4) In the first embodiment, the first and second ink introduction chambers 84*a* and 84*b* are provided integrally with the valve unit 21 comprising the first and second pressure chambers 106*a* and 106*b* and the first and second valve members 49*a* and 49*b*. Consequently, one valve unit 21 is allowed to have both the function to secure the stability of the ink supply to the recording head 20 during printing and the function to reliably perform the choke cleaning. As a result, the structure of the ink jet recording apparatus 11 is simplified.

(5) In the first embodiment, the first and second step Surfaces 65*a* and 65*b* of the first and second ink introduction chambers 84*a* and 84*b* are provided with the first and second filters 43*a* and 43*b*. These first and second filters 43*a* and 43*b* are provided so as to confront the first film member 45.

Consequently, the bubbles and impurities contained in the ink supplied from the ink cartridge 23 to the recording head 20 are trapped in the first and second filters 43*a* and 43*b*. As a result, when the ink is ejected toward the recording medium from the recording head 20, the bubbles and impurities ejected from the nozzle are reduced, and printing of high quality is performed.

When the choke cleaning is performed, since the first film member 45 bends in a direction to abut against the first and second filters 43*a* and 43*b*, the bubbles and impurities trapped in the first and second filters 43*a* and 43*b* are pressed, and are allowed to pass through the first and second filters 43*a* and 43*b*. Consequently, at the choke cleaning, the bubbles and impurities trapped are discharged more reliably, and the filling factor for the ink between the ink cartridge 23 and the recording head 20 is more effectively enhanced.

Second Embodiment

Figure 12:
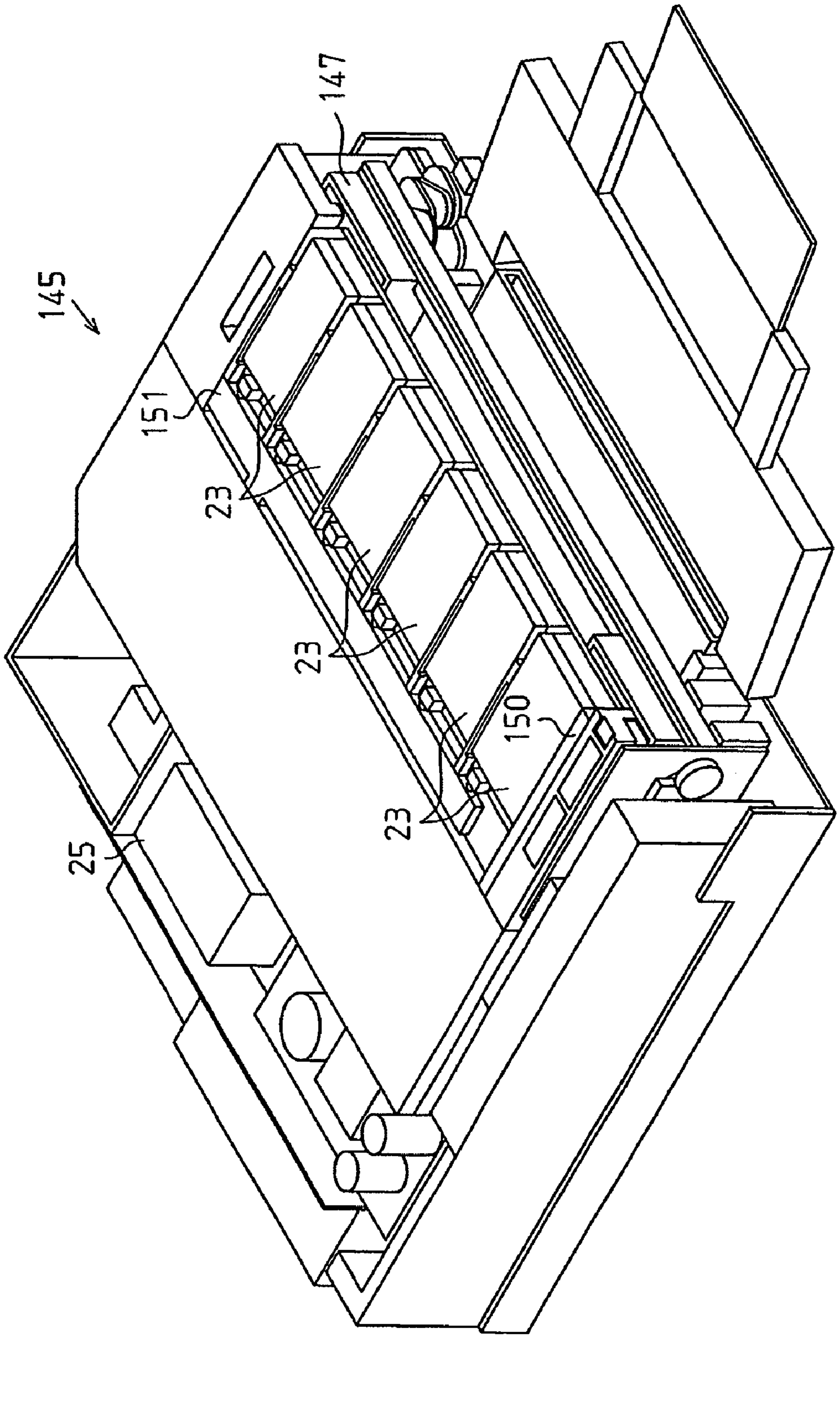
FIG. 12 is a perspective view of an ink jet recording apparatus according to a second embodiment.

Next, a second embodiment according to the present invention will be described according to FIGS. 12 to 18. Since the second embodiment is a constitution in which the valve unit alone of the first embodiment is changed, the detailed description of the components that are the same as those in the first embodiment will be omitted. FIG. 12 is a perspective view of an ink jet recording apparatus 145 as a liquid ejection apparatus, and FIG. 13 is an essential part perspective view of the ink jet recording apparatus 145.

Figure 13:
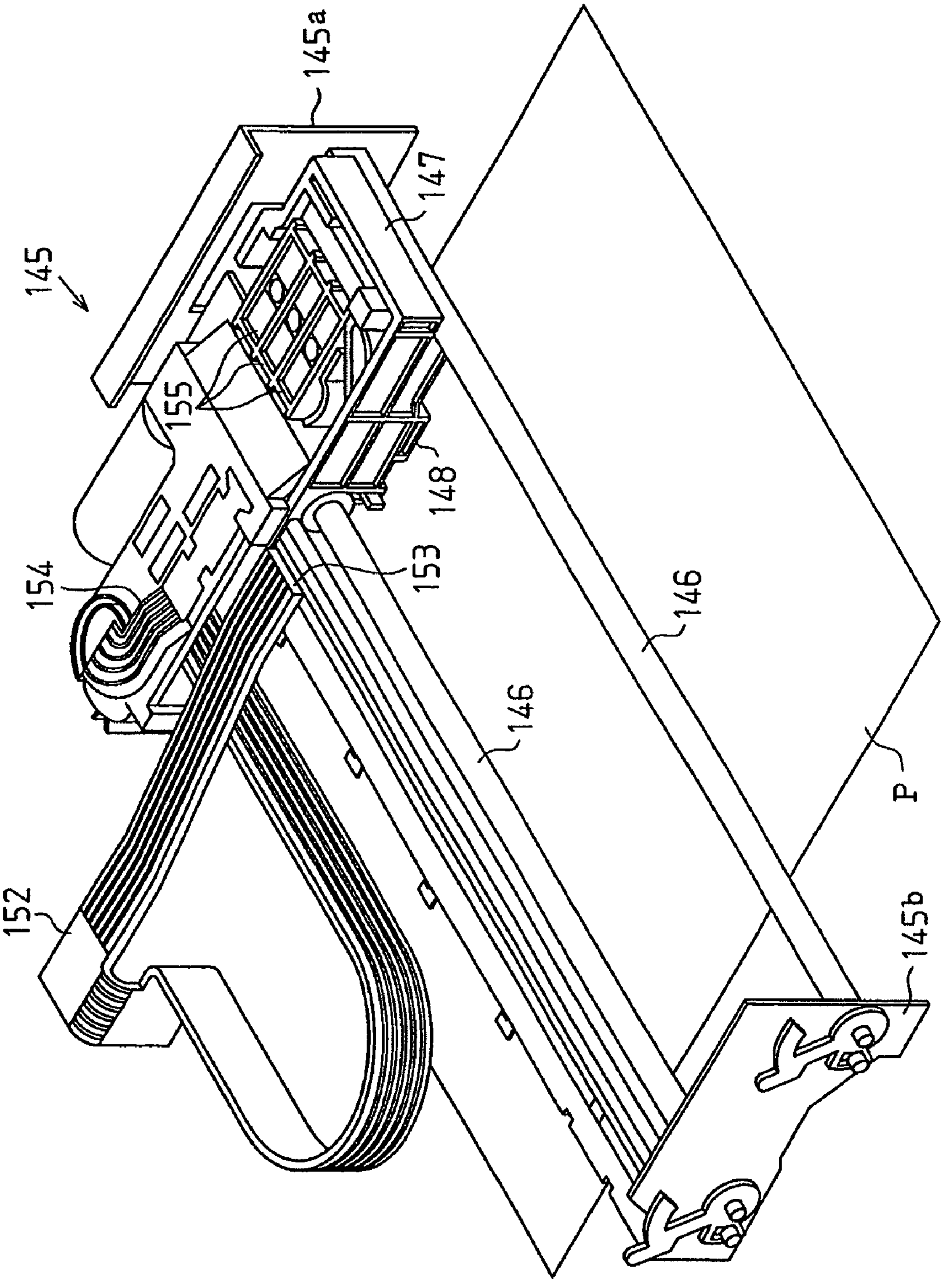
FIG. 13 is a partial perspective view of the ink jet recording apparatus.

As shown in FIG. 13, the ink jet recording apparatus 145 is provided with mutually opposing frame plates 145*a* and 145*b* at both sides thereof, and a guide shaft 146 is installed between the frame plates 145*a* and 145*b*. A carriage 147 is interposed relatively movable for a guide shaft 146, and is reciprocally movable in a main scanning direction by a carriage motor 17 (see FIG. 9). A recording medium P as a target is conveyed below a guide shaft 146 by an unillustrated paper feeding means, and is delivered in a secondary scanning direction. Further, the carriage 147 is provided with a recording head 148 as a liquid ejection head, and three pieces of valve unit 155. In the present embodiment, the recording head 148 is formed with a plurality of nozzle ejection orifices for ejecting six types of ink, respectively.

An ink cartridge 23 as liquid reservoir means and a liquid cartridge in which the ink supplied to the recording head 148 is accumulated, as shown in FIG. 12, are mounted by being lined up in a row above the carriage 147. At this time, each ink cartridge 23 is detachably accommodated into a holder 150 installed in the ink jet recording apparatus 145, respectively. The air delivered from a pressure pump 25 (see FIG. 1) constituting the pressure adjusting means is introduced to the communication hole (not shown) formed in an ink case 31 through a flow concentration path 151 which constitutes a liquid supply path mounted on the holder 150. The air introduced through the communication hole flows into a gap 33 (see FIG. 2) within the ink case 31.

The ink led out by crushing an ink pack 32 by air flow into the gap 33 flows into the flow concentration path 151 through an ink discharge port 32*c* (see FIG. 2) as a liquid lead out port. In this flow concentration path 151, to be described later, there are formed an air flow path and a plurality of ink flow paths, and the air flow path has one end connected to the pressure pump 25 and the other end connected to the gap 33 of each ink cartridge 23. Further, each ink flow path has one end connected to each cartridge 23, and at the same time, it has the other end connected to an ink supply tube 152, which constitutes the liquid supply path.

As shown in FIG. 13, the ink supply tube 152 comprises a flexible member, and at the same time, it is formed in a band shape, and comprises the same number of ink flow paths as that of the ink cartridge 23. The ink supply tube 152 is pulled around within the ink jet recording apparatus 145, and has an upstream side end portion 153 thereof connected to the flow concentration path 151, and has a downstream side 154 thereof connected to the carriage 147. A downstream side end portion 154 communicates with each valve unit 155 mounted on the carriage 147. The ink delivered from the ink cartridge 23 to a valve unit 155 through the flow concentration path 151 and the ink supply tube 152 is led out to the recording head 148 from the valve unit 155.

(Flow Concentration Path)

Figure 14:
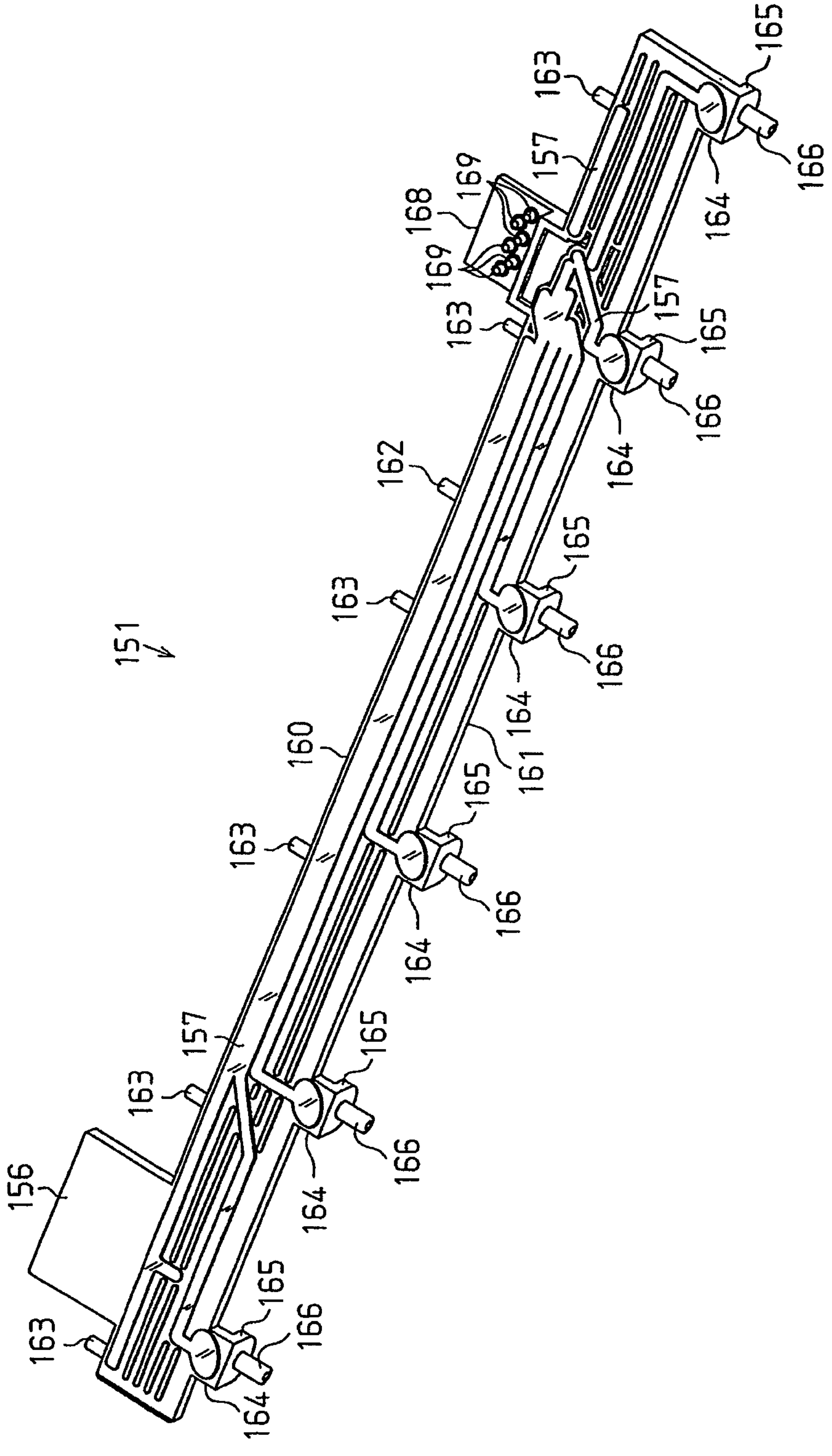
FIG. 14 is a perspective view of a flow concentration path.
Figure 15:
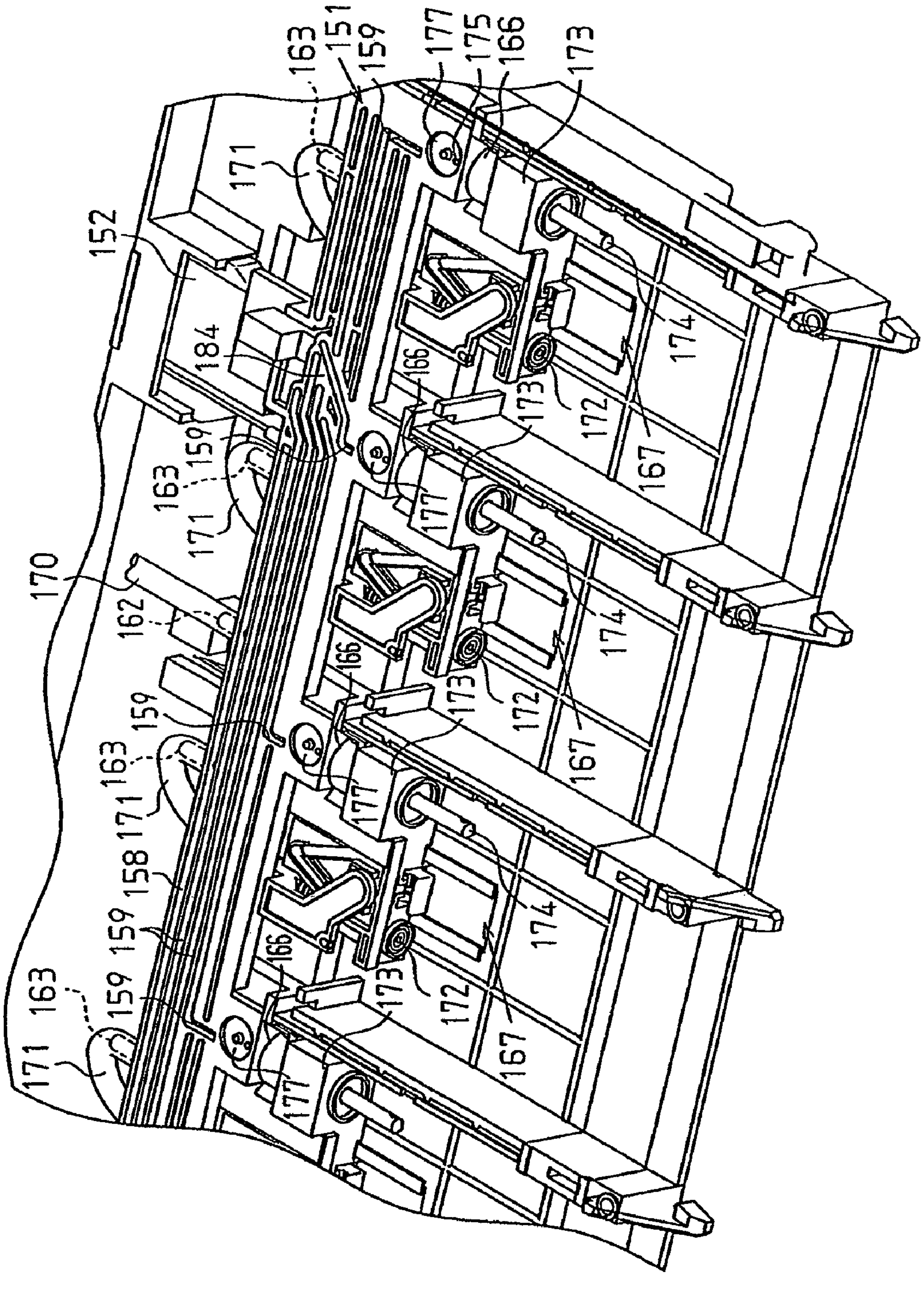
FIG. 15 is a perspective view showing a mounted state of the flow concentration path.
Figure 16:
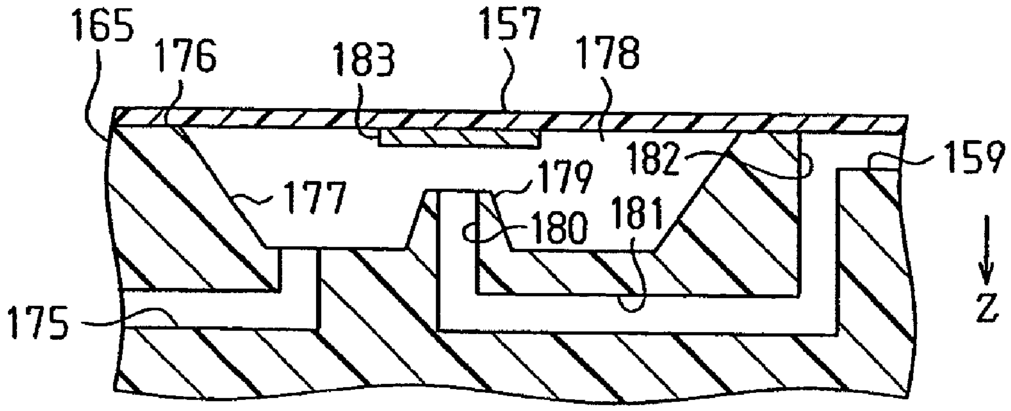
FIG. 16 is a partial cross-sectional view showing the operating state of an ink introduction chamber.
Figure 17:
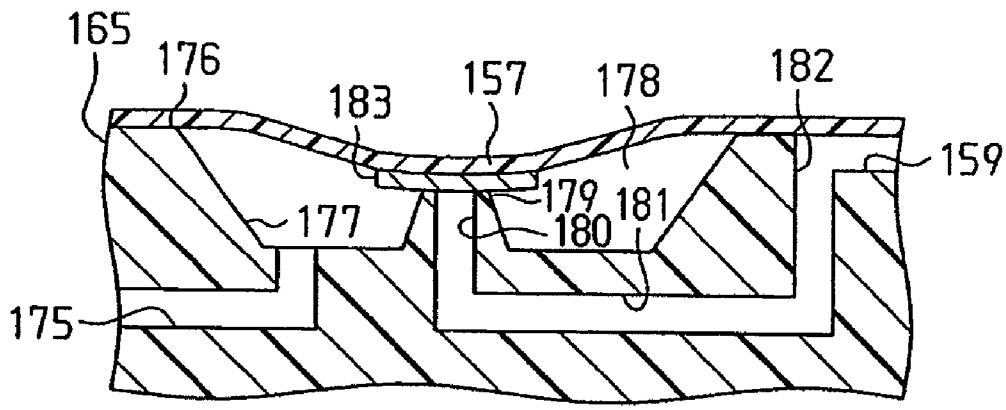
FIG. 17 is a partial cross-sectional view showing another operating state of the ink introduction chamber.

Next, the flow concentration path 151 will be described in detail. FIG. 14 is a perspective view of the flow concentration path 151, and FIG. 15 is a perspective view of an essential part of the flow concentration path 151 of the ink jet recording apparatus 145. FIGS. 16 and 17 are cross-sectional views of an essential part of the flow concentration path 151.

As shown in FIG. 14, the flow concentration path 151 comprises a main body 156, and a film 157 as a flexible member hot-welded to the main body 156. The main body 156 comprises a thermoplastic resin, and as shown in FIG. 15, it is formed by a section of an air groove 158 constituting pressure adjusting means and six sections of ink grooves 159 aligned along a longitudinal direction. FIG. 15 shows the main body 156 in a state with the film 157 not being attached. The film 157 is capable of being hot-welded to the main body 156, and is formed of a flexible member having a high gas barrier property.

The air groove 158 and the ink groove 159 have the upper surfaces thereof opened, and have the openings thereof sealed by the film 157 hot-welded to the main body 156. The air flow path is formed by the attached film 157 and the air groove 158, and the ink flow path is formed by the film 157 and each ink groove 159.

Further, in the flow concentration path 151, as shown in FIG. 14, there are formed a section of a pump connecting portion 162 and six sections of air lead out portions 163 in the first side surface 160. The pump connecting portion 162 and the air lead out portion 163 protruded from a first side surface 160 of the main body 156, and are formed in a cylindrical shape. Unillustrated holes formed within the pump connecting portions 162 and the air lead out portion 163 communicate with the air groove 158. Further, six pieces of an ink introduction portion 164 as connecting portions are formed in a second side surface 162 of the flow concentration path 151. An ink introduction portion 164 is provided with a protruding portion 165, which protrudes from the second side surface 161 of the main body 156 and has a substantially L-shaped cross section, and an interposal portion 166, which protrudes from the protruding portion 165 and is formed in a cylindrical shape. The interposal portion 166 is interposed into the connecting portion 167 shown in FIG. 15 when the flow concentration path 151 is mounted on the holder 151.

Further, as shown in FIG. 14, a tube connecting portion 168 is provided in the first side surface 160 of the flow concentration path 151. Six sections of ink lead out ports 169 are protrude in the tube connecting portion 168. An unillustrated hole formed in this ink lead out port 169 communicates with each ink flow path (an ink groove 159) of the main body 156. Each ink lead out port 169 is connected to an upstream side end portion 153 of the ink supply tube 152.

Next, the air flow path and each ink flow path formed in the flow concentration path 151 will be described in detail. As shown in FIG. 15, the pump connecting portion 162 protruding from the main body 156 is fitted in a pump side tube 170. The pump side tube 170 has one end connected with the pump connecting portion 162 and the other end connected with the pressure pump 25, and introduces the air delivered from the pressure pump 25 into the air flow path through the pump connecting portion 162.

Further, each air lead out portion 163 is connected to a distribution tube 171. The distribution tube 171 has one end connected to the air lead out portion 163 and the other end connected to the flow path (not shown) of the connecting portion 167 provided in the holder 150. The flow path penetrates into the connecting portion 167, and is opens at a case engaging port 172 formed at one side surface of the connecting portion 167. The case engaging portion 172 is provided in the connecting portion 167 connectable to the communication hole of the ink cartridge 23 mounted on the holder 150. Consequently, the air delivered from the pressure pump 25 flows into the air flow path of the flow concentration path 151 through the pump side tube 170, and is distributed by each distribution tube 171, and flows into the gap 33 within the ink case 31 from the case engaging port 172.

The interposal portion 166 of the flow concentration path 151 is interposed into a support portion 173 of the connecting portion 167. This support portion 173 is formed with an unillustrated ink hole. This ink hole has one end connected with the interposal portion 166 interposed into the support portion 173, and has the other end connected with the hole within an ink supply needle 174 fixed to the support portion 173. This ink supply needle 174 is formed in a hallow shape. When the ink cartridge 23 is mounted on the holder 150, the ink supply needle 174 is inserted into the ink discharge portion 32*c* of the ink cartridge 23, so that the ink within the ink pack 32 flows into the ink hole of the support portion 173. Hence, the ink pushed out from the ink pack 32 flows into the ink hole of the support portion 173 through the ink supply needle 174. The ink hole of the support portion 173 communicates with a path 175 within the interposal portion 166 interposed into the support portion 173, and the ink flowed into the ink hole of the support portion 173 is led out to the path 175.

As shown in FIGS. 16 and 17, the path 175 penetrating and formed into the interposal portion 166 penetrates into the protruding portion 165, and is opens at the underside of a recess portion 177 formed at the upper surface 176 of each protruding portion 165. The recess portion 177 as a large cross-sectional area flow path, is open at the upper surface 176, and is sealed by the film 157 so as to become an ink introduction chamber 178 temporarily storing the ink. This recess portion 177 corresponds to six sections of ink grooves 159, and forms one section each for the ink introduction portion 164 of the main body 156. Hence, a total of six recess portions 177 are formed in the main body 156.

In the underside of the recess portion 177, a protruding portion 179 corresponding to the step and the seal portion is formed. This protruding portion 179 is formed in a tapered shape toward the upper surface 176, and as shown in FIGS. 16 and 17, a communication hole 180 penetrates into the central portion of the protruding portion 179. In this way, each recess portion 177 is formed in each ink introduction portion 164, and the path 175 of each interposal portion 166 is opened at the underside of the recess portion 177. The length of the path 175 of each interposal portion 166 is all formed equally. Hence, the length of the flow path from the ink discharge port 32*c* of each ink cartridge 23 fixed on the holder 150 to each ink introduction chamber 178 is constant. To be more precise, the length of the flow path from each ink discharge portion 32*c* to the end edge of the path 175 opened at the underside of each recess portion 177 is constant or the opening from each ink discharge port 32*c* to the communication hole 180 formed in the protruding portion 179 is constant or the length of the flow path from the opening of the path 175 of the interposal portion 166 provided in the flow concentration path 151 to the opening of the path 175 of the ink introduction chamber 178 is constant.

A seal member 183 comprising an elastic material such as an elastomer is fixed to the inner side (the recess portion 177) of the film 157 sealing the recess portion 177. The film 157 blocking the recess portion 177 is flexible in the vertical direction (along the z direction) by the pressure difference between the inside and the outside of the ink introduction chamber 178. The seal member 183, as shown in FIG. 17, is capable of blocking the opening of the communication hole 180 when the film 157 is displaced to the recess portion 177. That is, when the pressure within the ink introduction chamber 178 is reduced to lower than the predetermined pressure, as shown in FIG. 17, the film 157 is flexed in a direction to reduce the volume of the ink introduction chamber 178. As a result, the film 157 abuts against the upper surface of the protruding portion 179, and blocks the flow of the ink passing through the communication hole 180 of the protruding portion 179.

The communication hole 180 formed in the protruding portion 179 extends vertically downward from the upper surface of the protruding portion 179, and is connected to a first hole 181 formed similarly in the main body 156. A first hole 181 is substantially flexed vertically for the communication hole 180, and extends horizontally. The first hole 181 is formed extending from the ink introduction chamber 178 to the ink groove 159, and communicates with a second hole 182. The second hole 182 extends upward vertically to the upper surface 176 from the end portion of the first hole 181. The second hole 182 communicates with the ink flow path (the ink groove 159) formed in the main body 156.

Each ink flow path (the ink groove 159), as shown in FIG. 15, is concentrated into a concentration portion 184 of the main body 156. Further, each ink flow path is flexed from the upper surface 176 (see FIG. 16) to the under surface, and is flexed again to the upper surface 176. Each ink flow path is formed so as to communicate with the ink lead out port 169 (see FIG. 14) provided in the tube connecting portion 168. Consequently, the ink introduced from each ink cartridge 23 through the ink supply needle 174 flows into the ink flow path (the ink groove 159) through the path 175, the ink introduction chamber 178, the communication hole 180 and the like. Further, the ink flowing into the ink flow path is led out to the ink supply tube 152 connected to the ink lead out port 169. The ink introduced into the ink supply tube 152 is led out to the valve unit 155 mounted on the carriage 147.

(Valve Unit)

Figure 18:
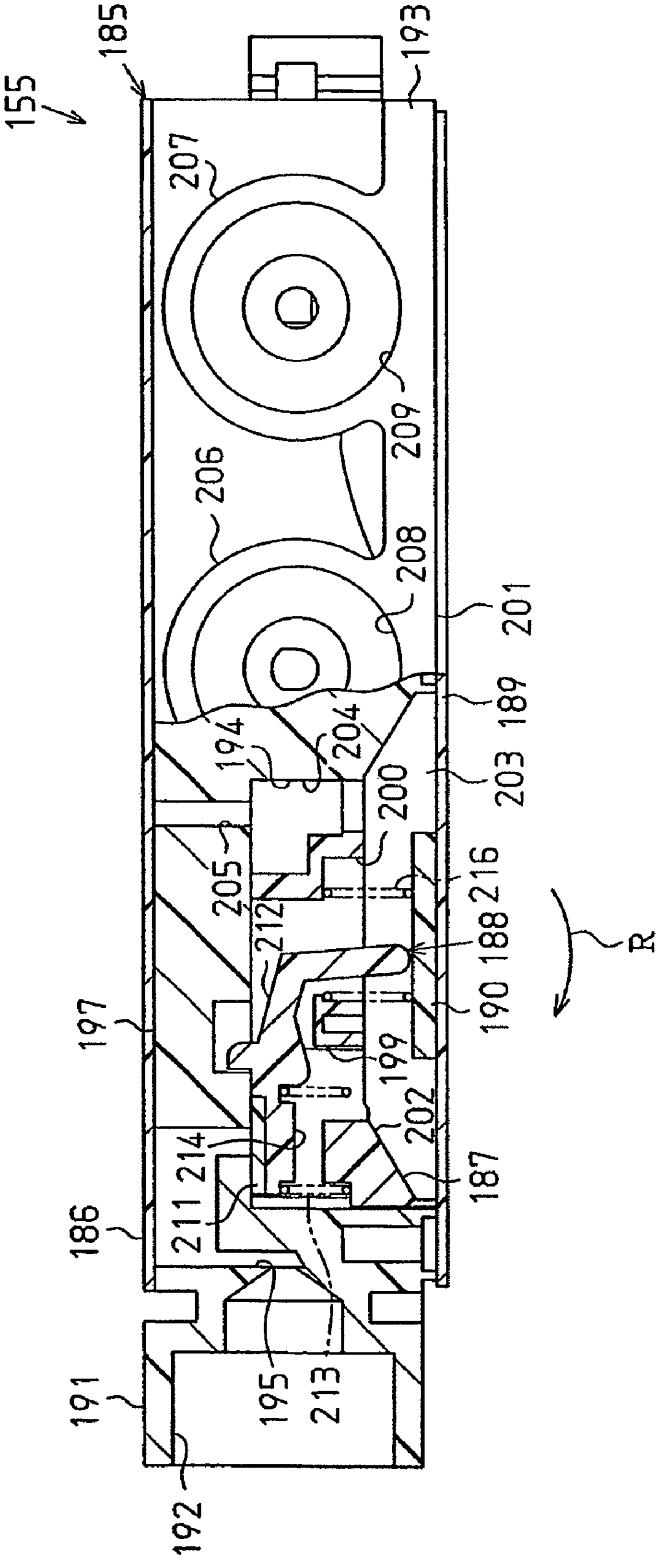
FIG. 18 is a partial cross-sectional view of the valve unit.

Next, a valve unit 155 as the liquid supply valve unit will be described. FIG. 18 shows a cross-sectional view of the valve unit 155. As shown in FIG. 18, the valve unit 155 comprises a flow path forming member 185, a first film member 186 as a flexible member, and a first fitting member 187 and a second fitting member (not shown). Further, the valve unit 155 comprises a first valve member 188 and a second valve member (not shown) as opening and closing valves, a second film member 189, a first pressure receiving plate 190, and a second pressure receiving plate (not shown).

The flow path forming member 185 comprises a thermoplastic resin formed in a substantially rectangular shape, and an ink introduction portion 191 is provided in its back surface. The ink introduction portion 191 has a shape as if having connected two cylinders, and comprises a first ink introduction hole 192 and a second introduction hole (not shown). The ink supply tube 152 communicates with this first ink introduction hole 192 and the second introduction hole, so that the ink of a total of two colors is introduced into the flow path forming member 185. Since the ink flow paths in the flow path forming member 185 corresponding to the first ink introduction hole 192 and the second ink introduction hole have substantially the same constitution, for the sake of convenience, the detailed description of the ink flow path and the second pressure chamber corresponding to the second introduction hole is omitted, and at the same time, the illustration thereof is omitted in FIG. 18.

The first ink introduction hole 192 communicates with a first communication hole 195 formed in the flow path forming member 185. The first communication hole 195 is formed in a substantially inversed L-shape within the flow path forming member 185, and has an opening portion in the midst thereof. This opening portion is sealed by the first film member 186 being hot-welded to the first side surface 197 of the flow path forming member 185. The flow path of the ink is formed from the first communication hole 195 and the first film member 186. The first film member 186 and the second film member 189 are formed by a flexible material that has a high gas barrier property.

Further, a first engaging recess portion 194 is formed in the second side surface 201 of the flow path forming member 185, and this first engaging recess portion 194 is fitted in the first fitting member 187. The first communication hole 195 communicates with a first ink inflow hole 199 penetrating into the first fitting member 187.

The second film member 189 is hot-welded to the second side surface 201 of the flow path forming member 185. At this time, the opening of a first recess portion 202 provided in the second side surface 201 is sealed by the second film member 189. In this way, a first pressure chamber 203 is formed by the second film member 189 and the first recess portion 202. The second film member 189 is flexed by the pressure difference between the inside and the outside of the first pressure chamber 203. That is, the second film member 189 is flexed in a direction to reduce the volume of the first pressure chamber 203 when the pressure within the first pressure chamber 203 is reduced to lower than the predetermined pressure.

The first pressure chamber 203 communicates with the first communication hole 195 through the first ink inflow hole 199 and a first central hole 200. Further, the first pressure chamber 203 communicates with a first ink outflow hole 204 formed in the first fitting member 187. The first ink outflow hole 204 communicates with a communication hole 205 formed in the flow path forming member 185.

Further, the flow path forming member 185 comprises a first ink discharge portion 206 and a second ink discharge portion 207 in the under surface 193. These first and second discharge portions 206 and 207 comprise first and second discharge holes 208 and 209, respectively. The first discharge hole 208 is formed by being continued to the communication hole 205. Further, the second discharge hole 209 is formed by being continued to an unillustrated communication hole (the ink flow path corresponding to the second ink induction hole).

The first and second ink discharge holes 208 and 209 communicate with the recording head 148, and the ink discharged from the first and second ink discharge holes 208 and 209 is ejected from the nozzle for each color. That is, the ink that has flowed into the first ink introduction hole 192 flows into the first pressure chamber 203 through the first communication hole 195, the first ink inflow hole 199, and the first central hole 200. Further, the ink that has flowed into the first pressure chamber 203 is supplied to the recording head 148 through the first ink outflow hole 204, the communication hole 205, and the first ink discharge hole 208.

Further, the first valve member 188 is mounted on the first fitting member 187 fitted in the first engaging recess portion 194. An adhering portion 211 of the first valve member 188 is fixed to a first valve member main body 212 so as to be superposed on the surface of the first communication hole 195. A first biasing spring 213 has one end fixed to the first fitting member 187 and the other end to a first disc portion 214 of the first valve member main body 212. Consequently, the first valve member 188 is biased in the direction of the arrow R in FIG. 18 by the first biasing spring 213.

When the second film member 189 is flexed by the reduction of the pressure in the first pressure chamber 203, the first pressure receiving plate 190 moves so as to approach the first recess portion 202 against the biasing force of a first pressure receiving spring 216. Then, the first valve member 188 rotates in the direction opposite to the arrow R shown in FIG. 18, and the first communication hole 195 is in a state of communicating with the first ink inflow hole 199 and the first central hole 200. Further, when the pressure within the first pressure chamber 203 is increased, the first pressure receiving plate 190 moves so as to be isolated from the first recess portion 202, and a non-communication state is established between the first communication hole 195 and the first ink inflow hole 199.

Next, the operation of the ink jet recoding apparatus 145 constituted as above will be described. The description of the electrical constitution of the ink jet recording apparatus 145 will be omitted as it is the same as that of the first embodiment.

At the time of the normal printing, the flow path of the ink from the ink cartridge 23 to the recording head 148 is in a state of being filled with the ink for each color. The ink supplied to each ink introduction chamber 178 of the flow concentration path 151 is maintained in a state of high pressure. Consequently, the film 157 sealing the ink introduction chamber 178 is maintained in a state in which it is not flexed. As a result, the ink that has flowed into the ink introduction chamber 178 is in a state capable of being led out to each ink flow path of the flow concentration path 151 through the communication hole 180.

Further, the valve unit 155 mounted on the cartridge 147 is supplied with the ink for each color, which is introduced in a pressurized state through the flow concentration path 151 and the ink supply tube 152. For example, the ink flowing from the first ink introduction hole 192 flows within the first pressure chamber 203 through the first communication hole 195.

In this state, when printing is started based on image data, the ejection of ink is performed from the recording head 148, and according to the ejection amount of the ink, the ink within the pressure chamber 203 is supplied to the recording head 148 through the first ink discharge hole 208 and the like. As a result, the ink within the first pressure chamber 203 is reduced, and the pressure within the first pressure chamber 203 is reduced.

For example, when the ink within the first pressure chamber 203 is reduced, the second film member 189 is flexed in a direction to reduce the volume within the first pressure chamber 203. As a result, the first valve member 188 is rotated by the first pressure receiving plate 190, and a communication state is established between the first communication hole 195 and the first ink inflow hole 199, as well as the first central hole 200. The ink within the first communication hole 195 and the ink supply tube 152 flows within the first pressure chamber 203, and the ink is caused to fill the first pressure chamber 203. Consequently, the ink within the ink supply tube 152 upstream of the first ink introduction hole 192 and the ink within the ink flow path within the flow concentration path 151 are led out to the valve unit 155.

When the ink flows within the first pressure chamber 203, the pressure of the ink within the first pressure chamber 203 is increased. As a result, the flexing of the second film member 189 alone is eliminated. The first valve member 188 rotates to its original position, and a non-communication state is established again between the first communication hole 195 and the first ink inflow hole 199.

Next, the operation of the ink jet recording apparatus 145 during choke cleaning will be described. When an input portion 115 (see FIG. 9) is operated by a user, a CPU 111 first drives the carriage motor 17 according to the choke cleaning program disclosed in the first embodiment, and moves the carriage 147 to the home position (for example, to the left end between the frame plate 145*a* and the frame plate 145*b*).

Further, the CPU 111 advances to a pressure reducing step, and stops a pressure pump motor 125 so as not to allow pressurized air to be delivered from the pressure pump 25. Subsequently, the CPU 111 advances to a capping step, and drives a cap lifting motor 126 so as to lift a cap 26*a* and seal the nozzle surface of the recording head 148. When the CPU 111 lifts the cap 26*a*, it advances to a drawing step, and drives a tube pump motor 127, and forms the negative pressure within the cap 26*a*.

As a result, the ink is drawn through the recording head 148, and first, the ink within the first pressure chamber 203 and the second pressure chamber in the valve unit 155 begins to be reduced. Similarly to the printing operation, the pressure within the first pressure chamber 203 and the second pressure chamber decrease to below the predetermined pressure, so that the second film member 189, the first valve member 188 and the second valve member start operating, and a communication state is established between the first communication hole 195 and the second communication hole, and the first ink inflow hole 199 and the second ink inflow hole.

Then, the ink within the ink flow path of the ink supply tube 152 and the flow concentration path 151 in the upstream side of the valve unit 155 flows within the valve unit 155. Further, at this time, since the pressurized air from the pressure pump 25 is in a state of not being delivered, the ink within each ink introduction chamber 178 provided in the upstream side of the ink flow path of the ink supply tube 152 and the flow concentration path 151 begins to gradually reduce also.

When the pressure within each ink introduction chamber 178 is reduced to lower than the predetermined pressure, as shown in FIG. 17, the film 157 sealing the ink introduction chamber 178 is flexed, and the seal member 183 blocks the opening of the communication hole 180 of the protruding portion 179. As a result, the flow of ink flowing from the ink introduction chamber 178 to the communication hole 180 is blocked.

In this state, by allowing the suction operation to be continued by a tube pump 26*e* constituting suction means, with the first ink introduction chambers 178 as a boundary, negative pressure is accumulated in the downstream side thereof. The CPU 111 measures the driving time of the tube pump motor 127 according to the choke cleaning program, and when the predetermined time elapses, it advances to a pressure increasing step, and starts the driving of the pressure pump motor 125. The CPU 111 completes the processing of the choke cleaning program when the driving of the pressure pump motor 125 is started.

As a result, the delivery of the pressurized air from the pressure pump 25 is started, and the ink is supplied in a pressurized state from the ink cartridge 23 through the connecting portion 167. Then, the ink is supplied to the ink introduction chamber 178 in a pressurized state, and the bending of the film 157 is eliminated. In this way, the film 157 and the protruding portion 179 are isolated, and the flow of the ink passing through the communication hole 180 is allowed.

At this time, the length of the flow path from the ink discharge port 32*c* of the each ink cartridge 23 to each ink introduction chamber 178 is constant. To be more precise, the length of the flow path to the opening of the path 175 formed in each ink introduction chamber 178 from the ink discharge port 32*c* of the ink cartridge 23 or to the opening of the communication hole 180 is constant, respectively. Hence, when the ink is supplied from each ink cartridge 23 in a pressurized state, substantially at the same time, the filling of the ink into the ink introduction chamber 178 is completed, and substantially at the same time, the flexing of the film 157 is eliminated.

The ink flows from the upstream side instantly to eliminate the negative pressure accumulated in the section downstream of each ink introduction chamber 178, and the ink speeds up instantaneously and begins to flow. As a result, the bubbles and impurities stagnated in the section downstream of each ink introduction chamber 178, that is, within the flow path from the flow concentration path 151 to the valve unit 155 are discharged together with the ink instantly from the nozzle of the recording head 148 through the ink supply tube 152, thereby performing choke cleaning.

Consequently, according to the second embodiment, the following effects are obtained.

(6) In the second embodiment, the ink jet recording apparatus 145 comprises the pressure pump 25 and the like, and becomes an apparatus of an air pressurized system for pressure-transferring the ink to the recording head 148 by introducing pressurized air from the pressure pump 25 into the ink cartridge 23. Each ink introduction chamber 178 is provided in the midst of the ink flow path between the ink cartridge 23 and the recording head 148, and in the upstream side of the ink flow path formed in the flow concentration path 151. This ink introduction chamber 178 has a part of the wall surface formed by the film 157 which is flexed by the difference between the pressure of the ink inside and the atmospheric pressure.

Consequently, according to the present embodiment, in a state of the opening surface of the nozzle of the recording head 148 being covered by the cap 26*a*, the driving of the pressure pump 25 is stopped, so that the pressure of the fluid within the flow concentration path 151, the ink supply tube 152 and the valve unit 155 is reduced. In this state, by performing the suction operation of the tube pump 26*c*, the pressure of the fluid within the flow concentration path 151, the ink supply tube 152 and the valve unit 155 is totally reduced. Hence, the pressure within each ink introduction chamber 178 is reduced lower than the predetermined pressure, and the film 157 is flexed inside.

As a result, the seal member 183 within the film 157 abuts against the protruding portion 179, and the ink flow passing through the communication hole 180 is blocked. In this state, by allowing the suction operation to be continued by the tube pump 26*e*, the negative pressure is accumulated in the section downstream of the abutting portion between the film 157 and the protruding portion 179. Further, by starting the driving of the pressure pump 25 in a state of the negative pressure being accumulated, the flexing of the film member 157 is restored, and the negative pressure accumulated is eliminated instantly. As a result, the bubbles, impurities and the like within the flow path across the whole ink flow path from each ink cartridge 23 to the nozzle opening of the recording head 148 is discharged instantly together with the ink from the nozzle of the recording head 148, thereby performing the so-called choke cleaning. As a result, the filling factor of the ink in the ink jet recording apparatus 145 is enhanced.

Further, since the ink introduction chamber 178 is provided in the upstream side of the ink flow path formed in the flow concentration path 151, the ink introduction chamber 178 is provided with a relatively stable supply of the ink from the ink cartridge 23. Consequently, the flexing of the film 157 for sealing the ink introduction chamber 178 is easily eliminated, and reliability of the displacing operation of the film 157 is enhanced. Consequently, the ink is relatively and stably led out to the downstream side of the ink introduction chamber 178.

(7) In the second embodiment, the ink introduction chamber 178 is provided in the flow concentration path 151. Further, the first pressure chamber 203 and second pressure chamber are provided in the valve unit 155 of the downstream of the flow concentration path 151. Hence, the valve unit 155 is made compact and light weight or the structure of the valve unit 155 is simplified. Consequently, when the number of ink cartridges 23 is increased and the number of valve units 155 mounted on the carriage 147 is increased, the load on the carriage motor 17 is reduced.

(8) In the second embodiment, each ink introduction chamber 178 is formed in the ink introduction portion 164 formed in the flow concentration path 151. The length of the flow path from the ink discharge port 32*c* of each ink cartridge 23 to each ink introduction chamber 178 is made constant. To be more precise, in a state in which the holder 150 is provided with the ink cartridge 23, the length of the flow path from the ink discharge part 32*c* of the ink cartridge 23 to the opening of the path 175 of the ink introduction chamber 178 or to the opening of the communication hole 180 of the ink introduction chamber 178 is made constant.

Hence, in a state of a film 157 blocking the communication hole 180 by the driving of the tube pump 26*c*, the time required from starting the driving of the pressure pump 25 to the elimination of the flexing of the film 157 is substantially constant for each ink introduction chamber 178. Hence, unlike the case where the time required from starting the driving of the pressure pump 25 to the elimination of the flexing of the film 157 is different for each ink introduction chamber, there is no need to drive the pressure pump 25 by matching the ink introduction chamber where the time required until the elimination of the flexing of the film 157 takes long. Hence, the driving time of the pressure pump 25 for eliminating the flexing of the film 157 is made the minimum possible. Consequently, the time required for the choke cleaning is shortened.

(9) In the second embodiment, the protruding portion 179 into which the communication hole 180 penetrates is formed in the undersides of each ink introduction chamber 178 (a recess portion 177), and each protruding portion 179 is allowed to confront the film 157 constituting the ink introduction chamber 178. Consequently, at the choke cleaning, the film 157 is flexed to the ink introduction chamber 178 so as to be able to abut against the protruding portion 179, thereby sealing the communication hole 180 more reliably. Hence, in the flow path of the downstream of the film 157, the negative pressure is more reliably accumulated, and therefore, the choke cleaning is more reliably performed.

Third Embodiment

Figure 19:
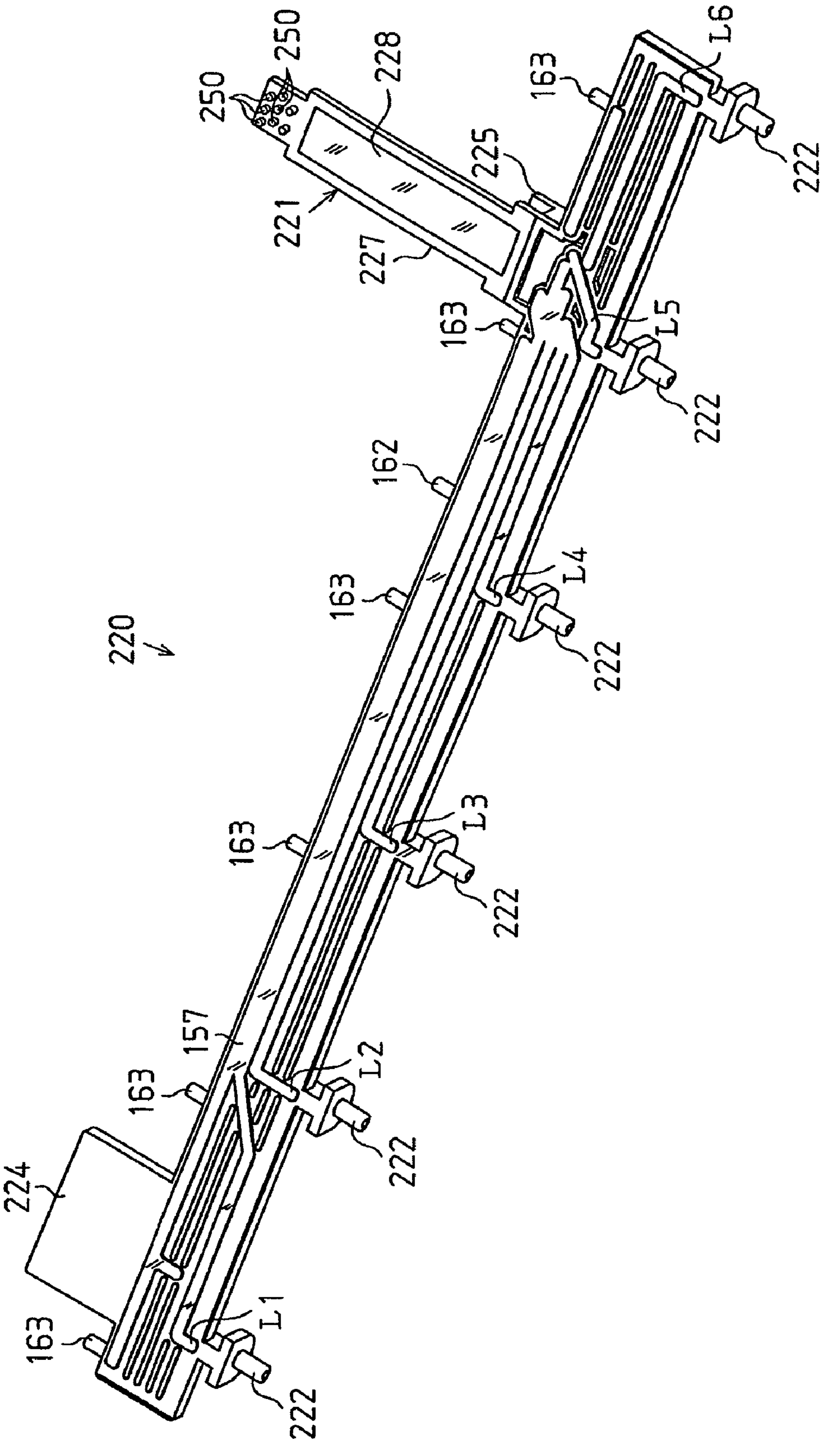
FIG. 19 is a perspective view of a flow concentration path in a third embodiment.
Figure 20:
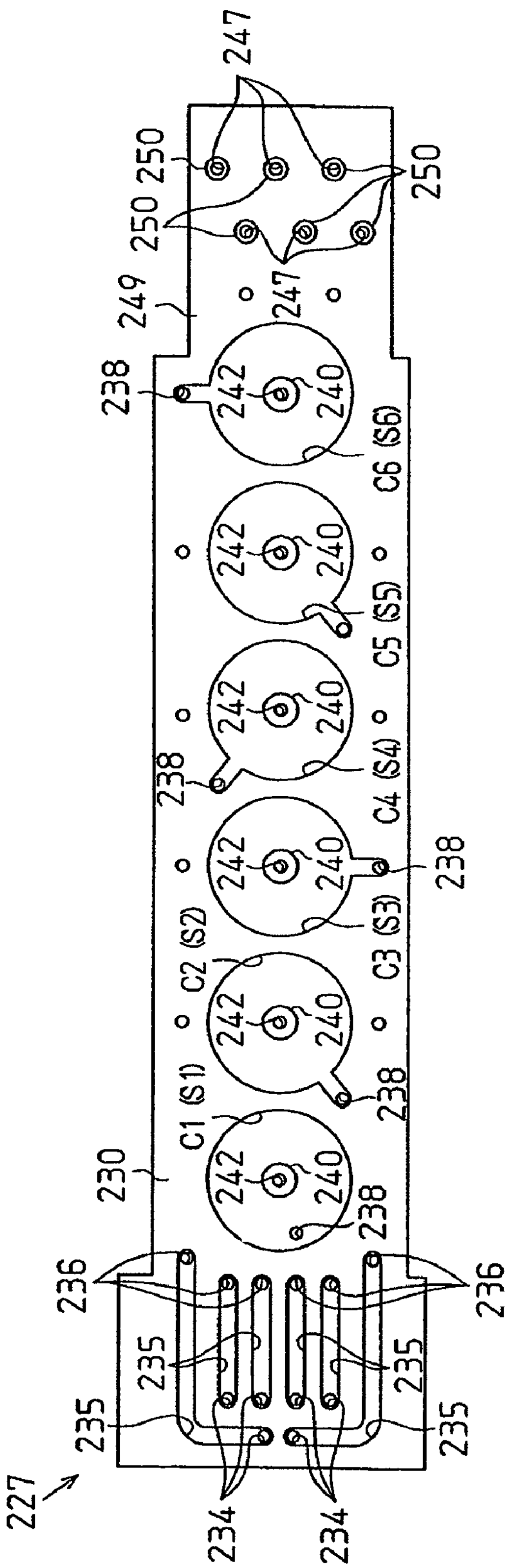
FIG. 20 is a top view of the main body of a choke valve.
Figure 21:
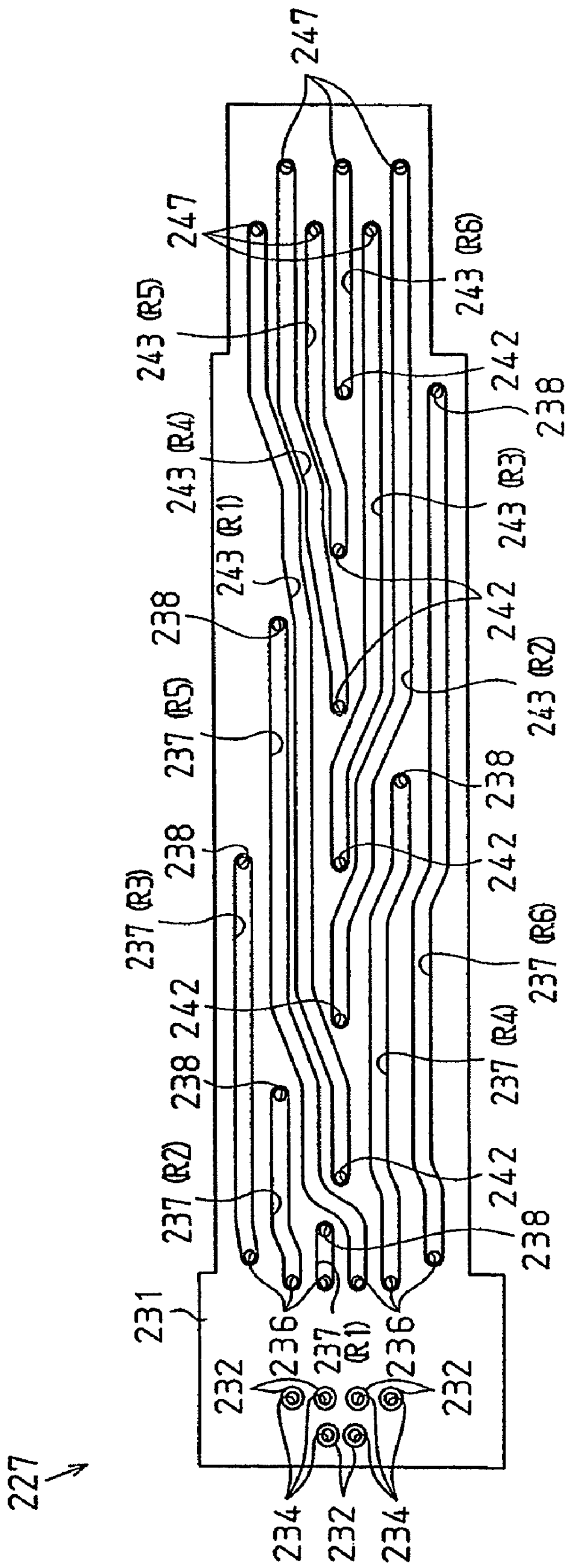
FIG. 21 is an under surface view of the main body of the choke valve.
Figure 22:
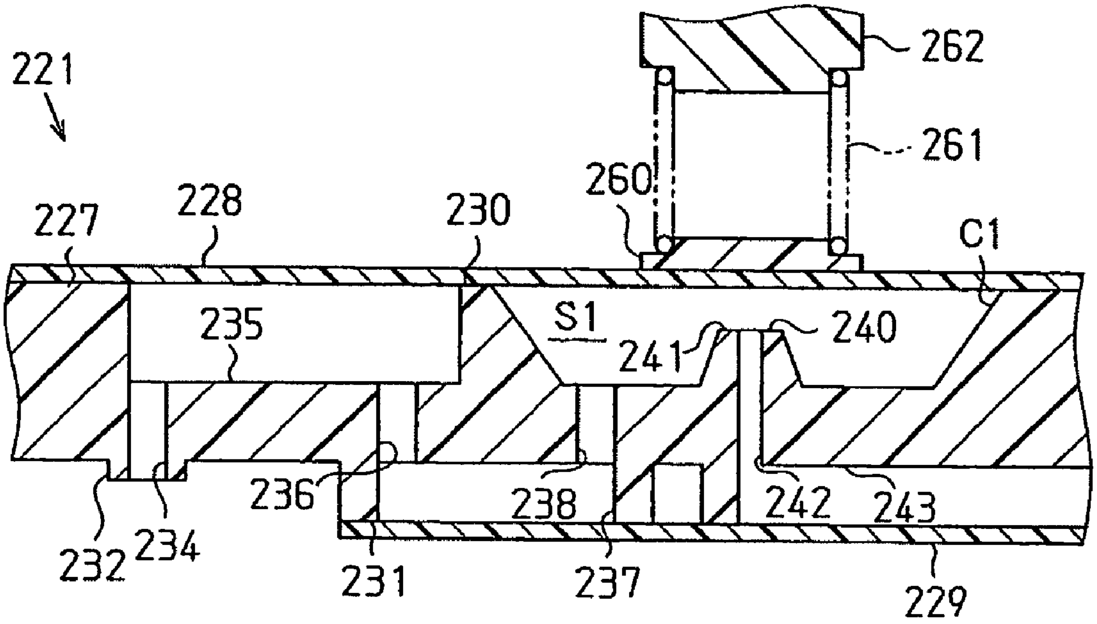
FIG. 22 is a cross-sectional view for explaining the operation of the ink introduction chamber.

Next, a third embodiment according to the present invention will be described according to FIGS. 19 to 22. Since the third embodiment has a constitution in which the valve units or the ink introduction chambers of the first and second embodiments alone are changed, the description of the like parts will be omitted. FIG. 19 is a perspective view of a flow concentration path 220 constituting a liquid supply path, FIG. 20 is a top view of a main body 227 of a choke valve 221 connected to the flow concentration path 220, and FIG. 21 is an under surface view of the main body 227. FIG. 22 is an essential part cross-sectional view of the choke valve 221.

The flow concentration path 220 of the present embodiment has a constitution where the ink introduction chamber 178 shown in FIG. 16 alone is omitted from the flow concentration path 151 disclosed in the second embodiment. Consequently, the ink that has flowed into cylindrical interposal portions 222 provided in one side surface of the flow concentration path 220 is directly flowed into a first ink flow path L1 to a sixth ink flow path L6 formed in the flow concentration path 220. The interposal portions 222 corresponding to the first ink flow path L1 to the sixth ink flow path L6 protruded from the left end to the right end in order in the flow concentration path 220 in FIG. 19, respectively.

Further, where the length of the total flow path of the first flow path L1 to the sixth flow path L6 is represented by D1 to D6, the size of D1 to D6 becomes smaller as it goes from the length D1 to the length D6 except the length D5. The length D5 is the smallest. That is, an inequality is established where the length D1>the length D2>the length D3>the length D4>the length D6>the length D5.

A valve side connecting portion 225 provided in the main body 224 of the flow concentration path 220 is connected to a choke valve 221. The choke valve 221 comprises a main body 227 as a flow path forming member formed in a substantially rectangular plate shape, and the first film 228 and the second film 229 (see FIG. 22) as flexible members. The main body 227 is made of a thermoplastic resin. The first and second approx rectangular shaped films 228 and 229 are hot-welded to the main body 227, and are formed of a flexible member having a high gas barrier property. As shown in FIG. 22, the first film 228 and the second film 229 are hot-welded to an upper surface 230 and an undersurface 231 of the main body 227, respectively.

As shown in FIGS. 20 and 21, the main body 227 is formed with a first recess portion C1 to a sixth recess portion C6 as a large cross-sectional area flow path and respective ink grooves and the like communicate with those recess portions. The first recess portion C1 to the sixth recess portion C6 and the grooves connected with those recess portions have opening portions, respectively, and these opening portions are sealed by the hot-welding of the first film 228 and the second film 229 to the main body 227. The first recess portion C1 to the sixth recess portion C6, the grooves, the first film 228 and the second film 229 constitute a first flow path R1 to a sixth flow path R6. FIGS. 20 and 21 show a state where the first film 228 and the second film 229 are not hot-welded to the main body 227.

As shown in FIGS. 21 and 22, the under surface 231 of the main body 227 is formed with six sections of introduction protrusion 232. Each introduction protrusion 232 is fitted in an ink lead out port 169 of the flow concentration path 220. As shown in FIG. 22, an introduction hole 234 penetrates into the introduction protrusion 232, and the introduction hole 234 is continuously formed in the upper side groove 235 formed in the upper surface 230 of the main body 227. In FIG. 22 the first recess portion C1 is shown and the corresponding grooves, holes and the like constituting the first flow path R1.

As shown in FIG. 22, the upper side groove 235 is open at its upper surface 230, and the opening is sealed by the first film 228. One end of the upper side groove 235 communicates with the introduction hole 234, and the other end communicates with an upstream side communication hole 236. The upstream side communication hole 236, as shown in FIG. 22, penetrates the main body 227 and extends up and down, and communicates with an introduction groove 237. The introduction groove 237 is open at its under surface 231, and the opening is sealed by the hot-welding of the second film 229 to the main body 227. Further, as shown in FIG. 21, the introduction groove 237 constituting the first flow path R1 to the sixth flow path R6 extends to the vicinity of the corresponding first recess portion C1 to sixth recess portion C6, respectively. Consequently, the length and size of each introduction groove 237 is different, respectively.

As shown in FIG. 22, the introduction groove 237 communicates with the downstream side communication hole 238. The downstream side communication holes 238 penetrate the main body 227 and extend up and down. Further, the downstream side holes 238 are open at the under sides of the first recess portion C1 to the sixth recess portion C6 formed in the upper surface 230, respectively. The first recess portion C1 to the sixth recess portion C6 are formed in a substantially circular shape, and the side surface thereof is an inclined surface (tapered shape) with its cross-sectional area becoming smaller from the upper surface 230 to the under surface 231. The first recess portion C1 to the sixth recess portion C6, as shown in FIG. 20, are arranged in order from one end portion formed with each introduction protrusion 232 of the main body 227 (the introduction hole 234) to the other end portion.

As shown in FIG. 22, the first recess portion C1 (from the second recess portion C2 to the sixth recess portion 6) is open at the upper surface 230, and is sealed by the first film 228. Protrusions 240 constituting steps and seal portions are formed substantially in the center of the undersides of the first recess portion C1 to the sixth recess portion C6, respectively. The protrusion 240 is formed such that its upper surface 241 becomes lower than the upper surface 230 of the main body 227. The first ink introduction chamber S1 (the second ink introduction chamber S2 to the sixth ink introduction chamber S6) is formed by the first recess portion C1 to the sixth recess portion C6 and the first film 228. The protruding portion 240 is penetrated with a communication hole 242 as a small section area flow path, and this communication hole 242 is open at the upper surface 241.

The first film 228 constituting the first ink introduction chamber S1 to the sixth ink introduction chamber S6 is flexed by the pressure difference between the inside and the outside of the first ink introduction chamber S1 to the sixth ink introduction chamber S6. That is, the first film 228 is flexed in a direction to reduce the volume of the first ink introduction chamber S1 to the sixth ink introduction chamber S6 when the pressure within the first ink introduction chamber S1 to the sixth ink introduction chamber S6 is reduced lower than the predetermined pressure. As a result, the first film 228 abuts against the upper surfaces 241 of the protruding portions 240 formed in the first ink introduction chamber S1 to the sixth ink introduction chamber S6, respectively, and blocks the flow of the ink into the communication hole 242.

Further, a spring seat 261 is attached to the outer side surface of the first film 228. Further, six sections of biasing spring 261 are provided so as to confront the first ink introduction chamber S1 to the sixth ink introduction chamber S6 through the first film 228 in the vicinity of the first film 228. One end of each biasing spring 261 is fixed to a spring seal 260, and the other end to a fixing portion 262. The fixing portion 262 is supported by the ink jet recording apparatus

145. The biasing spring 261 biases the first film 228 to the insides of the first ink introduction chamber S1 to the sixth ink introduction chamber S6, and allows the first film 228 to abut against the protruding portion 240.

In a state of the ink being supplied to the first ink introduction chamber S1 to the sixth ink introduction chamber S6 in a pressurized state by the driving of the pressure pump 25 at the time of printing and the like, as shown in FIG. 22, the first film 228 is maintained in a state of not abutting against the protruding portion 240 against the biasing force of the biasing spring 261. That is, the biasing spring 261 comprises a biasing force amount unable to allow the first film 228 to abut against the protruding portion 240 in a state of the ink being supplied in a pressurized state to the first ink introduction chamber S1 to the sixth ink introduction chamber S6.

Further, when the pressure pump 25 stops driving in case the ink cartridge 23 and the like are taken out from the holder 150, the first film 228 is abutted against the protruding portion 240 by the biasing force of the biasing spring 261. That is, the biasing spring 261 has a biasing force capable of allowing the first film 228 to abut against the protruding portion 240 when the ink is being supplied in a non-pressurized state from the first ink introduction chamber S1 to the sixth in introduction chamber S6.

The communication hole 242 formed in the protruding portion 240 is continuously formed in a lead out groove 243. The lead out groove 243 is open at the under surface 231, and has the opening sealed by the second film 229. The lead out groove 243 constituting the first flow path R1 to the sixth flow path R6, respectively extends from just under the corresponding first recess portion C1 to the sixth recess portion C6, and to the base end portion of the main body 227. Consequently, the length and size of each lead out groove 243 is different, respectively.

As shown in FIG. 21, each lead out groove 243 communicates with a lead out hole 247 in the base end portion of the main body 227. Each lead out hole 247 vertically penetrates the main body 227 from the under surface 231 to the upper surface 230.

Further, as shown in FIG. 20, a tube connecting portion 249 provided in the other end portion of the main body 227 is formed with six sections of connecting protrusion 250, and each connecting protrusion 250 is connected to each flow path of the ink supply tube 152. The lead out hole 247 connected to each lead out groove 243 penetrates the corresponding connecting protrusion 250, and is open at the upper end of the connecting protrusion 250. The first flow path R1 to the sixth flow path R6 are connected to each ink flow path of the ink supply tube 152 through each connecting protrusion 250. The ink supply tube 152, similarly to the second embodiment, is connected to the valve unit 155 mounted on the carriage 147.

Consequently, the ink led out from the first ink flow path L1 to the sixth ink flow path L6 flows into the first flow path R1 to the sixth flow path R6 within the choke valve 221 through each introduction protrusion 232 formed in the main body 227 of the choke valve 221, respectively. At this time, the ink flows into the first ink introduction chamber S1 to the sixth ink introduction chamber S6 provided in the midst of the first ink flow path R1 to the sixth flow path R6. The ink flowed into the first ink introduction chamber S1 to the sixth ink introduction chamber S6 is led out to the ink flow path within the ink supply tube 152 from each connecting protrusion 250 of the main body 227.

Further, the lengths M1 to M6 of the flow path from the opening of each introduction hole 234 to the first ink introduction chamber S1 to the sixth ink introduction chamber S6, to be precise, are of a length from the opening of each introduction hole 234 to the opening in the underside of the first ink introduction chamber S1 to the sixth ink introduction chamber S6 of the downstream side communication hole 238 or of a length to the opening of the communication hole 242 formed in each protrusion 240. These lengths become larger in order of the lengths M1 to M6 (the length M1<the length M2<the length M3<the length M4<length M5<length M6).

The first flow path R1 to the fourth flow path R4 of the choke valve 221 shown in FIG. 21 communicate with the first ink flow path L1 to the fourth ink flow path L4 of the flow concentration path 220 shown in FIG. 19, respectively. The fifth flow path R5 of the choke valve 221 communicates with the sixth ink flow path L6 of the flow concentration path 220, and the sixth flow path R6 of the choke valve 221 communicates with the fifth ink flow path L5 of the flow concentration path 220. The length of the total ink flow path obtained by adding the lengths D1 to D6 of the ink flow path in the flow concentration path 220 and the lengths M1 to M6 of the ink flow path in the choke valve 221, respectively is made constant. That is, for example, the value (the length D1+the length M1) obtained by adding the length D1 of the first ink flow path L1 of the flow concentration path 220 and the length M1 of the first flow path R1 of the choke valve 221 is equal to the value (the length D2+the length M2) obtained by adding the length D2 of the ink flow path L2 of the flow concentration path 220 and the length M2 of the second flow path R2 of the choke valve 221. Further, it is also equal to the value (the length D3+the length M3, the length D4+the length M4, the length D5+the length M6, and the length D6+the length M5) obtained by adding the length of other ink flow paths. That is, the length of the total flow path comprising the ink flow path of the flow concentration path 220 and the ink flow path of the choke valve 221 connected therewith are set to become equal.

At the time of normal printing, the ink is in a state of filling from the ink cartridge 23 to the recording head 148 for each color. At this time, the ink supplied to the first ink introduction chamber S1 to the sixth ink introduction chamber S6 of the choke valve 221 is maintained in a state of having high pressure. Consequently, the first film 228 sealing the first recess portion C1 to the sixth recess portion C6 is maintained in a state of not being flexed. As a result, the ink that has flowed into the first ink introduction chamber S1 to the sixth ink introduction chamber S6 is in a state capable of being led out to the lead out groove 243 through the communication hole 242.

In this state, when printing is started based on image data, the ejection of ink is performed from the recording head 148, and according to the ejection amount of the ink, the ink within the first pressure chamber 203 of the valve unit 155 and the second pressure chamber is supplied to the recording head 148. As a result, the pressure within the first pressure chamber 203 and the second pressure chamber is reduced. For example, when a first valve member 188 is rotated by the first pressure receiving plate 190, the ink in the upstream side of the valve unit 155, that is, in the first communication hole 195 is filled within the first pressure chamber 203. In this way, the ink within the choke valve 221 and the flow concentration path 220 is pushed out in order to the ink supply tube 152.

Next, the operation of the ink jet recording apparatus 145 at the choke cleaning will be described. When an input portion 115 (see FIG. 9) is operated by the user, a CPU 111 moves the carriage 147 to a home position. The CPU 111 advances to a pressure reducing step, and stops the driving of a pressure pump motor 125. Then, the pressure pump 25 stops, and the first film 228 is abutted against the upper surface 241 of the protruding portion 240 by the biasing force of each biasing spring 261 shown in FIG. 22. As a result, the flow of the ink flowing into each communication hole 180 from each ink introduction chamber 178 is blocked. Subsequently, the CPU 111 lifts a cap 26*a* and advances to the drawing step through the capping step Sealing the nozzle surface of the recording head 148.

As a result, the ink is drawn through the recording head 148, and first, the ink within the first pressure chamber 203 and the second pressure chamber of the valve unit 155 begins to reduce. This allows the first valve member 188 and the second valve member to rotate, and a communication state is established between the first communication hole 195 and the second communication hole, and the first ink inflow hole 199 and the second ink inflow hole. The ink within the ink supply tube 152 of the upstream side of the valve unit 155 flows within the valve unit 155.

In this state, by allowing the suction operation to be continued by a tube pump 26*e*, with the first ink introduction chamber S1 to the sixth ink introduction chamber S6 as a boundary, negative pressure is accumulated in the downstream side thereof. The CPU 111 measures the driving time of a tube pump motor 127 according to the choke cleaning program, and when a predetermined time elapses, it advances to a pressure increasing step and starts the driving of the pressure pump motor 125. When the CPU 111 starts the driving of the pressure pump motor 125, the processing of the choke cleaning is completed.

As a result, the delivery of the pressurized air from the pressure pump 25 is started, and the ink is supplied from the ink cartridge 23 to the valve unit 155 in a pressurized state. Then, the ink is supplied to the first ink introduction chamber S1 to the sixth ink introduction chamber S6 in a pressurized state, and the flexing of the first film 228 is eliminated against the biasing force of each biasing spring 261. In this way, the first film 228 and the protruding portion 240 are isolated, and the flow of the ink passing through the communication hole 242 is allowed. At this time, since the total length of the ink flow path from the ink discharge port 32*c* to the first ink introduction chamber S1 to the sixth ink introduction chamber S6 is substantially constant, the time required from starting the driving of the pressure pump 25 to the elimination of the flexing of the first film 228 constituting a part of the first ink introduction chamber S1 to the sixth ink introduction chamber S6 is substantially constant.

The ink flows instantly from the upstream side to eliminate the negative pressure accumulated in the section downstream of the first ink introduction chamber S1 to the sixth ink introduction chamber S6, and the ink speeds up instantaneously and begins to flow. As a result, the bubbles and impurities stagnated in the section downstream of each of the first ink introduction chamber S1 to the sixth ink introduction chamber S6 are discharged instantly together with the ink from the nozzle of the recording head 148, and the choke cleaning is performed.

Consequently, according to the third embodiment, in addition to the effect disclosed in (9) of the second embodiment, the following effects are obtained.

(10) In the third embodiment, the ink jet recording apparatus 145 comprises the pressure pump 25 and the like, and becomes an air pressurized system for pressure-transferring the ink to the recording head 148 by introducing the pressurized air from the pressure pump 25 into the ink cartridge 23. The choke valve 221 provided integrally with six sections of the first introduction chamber S1 to the sixth introduction chamber S6 is provided in the midst of the ink flow path between the ink cartridge 23 and the recording head 148, and between the flow concentration path 220 and the ink supply tube 152. Further, the first ink introduction chamber S1 to the sixth ink introduction chamber S6 have a part of the wall surfaces formed by the first film 228, which is flexed by the difference between the pressure of the ink inside and the atmospheric pressure.

Consequently, according to the present embodiment, in a state of the nozzle of the recording head 148 being covered by the cap 26*a*, the driving of the pressure pump 25 is stopped, so that the pressure of the fluid within the flow concentration path 220, the choke valve 221, the ink supply tube 152 and the valve unit 155 is reduced. This allows the pressure within the first ink introduction chamber S1 to the sixth ink introduction chamber S6 to be reduced lower than the predetermined pressure and the first film 228 to be flexed inside, and at the same time, the first film 228 to abut against the protruding portion 240 by the biasing force of the biasing spring 261. Hence, the flow of the ink passing through the communication hole 242 is blocked.

In this state, by allowing the suction operation to be continued by the tube pump 26*e*, negative pressure is accumulated in the section downstream of the abutting portion between the first film 228 and the protruding portion 240. Further, in a state of the negative pressure being accumulated, the driving of the pressure pump 25 is started, so that the flexing of the first film 228 is restored, and the accumulated negative pressure is eliminated instantly. As a result, the bubbles and impurities and the like stagnated within the ink supply tube 152 and the valve unit 155 of the downstream of the first ink introduction chamber S1 to the sixth ink introduction chamber S6 are discharged instantly together with the ink from the nozzle of the recording head 148, and the choke cleaning is performed. As a result, the filling factor for the ink in the ink jet recording apparatus 145 is enhanced.

(11) In the third embodiment, the length from the ink discharge portion 32*c* of each ink cartridge 23 to the first ink introduction chamber S1 to the sixth ink introduction chamber S6 is made substantially constant. Hence, in a state of the first film 228 abutting against the protruding portion 240 by the driving of the tube pump 26*e* so as to block the communication hole 242, the time required from starting the driving of the pressure pump 25 to the elimination of the flexing of the first film 228 is substantially constant in the first ink introduction chamber S1 to the sixth ink introduction chamber S6. Hence, unlike the present embodiment, that is, unlike the case where the time required from starting the driving of the pressure pump 25 to the elimination of the flexing of the first film 228 is different for each ink introduction chamber, there is no need to drive the pressure pump 25 by matching the ink introduction chamber and the ink flow path where the time required until the flexing of the first film 228 is eliminated is long. Hence, the driving time of the pressure pump 25 for eliminating the flexing of the first film is made the shortest length.

Consequently, according to the third embodiment, the following effects are obtained.

(12) In the third embodiment, by forming six section of the first ink introduction chamber S1 to the sixth ink introduction chamber S6 in the main body 227, the choke valve 221 is constituted. Hence, rather than forming the first ink introduction chamber S1 to the sixth ink introduction chamber S6 in separate members, respectively, the choke valve 221 is easily mounted on the flow concentration path 220. Further, since the first ink introduction chamber S1 to the sixth ink introduction chamber S6 are formed in one main body 227, the number of manufacturing processes for the choke valve 221 is reduced. Further, the valve unit 155 is reduced, and made compact and light-weight.

(13) In the third embodiment, six sections of biasing spring 261 confronting the first ink introduction chamber S1 to the sixth ink introduction chamber S6 are provided in the outside of the first film 228. Each biasing spring 261 presses the first film 228 to the side of the first ink introduction chamber S1 to the sixth ink introduction chamber S6. The biasing spring 261 has sufficient biasing force to maintain the first film 228 in a state of not abutting against the protruding portion 240 when the ink is supplied in a pressurized state to the first ink introduction chamber S1 to the sixth ink introduction chamber S6. Further, the biasing spring 261 has a biasing force amount to allow the first film 228 to abut against the protruding portion 240 when the ink is supplied in a non-pressurized state to the first ink introduction chamber S1 to the sixth ink introduction chamber S6. Hence, when the ink cartridge 23 is taken out from the holder 150, the biasing spring 261 allows the first film 228 to abut against the protruding portion 240, thereby reliably blocking the communication hole 242. As a result, in a non-mounting state of the ink cartridge 23, the ink stagnated in the ink flow path of the downstream of the communication hole 242 from the ink supply needle 174 of the holder 150 is prevented from leaking.

Fourth Embodiment

Figure 23:
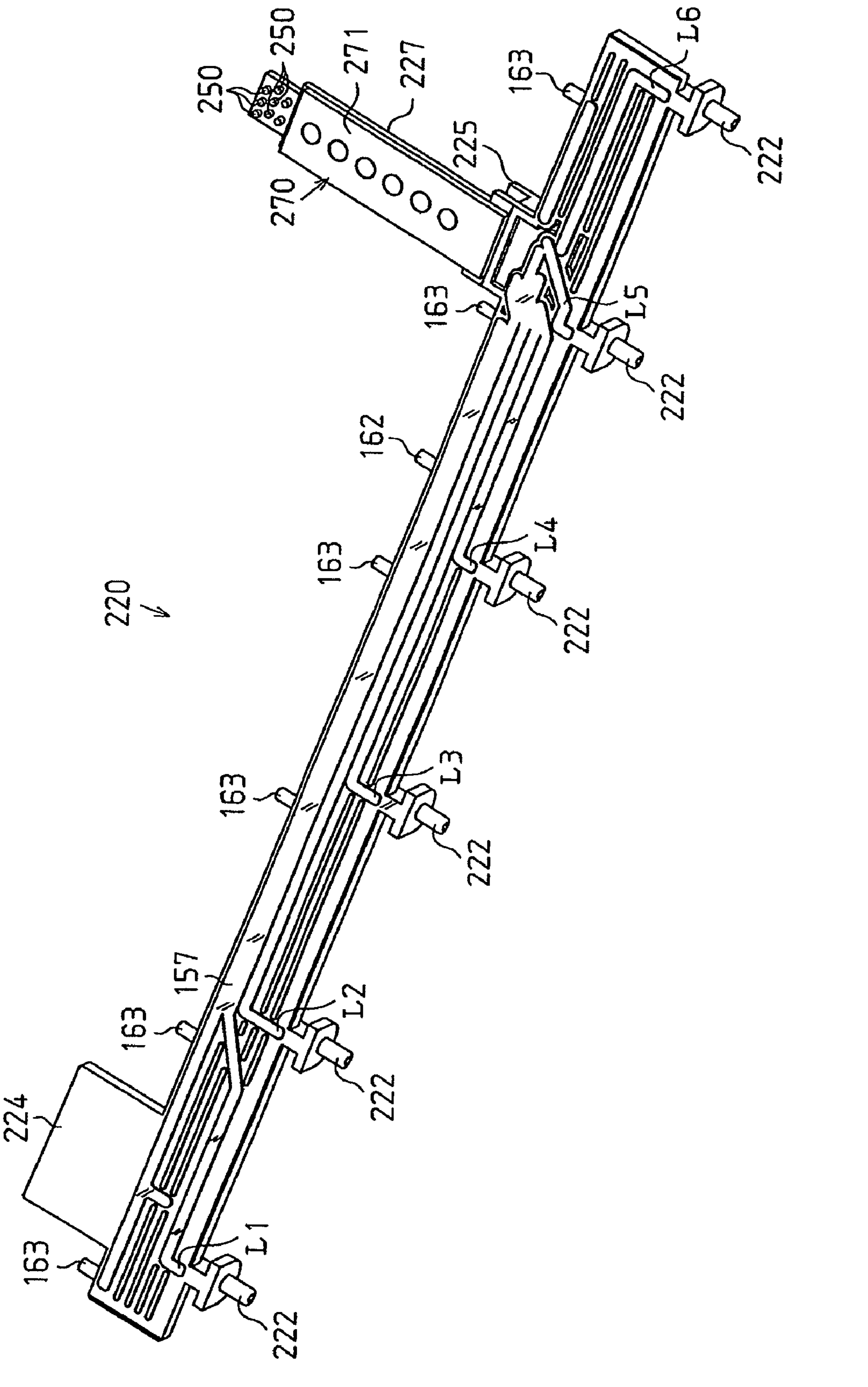
FIG. 23 is a perspective view of a flow concentration path in a fourth embodiment.
Figure 24:
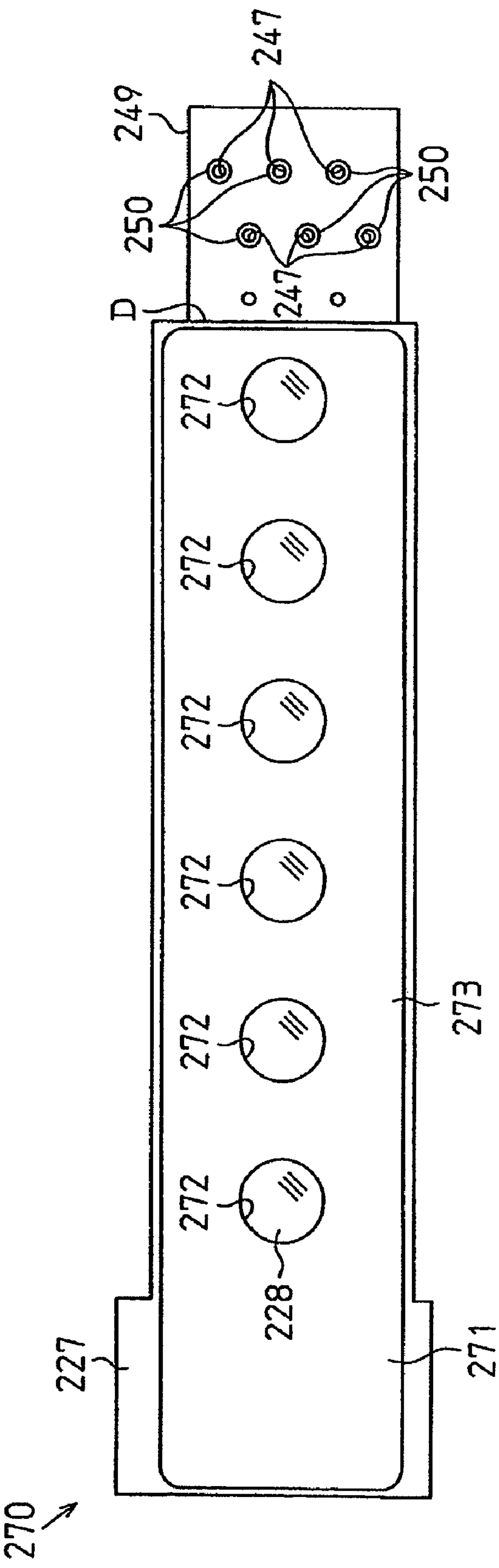
FIG. 24 is a top view of a choke valve.
Figure 25:
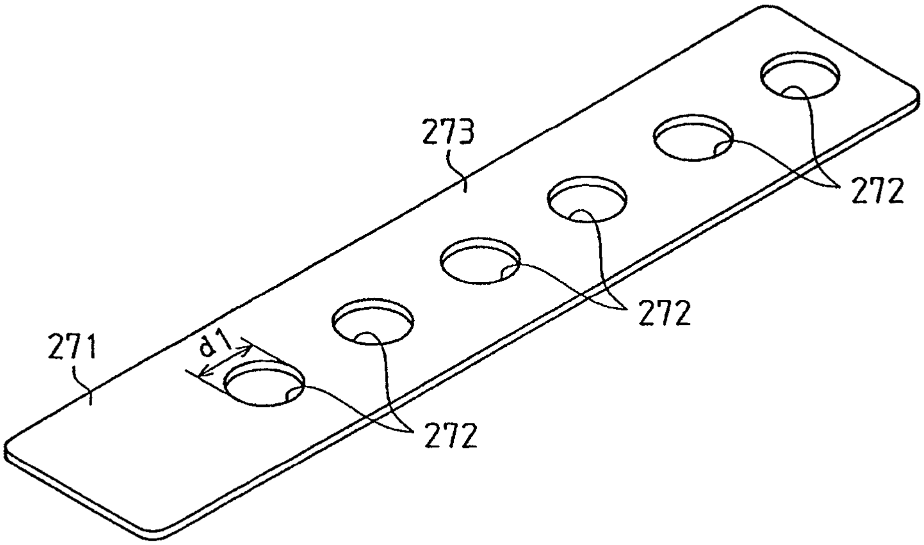
FIG. 25 is a perspective view of a regulating plate of the choke valve.
Figure 26:
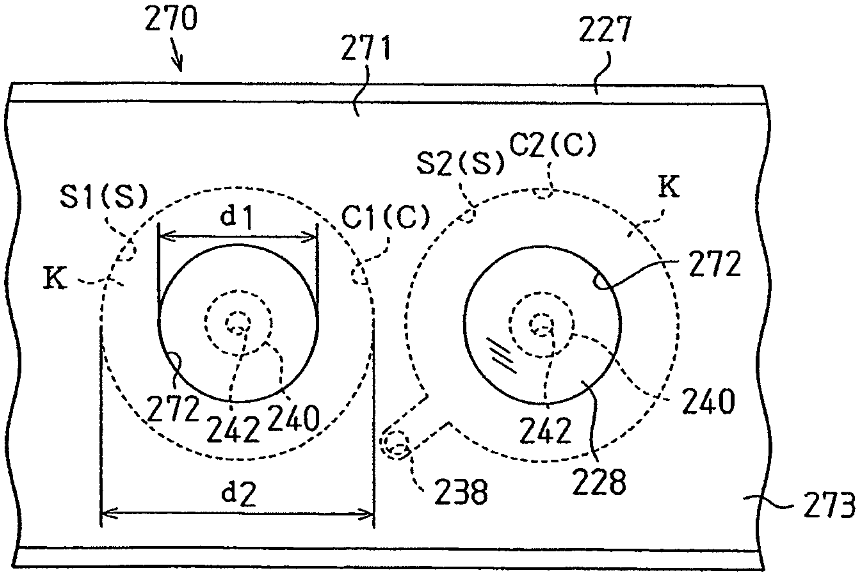
FIG. 26 is an essential part, top view of the choke valve.

Next, a fourth embodiment according to the present invention will be described according to FIGS. 23 to 30. Since the fourth embodiment has a constitution where the choke valve 221 of the third embodiment alone is changed, the detailed description of the like parts will be omitted. FIG. 23 is a perspective view of a flow concentration path 220, and FIG. 24 is a top view of a choke valve 270 of the present embodiment. FIG. 25 is a perspective view of a regulating plate 271 constituting the choke valve 270, and FIG. 26 is an explanatory drawing for explaining the essential portions of the choke valve 270. Further, FIGS. 27 to 30 are essential part cross-sectional views for explaining the operation of the choke valve 270.

As shown in FIG. 23, a valve side connecting portion 225 of the flow concentration path 220 is connected to the choke valve 270 of the present embodiment. The choke valve 270 comprises the same main body 227 as that of the third embodiment and the first and second films 228 and 229 (see FIG. 22). Further, as shown in FIG. 24, the choke valve 270 further comprises the regulating plate 271 as regulating means provided on the main body 227.

As shown in FIG. 25, the regulating plate 271 comprises a long metal plate. Further, the regulating plate 271 is penetrated with six permissive holes 272 as lined up in a row. Each permissive hole 272 is formed in a circular shape, and its inner diameter, as shown in the permissive hole 272 at the left end in FIG. 25, becomes d1 in inner diameter. Further, from among the regulating plates 271, the portion where the permissive hole 272 is not formed becomes a blocked portion 273.

Figure 27:
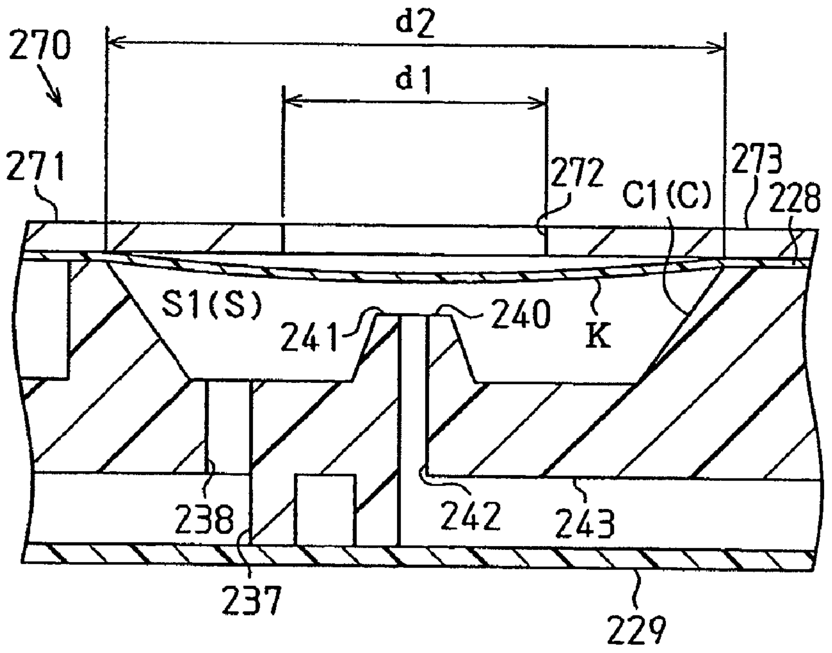
FIG. 27 is an essential part, cross-sectional view of the choke valve.

When the regulating plate 271 is mounted on the main body 227, as shown in FIG. 24, one end in a lateral direction of the regulating plate 271 is positioned so as to match a position of a step portion D formed at the side of the tube connecting portion 249 of a main body 227, and is fixed to a first film 228 by adhesive agent and the like. Then, as shown in FIGS. 26 and 27, the permissive hole 272 is arranged inward of the outer periphery of an opening sealing portion K on a circular portion (hereinafter, referred to as an opening sealing portion K) of the first film 228 as a flexible region which seals the opening of the first to sixth recess portions C1 to C6. Further, when the regulating plate 271 is mounted on the main body 227, an upper side groove 235 (see FIG. 20) sealed by the first film 228 is also blocked by the blocking portion 273 of the regulating plate 271. It is to be noted that, when the first to sixth recess portions C1 to C6 are described without making any distinction among them, they will be simply described below as a recess portion C.

As shown in FIGS. 26 and 27, the opening sealing portion K has a diameter d2 larger than the inner diameter d1 of the permissive hole 272. Hence, when the regulating plate 271 is mounted on the main body 227, the regulating plate 271 is in a state of covering the peripheral edge portion of the opening sealing portions K constituting the first to sixth ink introduction chambers S1 to S6. By arranging the permissive hole 272 of the regulating plate 271 in the central portion of each opening sealing portion K, the central portion is in a state of being not covered by the regulating plate 271. It is to be noted that, when the first to sixth ink introduction chambers S1 to S6 are described without making any distinction among them, they will be simply described below as an ink introduction chamber S.

Figure 30:
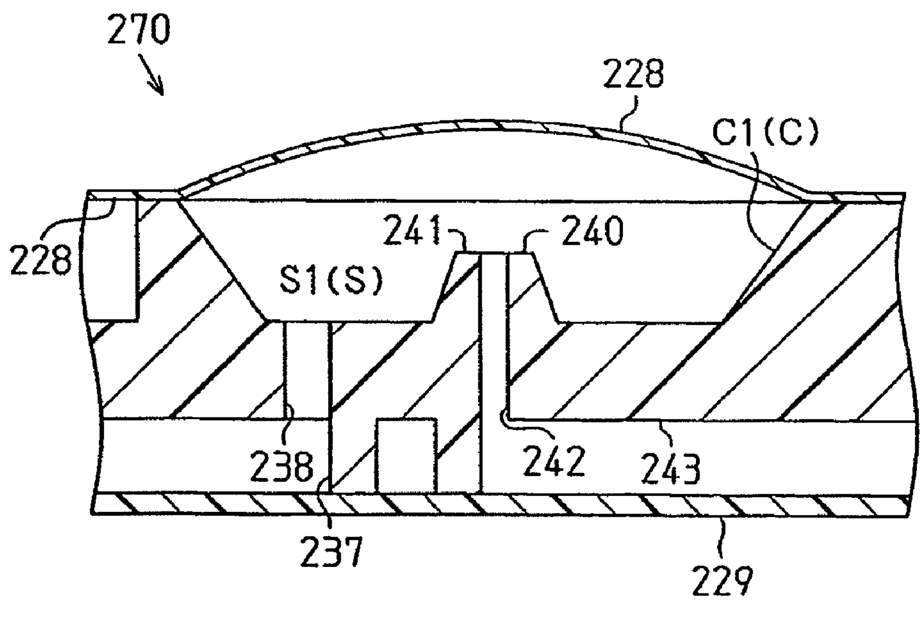
FIG. 30 is an explanatory drawing showing the case where the regulating plate is not provided on the choke valve.

The opening sealing portion K constituting each ink introduction chamber S is displaced according to the pressure difference between the inside and the outside of the ink introduction chamber S. For example, as shown in FIG. 30, in a case where the choke valve 270 is not provided with the regulating plate 271, when the ink is flowed into each ink introduction chamber S in a pressurized state by the driving of the pressure pump 25, the opening sealing portion K receives a force (upward in FIG. 30) to increase the volume of the ink introduction chamber S. When the amount of ink within the ink introduction chamber S flows above a predetermined amount, and the internal pressure increases above a predetermined value, the whole opening sealing portion K is displaced upward as shown in FIG. 30.

Figure 28:
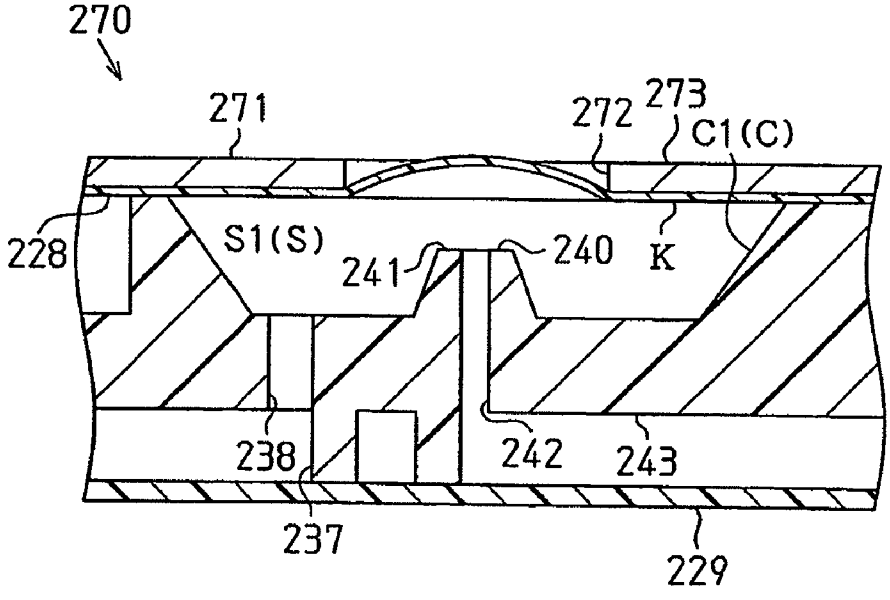
FIG. 28 is an essential part, cross-sectional view showing the operating state of the choke valve.

Meanwhile, the opening sealing portion K of the present embodiment is partially displaced by the pressure difference between the inside and the outside of the ink introduction chamber S. For example, when the ink flows above the predetermined amount into the ink introduction chamber S and the internal pressure of the ink introduction chamber becomes equal to or more than the predetermined value, the opening sealing portion K receives a force in a direction (upward in FIG. 27) to increase the volume of the ink introduction chamber S. At this time, as shown in FIG. 28, the opening sealing portion K is regulated for upward displacement in its peripheral edge portion by the regulating plate 271, and therefore, bulging (displacement) as a whole is prevented. Furthermore, since the central portion of the opening sealing portion K is allowed to displace upward by the arrangement of the permissive hole 272, it is in a state of being slightly displaced to the permissive hole 272. That is, when the ink is introduced into the ink introduction chamber S in a pressurized state, the displacement of the whole opening sealing portion k is regulated by the blocking portion 273 of the regulating plate 271. Moreover, by allowing the central portion alone of the opening sealing portion K to circularly bulge through the permissive hole 272, the pressure within the ink introduction chamber S is prevented from being in a highly pressurized state to cause breakage of the first film 228.

Figure 29:
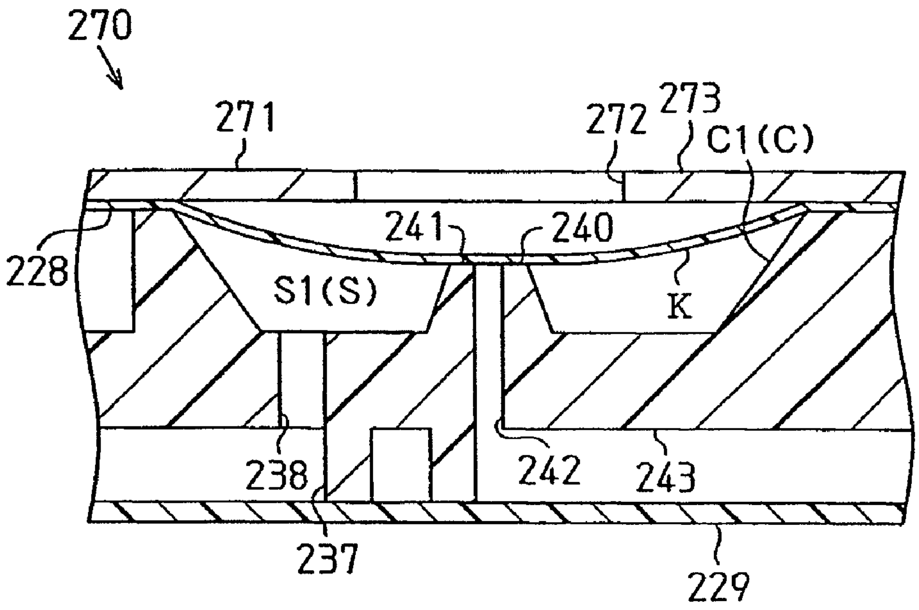
FIG. 29 is an essential part, cross-sectional view showing another operating state of the choke valve.

In the meanwhile, when the ink within the ink introduction chamber S is not more than the predetermined amount by the driving of a tube pump 26*e* and the like, and the inner pressure of the ink introduction chamber S is reduced to lower than the predetermined value, as shown in FIG. 29, the opening sealing portion K is flexed in a direction to reduce the volume of the ink introduction chamber S. As a result, the opening sealing portion K abuts against the upper surface 241 of the protruding portion 240 formed in the ink introduction chamber S, respectively, and blocks the flow of the ink to a communication hole 242. In FIG. 27, the position of the opening sealing portion K with no pressure difference between the inside and the outside of the ink introduction chamber S is shown. Further, as shown in FIG. 27, the first film 228 is not fixed to the main body 227 in a state of having no slackness at all, but in such a manner that the opening sealing portion K can bend within the ink introduction chamber S.

Next, the operation of the choke valve 270 will be described with the choke cleaning as an example. Before starting the choke cleaning, the opening sealing portion K constituting the ink introduction chamber S of the choke valve 270, as shown in FIG. 27 or 28, is at least in a state of not blocking the communication hole 242. At this time, when the ink flows above the predetermined amount into the ink introduction chamber S, as shown in FIG. 28, the central portion alone of the opening sealing portion K bulges, and the peripheral edge portion is regulated for upward movement by the regulating plate 271. As a result, the opening sealing portion K constituting each ink introduction chamber S is in a state of being regulated for upward displacement to increase the volume of the ink introduction chamber S by the regulating plate 271, and therefore, the displacement is small as a whole.

When the choke cleaning is started, a CPU 111 (see FIG. 9) stops the driving of a pressure pump motor 125 (see FIG. 9) according to a choke cleaning program, and at the same time, drives a cap lifting motor 126 (see FIG. 9). Then, the delivery of the air from a pressure pump 25 (see FIG. 12) is stopped, and the cap 26*a* (see FIG. 3) seals the nozzle surface.

Further, the CPU 111 advances to a drawing step, and drives a tube pump motor 127 (see FIG. 9), and accumulates negative pressure within the cap 26*a*. As a result, the ink is drawn through a recording head 148, and the ink within a first pressure chamber 203 and a second pressure chamber (not shown) begins to be reduced. The pressure within the first pressure chamber 203 and the second pressure chamber decreases to below the predetermined pressure, so that, similarly to the printing in the second embodiment, a second film member 189 is flexed, and a first valve member 188 and a second valve member (not shown) begin to rotate.

Then, the ink within the ink flow path of an ink supply tube 152 (see FIG. 13) in the upstream side of each valve unit 155 flows within the valve unit 155. At this time, since the air from the pressure pump 25 is in a state of not being delivered, the ink within the first to the sixth ink introduction chambers S1 to S6 provided in the upstream side of the ink supply tube 152 also begins to be gradually reduced.

When the pressure within each ink introduction chamber S is reduced lower than the predetermined pressure, each opening sealing portion K of the first film 228 receives a force to approach the protruding portion 240 within each ink introduction chamber S. At this time, as described above, before each opening sealing portion K is displaced to the protruding portion 240, the opening sealing portion K is in a position not to largely isolate from the upper surface 241 of the protruding portion 240 by the regulation of the blocking portion 273 by the regulating plate 271. By so doing, in the choke cleaning, the ink drawing amount from the ink introduction chamber S until the opening sealing portion K is abutted against the protruding portion 240 is decreased. As a result, the time required from starting the driving of the tube pump 26*e* until the opening sealing portion K is abutted against the upper surface 241 of the protruding portion 240 is shortened.

When the opening sealing portion K abuts against the upper surface 241 of the protruding portion 240, the communication hole 242 is blocked. As a result, the flow of ink from the first to sixth ink introduction chambers S1 to S6 to the communication hole 242 is blocked. In this state, by allowing the suction operation to be continued by the tube pump 26*e*, with each ink introduction chamber S as a boundary, negative pressure is accumulated in the downstream side thereof. The CPU 111 measures the driving time of the tube pump motor 127 according to a choke cleaning program, and when a predetermined time elapses, it advances to a pressure increasing step, and starts the driving of the pressure pump motor 125. The CPU 111 completes the processing of the choke cleaning program when the driving of the pressure pump motor 125 is started.

As a result, the delivery of the air from the pressure pump 25 is started, and the ink from the ink cartridge 23 is supplied in a pressurized state. The ink supplied in a pressurized state flows from the upstream side of each ink introduction chamber S instantly to eliminate the negative pressure accumulated in the downstream side of each ink introduction chamber S. Then, the ink speeds up instantaneously and flows into each ink introduction chamber and to the downstream side of each ink introduction chamber S. As a result, the bubbles and impurities stagnated in the section downstream of each ink introduction chamber S are discharged instantly together with the ink from the nozzle of the recording head 148, thereby performing the so-called choke cleaning.

Consequently, according to the fourth embodiment, in addition to (9) of the second embodiment and (10) to (12) of the third embodiment, the following effects related to prevention of leakage are obtained.

(14) In the fourth embodiment, there is provided the regulating plate 271, which is provided for the choke valve 270, and regulates the displacement in a direction to reduce resistance of the flow path (a direction to increase the volume of the ink introduction chamber S), for the first film 228 flexed by the pressure difference between the inside and outside of each ink introduction chamber S. Consequently, in the choke cleaning, when the flow path resistance is increased by flexing the opening sealing portion K of the first film 228, since the opening sealing portion K is regulated in advance for displacement in a direction to decrease the flow path resistance by the regulating plate 271, the range of the displacement of the opening sealing portion K becomes small. That is, the opening sealing portion K in the choke cleaning promptly displaces to a position (a position abutting against the upper surface 241 of the protruding portion 240) required for the cleaning, and therefore, the time required until the flow path of the downstream side of the ink introduction chamber S is blocked is shortened, thereby improving the responsiveness of the opening sealing portion K to the drive start of the tube pump 26*e*.

(15) In the fourth embodiment, the regulating plate 271 is provided opposite to the ink introduction chamber S of the first film 228, and by blocking the peripheral edge portion of the opening sealing portion K from the outside, the displacement of the opening sealing portion K to the outside is regulated. Hence, the regulating plate 271 is provided from above the opening sealing portion K, and the displacement thereof is prevented from leaking by blocking its peripheral edge portion alone, and therefore, it is prevented from leaking simply constituted. Further, since the regulating plate 271 is provided outside of the ink flow path, contamination of the ink and disturbance of the ink flow is prevented from leaking.

(16) In the fourth embodiment, the regulating plate 271 blocks the peripheral edge portion of the opening sealing portion K, and is formed by the plate blocking portion 273 for regulating the displacement in a direction to enlarge the volume of the ink introduction chamber S and the blocking portion 273, and comprises the permissive hole 272 for allowing the displacement of the central portion of the opening sealing portion K. Hence, while regulating the displacement of the opening sealing portion K by the blocking portion 273, the displacement of the central portion of the opening sealing portion K is partially allowed by the permissive hole 272, so that the breakage of the first film 228 by that pressure is prevented in a case where the pressure within the ink introduction chamber S becomes high pressure. Further, making the blocking portion 273 in a plate shape simplifies the constitution.

(17) In the fourth embodiment, six sections of the first to sixth ink introduction chambers S1 to S6 are provided, and the main body 227 fixed with the first and second films 228 and 229 on the upper surface and the lower surface thereof is provided with the regulating plate 271. The regulating plate 271 comprises the blocking portion 273 for blocking the peripheral edge portion of the opening sealing portion K from among each opening sealing portion K constituting the first to sixth ink introduction chambers S1 to S6 and the permissive hole 272 for allowing the displacement of the central portion of each opening sealing portion K, respectively. Hence, there is no need to provide the regulating plate for regulating the displacement of each opening sealing portion K separately for each opening sealing portion K. Hence, an increase in the number of steps for manufacturing and steps for assembling is reduced.

Incidentally, the present embodiment may be changed as follows.

In the first embodiment, the first and second ink introduction chambers 84*a* and 84*b* of the valve unit 21 are formed by the first film member 45, the first and second square recess portions 61*a* and 61*b*, and the first and second spherical recess portions 63*a* and 63*b*. The first and second step Surfaces 65*a* and 65*b* formed between the first and second square recess portions 61*a* and 61*b* and the first and second spherical recess portions 63*a* and 63*b* are provided with the first and second filters 43*a* and 43*b*.

The first film member 45 abuts against or is isolated from the first and second filters 43*a* and 43*b*, so that the flow path resistance is changed. If the flow path resistance is changed by the flexing of the first film member 45, the first and second ink introduction chambers 84*a* and 84*b* may be changed so as to be of other constitutions. For example, the first and second ink introduction chambers 84*a* and 84*b* may be configured without the first and second filters 43*a* and 43*b*.

Figure 31:
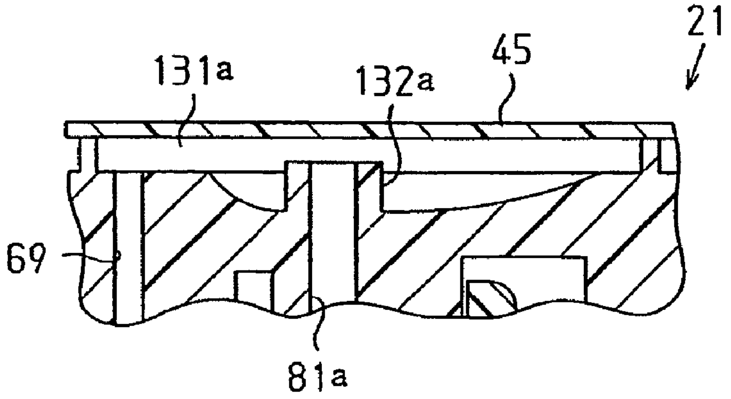
FIG. 31 is a partial cross-sectional view of the valve unit in a first modification.
Figure 32:
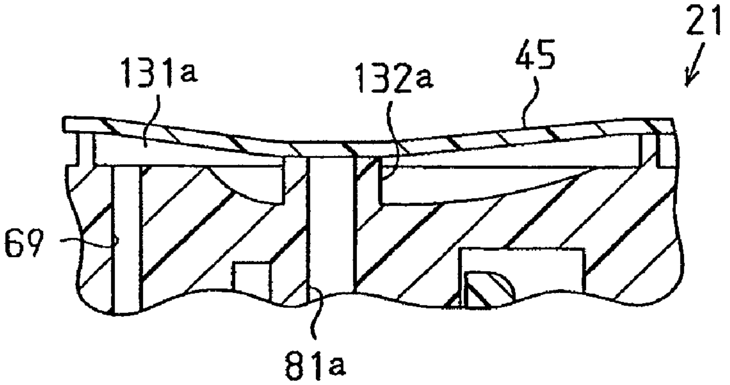
FIG. 32 is a cross-sectional view showing the operating state of the valve unit in the first modification.

For example, similarly to the second to fourth embodiments, as shown in FIG. 31, a first ink introduction chamber 131*a* may comprise an annular projecting portion 132*a* provided so as to surround a communication hole 81*a*. By so doing, as shown in FIG. 32, when the choke cleaning is performed, the first film member 45 is flexed inside so as to abut against the annular projecting portion 132*a*, and the communication hole 81*a* is reliably sealed. As a result, more definite choke cleaning is performed. The second ink introduction chamber may be similarly changed.

In the first, second and fourth embodiments, the first film member 45 and the film 157 are flexed in a direction (in a direction to increase the flow path resistance) to reduce the volume of the first and second ink introduction chambers 84*a* and 85*b*, and the ink introduction chambers 178 and S when the pressure within the first and second introduction chambers 84*a* and 84*b*, and the ink introduction chambers 178 and S is reduced to lower than the predetermined pressure.

Figure 36:
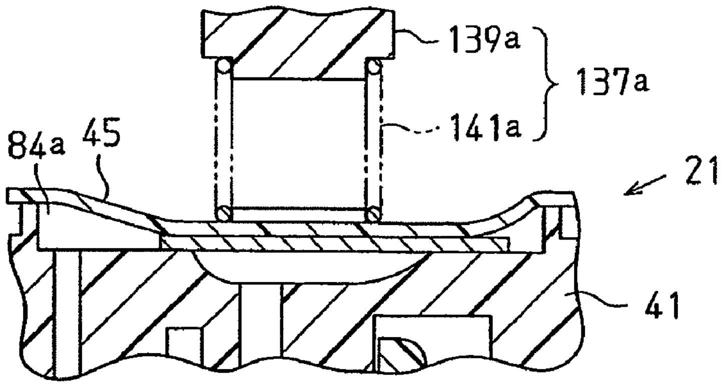
FIG. 36 is a partial cross-sectional view of the valve unit in a fourth modification.

As shown in FIG. 36, the valve unit 21 may be provided with biasing means 137*a* for biasing the first film member 45 (the film 157 and the first film 228) always in a direction to reduce the volume of the first ink introduction chamber 84*a* (the ink introduction chamber 178 and S). The biasing means 137*a* may comprise the flow path forming member 41, a fixed end portion 139*a* unmovable to the main body 156, and a coil spring 141*a* located between the fixed end portion 139*a* and the first film member 45.

According to this, unless the pressure pump 25 is driven, and the pressurized ink is supplied, the first film member 45 (the film 157 and the first film 228) is always maintained in a position to increase the flow path resistance within the first ink introduction chamber 84*a* (the ink introduction chambers 178 and S). As a result, for example, at the time of maintenance and the like of the ink jet recording apparatuses 11 and 145, when the driving of the pressure pump 25 is not stopped, the flow path resistance within the first ink introduction chamber 84*a* (the ink introduction chamber 178 and S) is maintained high as it is. Consequently, at the exchange time of the ink cartridge 23 and the like, leakage of the ink from the connecting portion and the like with the ink supply tubes 35 and 152 and the ink cartridge 23 is reduced. The second ink introduction chamber 84*b* may be similarly changed so as to be provided with the biasing means.

In the first embodiment, in the negative pressure accumulation of the choke cleaning, the first film member 45 abuts against the first and second filters 43*a* and 43*b*, so that the flow of the ink passing through the first and second filters 43*a* and 43*b* are blocked. If the flow path resistance is increased for the ink passing through the first and second filters 43*a* and 43*b*, the flow may be totally blocked.

Further, in the second embodiment, the film 157 abuts against the protruding portion 179 so as to block the communication hole 180. In the third and fourth embodiments, the first film 228 abuts against the protruding portion 240 so as to block the communication hole 242. If the flow path resistance is increased for the ink passing through the communication holes 180 and 242, the flow does not need to be totally blocked.

In the first embodiment, the first and second ink introduction chambers 84*a* and 84*b* are provided integrally with the valve unit 21 which is provided with the first and second pressure chambers 106*a* and 106*b* and the first and second valve members 49*a* and 49*b*. However, the first and second ink introduction chambers 84*a* and 84*b* may be provided so as to be isolated from the valve unit 21.

In the first, third and fourth embodiments, a seal material to block the communication holes 81*a* and 242 may be attached to the inner sides of the first film member 45, the second film member 51 and the first film 228, similarly to the second embodiment.

In the second embodiment, though each ink introduction chamber 178 of the film 157 is provided with the seal material 183, this material may be omitted. Further, in the third embodiment, though the outside of the first film 228 is provided with six sections of biasing spring 261 confronting the first ink introduction chamber S1 to the sixth ink introduction chamber S6, these springs may be omitted.

In the second to fourth embodiments, the undersides of the ink introduction chamber 178 and the first ink introduction chamber S1 to the sixth ink introduction chamber S6 are provided with the protrusion portions 179 and 240 penetrated with the communication holes 180 and 242. In addition to the above, the protrusion portions 179 and 240 may be omitted, and similarly to the first embodiment, the filter is accommodated into the recess portion, and the film 157 or the first film 228 is abutted against this filter, so that the ink passing through the filter may be blocked, thereby blocking the communication holes 180 and 242.

In the second to fourth embodiments, though the recess portion 177 and the first recess portion C1 to the sixth recess portion C6 comprise the inclined surfaces, and at the same time, form the undersides thereof in a flat surface shape, the shape thereof may be other than that, and for example, it may be spherical. Further, though the recess portion 177 and the first recess portion C1 to the sixth recess portion C6 are formed in a circular shape, similarly to the first embodiment, the shape thereof may be square and the like.

In the third and fourth embodiments, though the lengths D1 to D6 of the first ink flow path L1 to the sixth ink flow path L6 of the flow concentration path 220 are taken as the sizes of the length D1, the length D2, the length D4, the length D5 and the length D6 in order, the flow path may be formed other than in this order. Further, though the lengths M1 to M6 of the flow path from the introduction holes 234 of the choke valve 221 and 270 to the first ink introduction chamber S1 to the sixth ink introduction chamber S6 are taken as the length M1 to the length M6 in order, the flow path may be formed other than in this order. That is, the length of the whole ink flow path comprising the ink flow path of the flow concentration path 220 and the ink flow path of the choke valves 221 and 270 connected therewith may be equal.

In the third and fourth embodiments, although the choke valves 221 and 270 comprise six sections of the first ink introduction chamber S1 to the sixth ink introduction chamber S6, the number of ink introduction chambers may be any number more than one as long as the number is equal to the types of the ink to be used in the ink jet recording apparatus 145. Further, in a case where the ink jet recording apparatus uses one type of the ink and the like, the choke valve formed with one ink introduction chamber may be connected to the flow concentration path 220.

In the second to the fourth embodiments, the ink jet recording apparatus 145 is provided with the flow concentration paths 151 and 220, and these flow concentration paths 151 and 220 are formed integrally with the ink flow path and the air flow path. In addition to the above described, in the second embodiment, instead of the flow concentration path 151, the ink supply tube 35 and the air supply tube 39 similarly to the first embodiment may be provided. The connecting side of each ink cartridge 23 may be provided with the connecting portion formed with the ink introduction chamber 178, and this connection portion may be connected to one end of the ink supply tube 35. Further, in the third and fourth embodiments, instead of the flow concentration path 220, the ink supply tube 35 and the air supply tube 39 may be provided. In the midst of the ink supply tube 152 connecting between the valve unit 155 and the ink cartridge 23, the choke valves 221 and 270 may be provided.

Figure 37:
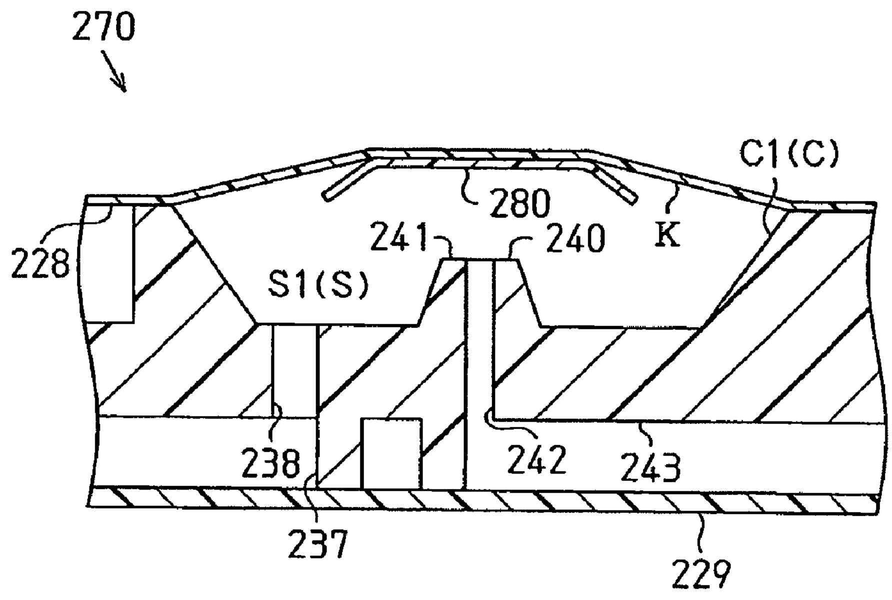
FIG. 37 is a partial cross-sectional view of the valve unit in a fifth modification.

In the fourth embodiment, the regulating means may be provided to the ink introduction chamber S of the first film 228. For example, as shown in FIG. 37, the pressure receiving plate 280 may be provided in the inner side of the opening sealing portion K constituting the ink introduction chamber S. A part of the pressure receiving plate 280 may be fixed to the inner side of the opening sealing portion K, and the other part may be hung down according to the gravity without fixing it to the opening sealing portion K. By so doing, the opening sealing portion K receives a force so as to be flexed to the ink introduction chamber S by the gravity of the pressure receiving plate 280, and the displacement in a direction to enlarge the volume of the ink introduction chamber S is regulated.

Figure 38:
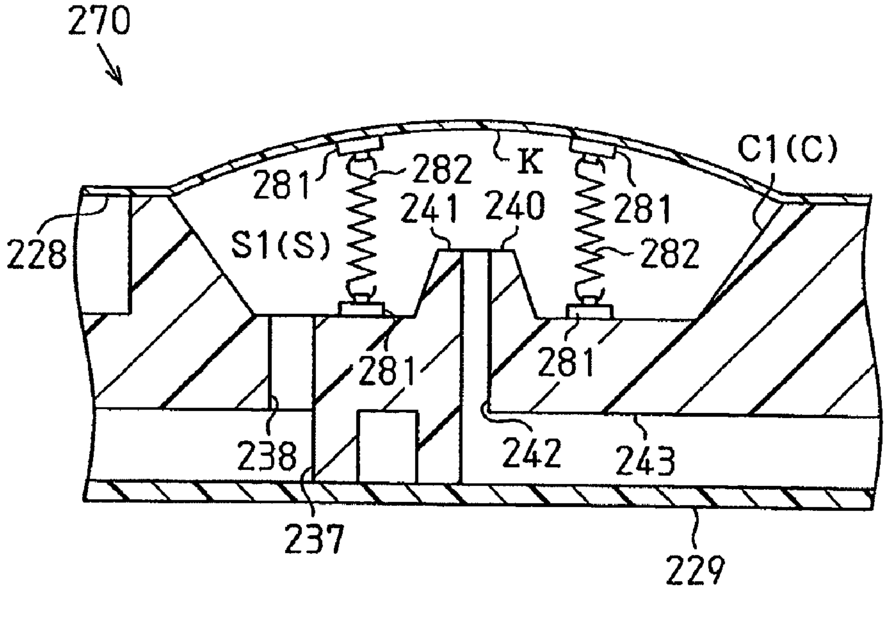
FIG. 38 is a partial cross-sectional view of the valve unit in a sixth modification.

Further, as shown in FIG. 38, elastic means as regulating means may be provided to the ink introduction chamber S of the first film 228. For example, two pairs of latch portion 281 may be provided in the inner side of the opening sealing portion K constituting the ink introduction chamber S and in the underside of the ink introduction chamber S, and the winding end of a tension spring 282 may be latched on each latch portion 281, respectively. An elastic force allowing the protruding portion 240 within the ink introduction chamber S to approach the opening sealing portion K may be provided by the tension spring 282. The elastic means is not limited to the tension spring, but may comprise an elastic member such as a rubber member and the like.

In the fourth embodiment, a compression spring for biasing the first film 228 to the ink introduction chamber S may be provided in the outside of the ink introduction chamber S. Further, regulating means may be provided, which comprises a surface which is not provided on the first film 228, but abuts against the opening sealing portion K only when the opening sealing portion K is bulged, and regulates the displacement in a direction to enlarge the opening sealing portion K.

In the fourth embodiment, the permissive hole 272 is not formed in the regulating plate 271, but may be formed in a simple plate shape. By so doing, for example, when the inside of the ink introduction chamber S is not highly pressurized to the extent that the first film 228 is broken, the time required until the opening sealing portion K blocks the communication hole 242 at the choke cleaning is shortened, so that the responsiveness as the choke valve is improved.

In the fourth embodiment, to regulate the displacement of the opening sealing portion K constituting a plurality of ink introduction chambers S, although the regulating plate 271 is provided with a plurality of permissive holes 272, similarly to the second embodiment, each ink introduction chamber S separately provided may be provided with the regulating plate provided with the regulating hole.

In the fourth embodiment, although the regulating plate 271 is made adaptable to the ink introduction chambers of the second and third embodiments, the constitution may be such that the plate 271 is provided in the valve unit 21 of the first embodiment. That is, the first and second ink introduction chambers 84*a* and 84*b* of the valve unit 21 are provided with the regulating plate provided with the regulation hole, respectively, and the first film member 45 may be regulated to displace in a direction for isolation from the first and second filters 43*a* and 43*b*.

In the fourth embodiment, although six sections of permissive hole equal to each opening sealing portion K are formed on the regulating plate 271, the permissive hole may be not less than six sections. For example, the regulating plate 271 may comprise a plurality of permissive holes for one opening sealing portion K. By so doing, the breakage of the first film 228 is more reliably prevented.

Figure 33:
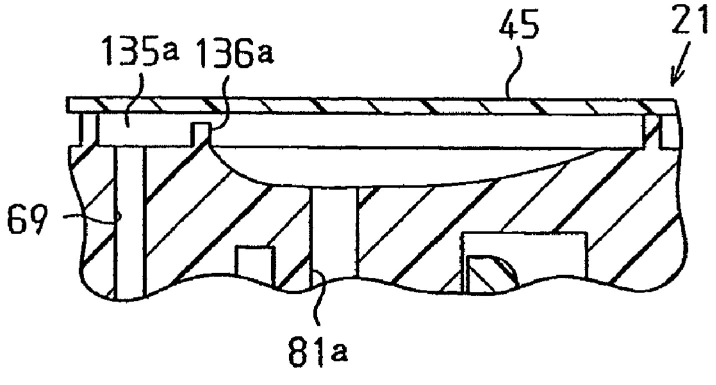
FIG. 33 is a partial cross-sectional view of the valve unit in a second modification.
Figure 34:
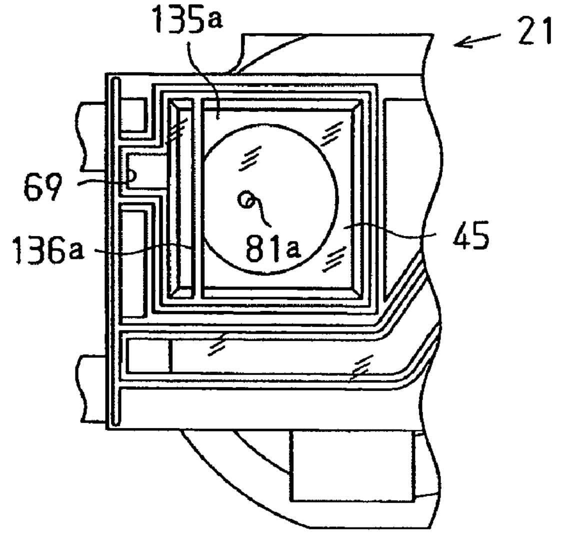
FIG. 34 is a partial side view of the valve unit in a third modification.
Figure 35:
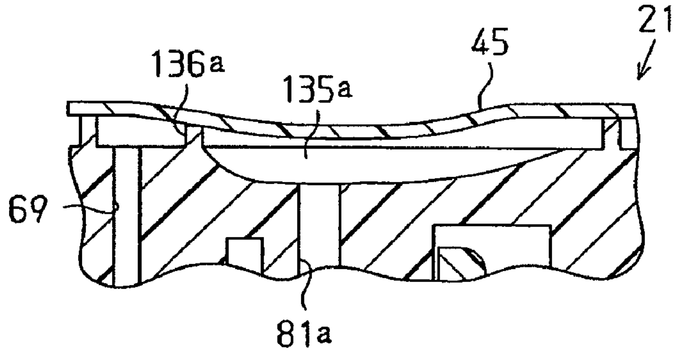
FIG. 35 is a cross-sectional view showing the operational state of the valve unit in the third modification.

In each of the above described embodiments, as shown in FIGS. 33 and 34, a first ink introduction chamber 135*a* (the ink introduction chamber 178 and the first ink introduction chamber S1 to the sixth ink introduction chamber S6) may be provided with a rib 136*a*. This rib 136*a* does not abut against the first film member 45 (the film 157 and the first film 228) at the time of printing. The rib 136*a*, as shown in FIG. 35, abuts against the first film member 45 (the film 157 and the first film 228) at the pressure accumulation time by the choke cleaning, and is provided so as to block the flow between the communication hole 69 and the communication hole 81*c* (the communication holes 180 and 242). The second ink introduction chamber may be changed similarly.

Fifth Embodiment

Next, a fifth embodiment according to the present invention will be described in detail according to FIGS. 39 to 41 by focusing on points of difference with the first embodiment.

Figure 40:
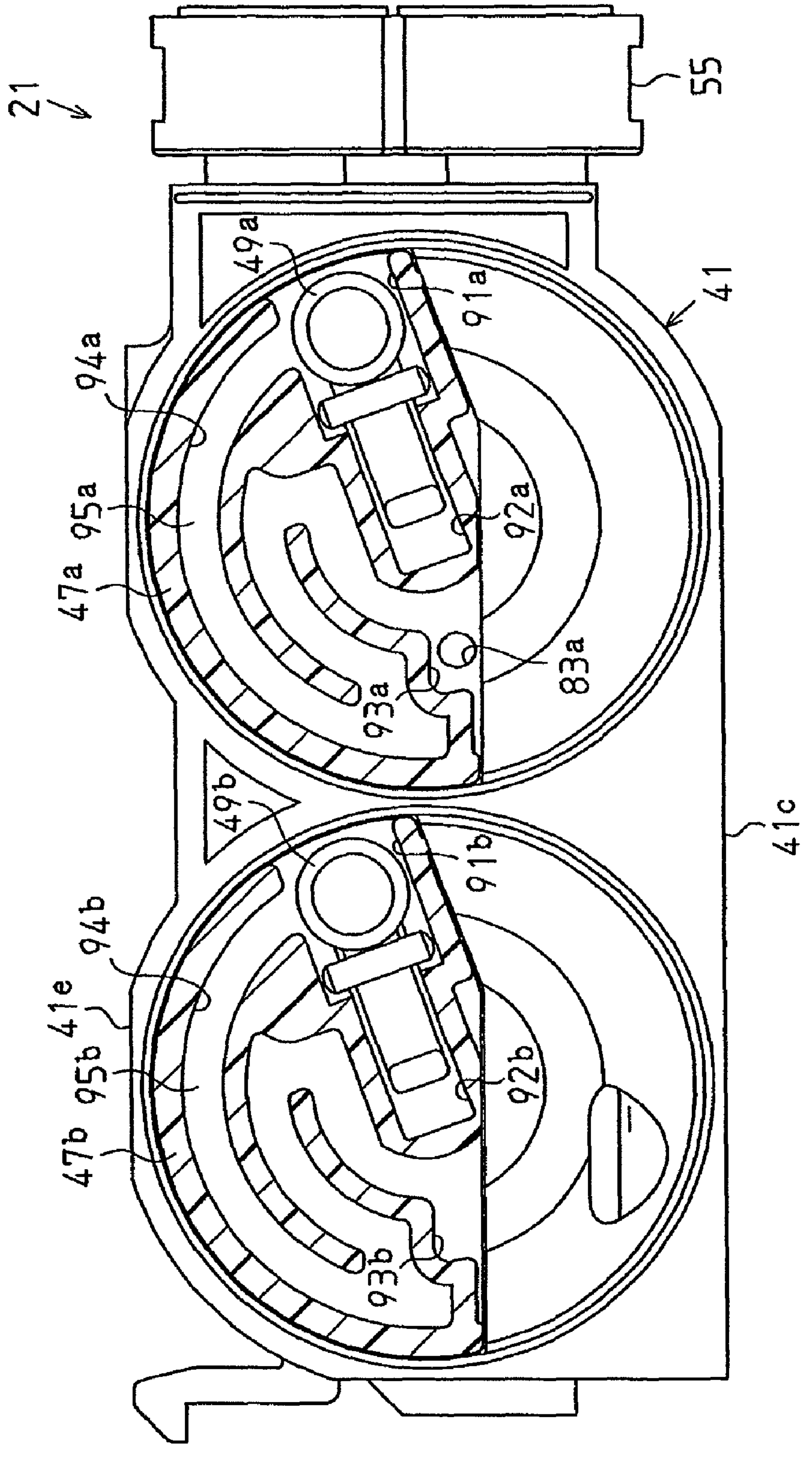
FIG. 40 is a partial cross-sectional view of the valve unit.

As shown in FIG. 40, first and second fitting members 47*a* and 47*b* are formed with first and second sigmoid grooves 94*a* and 94*b*, respectively. First and second sigmoid flow paths 95*a* and 95*b* are formed by the first and second engaging recess portions 77*a* and 77*b* of the flow path forming member 41, respectively. In the present embodiment, a bubble non-trap flow path is formed by the first and second sigmoid flow paths 95*a* and 95*b*.

One ends of the first and second sigmoid grooves 94*a* and 94*b* communicate with the first and second ink inflow holes 91*a* and 91*b*, and the other ends thereof communicate with the first and second ink outflow holes 93*a* and 93*b*. Consequently, with respect to the first and second sigmoid flow paths 95*a* and 95*b*, the one ends thereof communicate with the first and second ink inflow holes 91*a* and 91*b*, and the other ends thereof communicate with the first and second ink outflow holes 93*a* and 93*b*.

Further, the flow path cross-sectional areas of the first and second sigmoid flow paths 95*a* and 95*b* are formed so as to be sizes capable of securing the flow speed of the ink to the extent that the bubble contained in the ink is not stagnated within the first and second sigmoid flow paths 95*a* and 95*b*. That is, they are formed so as to be relatively small flow path cross-sectional areas.

Figure 39:
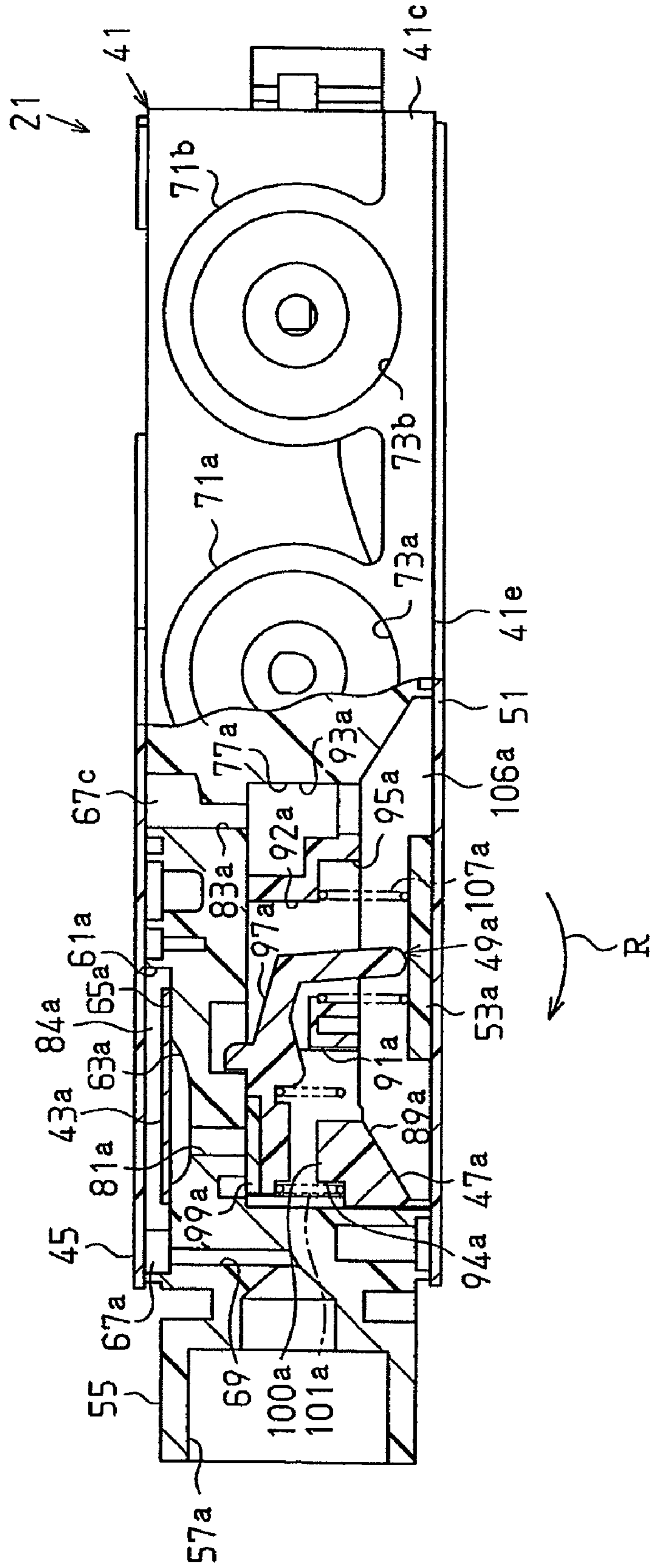
FIG. 39 is a partial cross-sectional view of the valve unit in a fifth embodiment.

As shown in FIG. 39, a second film member 51 is formed in substantially the same shape by the same material as that of the first film member 45, and is hot-welded to an upper surface 41*e* of the flow path forming member 41. At this time, the openings of first and second large recess portions 89*a* and 89*b* are sealed by the second film member 51, so that the second film member 51 is hot-welded to the flow path forming member 41. In this way, as shown in FIG. 39, first and second pressure chambers 106*a* and 106*b* are formed by the second film member 51 and the first and second large recess portion 89*a* and 89*b*. That is, a part of the wall surfaces of the first and second pressure chambers 106*a* and 106*b* is formed by the second film member 51. In the present embodiment, a bubble trap flow path, a bubble accumulator, and a liquid reservoir chamber comprise the first and second pressure chambers 106*a* and 106*b*.

Because of the above described constitution, as shown in FIG. 39, in the valve unit 21 of the present embodiment, when the ink flows into a first ink introduction hole 57*a*, the flowed ink begins to flow into a first ink inflow hole 91*a* through a communication hole 69, a first flow path 85*a*, a first ink introduction chamber 84*a*, and a communication hole 81*a*. The ink flowed into the first ink inflow hole 91*a*, from among two flow paths of the first sigmoid flow path 95*a* and the first pressure chamber 106*a*, passes through at least one of them, and flows out to the ink outflow hole 93*a*, and is supplied to a recording head 20 (see FIG. 1) from a first ink outflow 93*a* through a communication hole 83*a*, a third flow path 85*c*, and a first ink discharge hole 73*a*.

Further, similarly, in the valve unit 21 of the present embodiment, when the ink flows into a second ink introduction hole 57*b*, the flowed ink begins to flow into the second ink inflow hole 91*b* through the communication hole, the second flow path 85*b*, the second ink introduction chamber 84*b*, and a communication hole 81*b*. The ink flowed into the second ink inflow hole 91*b*, from among two flow paths of the second sigmoid flow path 95*b* and the second pressure chamber 106*b*, passes through at least one of them, and flows out to the second ink outflow hole 93*b*, and is supplied to the recording head 20 from the second ink outflow hole 93*b* through the communication hole 83*b* and a second ink discharge hole 73*b*.

In the present embodiment, the liquid supply path comprises each flow path from the first and second ink introduction holes 57*a* and 57*b* to the recording head 20.

Further, the second film member 51 is flexed by the pressure difference between the inside and the outside of the first and second pressure chambers 106*a* and 106*b*. That is, the second film member 51 is flexed in a direction to reduce the volume of the first and second pressure chambers 106*a* and 106*b* when the pressure within the first and second pressure chambers 106*a* and 106*b* are reduced to lower than the predetermined pressure.

In the present embodiment, depending on the flexing degree of the second film member 51, the volume of the first and second pressure chambers 106*a* and 106*b* changes between a first volume V1 to a second volume V2. The first volume V1 is larger than the second volume V2.

Accompanying the change of the volume in the first and second pressure chambers 106*a* and 106*b*, the flow path resistance given by the ink passing through the first and second pressure chambers 106*a* and 106*b* also changes. In the present embodiment, accompanying the change of the volume in the first and second pressure chambers 106*a* and 106*b* from the first volume V1 to the second volume V2, the flow path resistance changes between the intervals from a first flow path resistance value K1 to a second flow path resistance value K2. The first flow path resistance value K1 is smaller than the Second flow path resistance value K2.

In other words, the larger the degree of the flexing in the second film member 51 as well as the smaller the volume of the first and second pressure chambers 106*a* and 106*b*, the larger the flow path resistance.

Further, in the present embodiment, the first and second sigmoid flow paths 95*a* and 95*b* have the magnitude of the flow path resistance given to the ink formed so as to become a magnitude between the first flow path resistance value K1 and the second flow path resistance value K2. Consequently, when the degree of the flexing in the second film member 51 is small, and the volume of the first and second pressure chambers 106*a* and 106*b* is close to the first volume V1, the flow path resistance provided to the ink by the first and second pressure chambers 106*a* and 106*b* approaches the first flow path resistance value K1, and becomes smaller than the flow path resistance provided to the ink by the first and second sigmoid flow paths 95*a* and 95*b*. Consequently, in such a case, the ink flowed into the first and second ink inflow holes 91*a* and 91*b* positively passes through the first and second pressure chambers 106*a* and 106*b*, and flows out to the first and second ink outflow holes 93*a* and 93*b*.

Further, when the degree of the flexing in the second film member 51 is large, and the volume of the first and second pressure chambers 106*a* and 106*b* approaches the second volume V2, the flow path resistance provided to the ink by the first and second pressure chambers 106*a* and 106*b* approaches the second flow path resistance value K2, and becomes larger than the flow path resistance provided to the ink by the first and second sigmoid flow paths 95*a* and 95*b*. Consequently, in such a case, the ink flowed into the first and second ink inflow holes 91*a* and 91*b* positively passes through the first and second pressure sigmoid flow paths 95*a* and 95*b*, and flows out to the first and second ink outflow holes 93*a* and 93*b*.

That is, the distribution of the flow amount when the ink flowed into the first and second ink inflow holes 91*a* and 91*b* flows into the first and second pressure chambers 106*a* and 106*b* and the first and second sigmoid flow paths 95*a* and 95*b* is determined by the degree of the flexing of the second film member 51. The larger the flexing of the second film member 51, the more the distribution factor of the ink flowing into the first and second sigmoid flow paths 95*a* and 95*b* is increased.

Next, the operation of the ink jet recording apparatus 11 will be described.

First, the operation of the ink jet recording apparatus 11 at the time of normal printing will be described. At the time of normal printing, the ink is in a state of filling from an ink pack 32 to the recording head 20 for each color, and a pressure pump 125 is in a state of being driven through a second motor drive circuit 119 by a CPU 111, and the ink within the ink pack 32 is maintained in a pressurized state by pressurized air introduced into a gap 33 of an ink cartridge 23. Consequently, during printing, the ink is in a state of being supplied in a pressurized state from the ink cartridge 23 to a valve unit 21.

The valve unit 21 is supplied with the ink introduced in a pressurized state from the ink pack 32 for each color. As shown in FIG. 39, for example, the ink supplied to the first ink introduction chamber 84*a* through the first ink introduction hole 57*a* is maintained in a state of having high pressure. Consequently, the first film member 45 of the valve unit 21 is maintained in a state of being not flexed. As a result, the ink supplied into the first ink introduction hole 57*a* is in a state of being capable of passing through a first filter 43*a*.

The first pressure chamber 106*a* is in a state of being filled with the ink, and a first pressure receiving plate 53*a* is isolated from a first large recess portion 89*a*, and is in a state of having the volume close to the first volume V1. Consequently, the flow path resistance provided to the ink by the first pressure chamber 106*a* is a value close to the first flow path resistance value K1, and is smaller than the flow path resistance given to the ink by the first sigmoid flow path 95*a*. As a result, the ink flowing into the first ink inflow hole 91*a* positively passes through the first pressure chamber 106*a*, and flows out to the first ink outflow hole 93*a*.

In this state, when a printing is started based on an image data, the ejection of ink is performed from the recording head 20, and according to the ejection amount of the ink, the ink within the pressure chamber 106*a* of the valve unit 21 is supplied to the recording head 20 through the first ink discharge hole 73*a* and the like. As a result, the ink within the first pressure chamber 106*a* is reduced, and the inner pressure within the first pressure chamber 106*a* is reduced.

When the pressure of the ink within the first pressure chamber 106*a* is reduced to lower than the predetermined pressure, as shown in FIG. 10, the second film member 51 is flexed in a direction to reduce the volume within the first pressure chamber 106*a*. As a result, a first valve member main body 97*a* is rotated by a first pressure receiving plate 53*a*, and a communication state is established between the communication hole 81*a* and the first ink inflow hole 91*a*. The ink stored in a pressurized state within the first ink introduction chamber 84*a* flows into the first pressure chamber 106*a*, and the ink is caused to fill the first pressure chamber 106*a*.

Further, when the ink flows into the first pressure chamber 106*a*, the ink pressure within the first pressure chamber 106*a* is increased. As a result, the flexing of the second film member 51 is eliminated, and the first valve member main body 97*a* rotates toward the original position, and a non-communication state is established again between the communication hole 81*a* and the first ink inflow hole 91*a*.

That is, when the ink within the first pressure chamber 106 is reduced, and the inner pressure decreases to below the predetermined value, a communication state is established between the communication hole 81*a* and the first ink inflow hole 91*a*, and the ink is supplied to the first pressure chamber 106*a*. Further, with the ink supplied to the first pressure chamber 106*a*, the pressure of ink within the first pressure chamber 106*a* is increased, and when it becomes equal to or more than the predetermined value, a non-communication state is established between the communication hole 81*a* and the first ink inflow hole 91*a*, and the supply of the ink to the first pressure chamber 106*a* is stopped.

As a result, at the time of printing, the ink adjusted so as to have a pressure value within a predetermined range is in an accumulated state within the first pressure chamber 106*a*, and stability of the ink supply to the recording head 20 is secured.

At the time of printing, since the second film member 51, even if flexed, has its flexing promptly eliminated by the inflow of the ink from the first communication hole 81*a*, a volume change within the first pressure chamber 106*a* stays within a subtle range in the vicinity of the first volume V1. Consequently, at the time of printing, the flow path resistance given to the ink by the first pressure chamber 106*a* is always close to the first flow path resistance value K1, and is smaller than the flow path resistance provided to the ink by the first sigmoid flow path 95*a*. Consequently, the ink flowing into the first ink inflow hole 91*a* positively passes through the first ink pressure chamber 106*a*, and flows out to the first ink outflow hole 93*a*.

Figure 41:
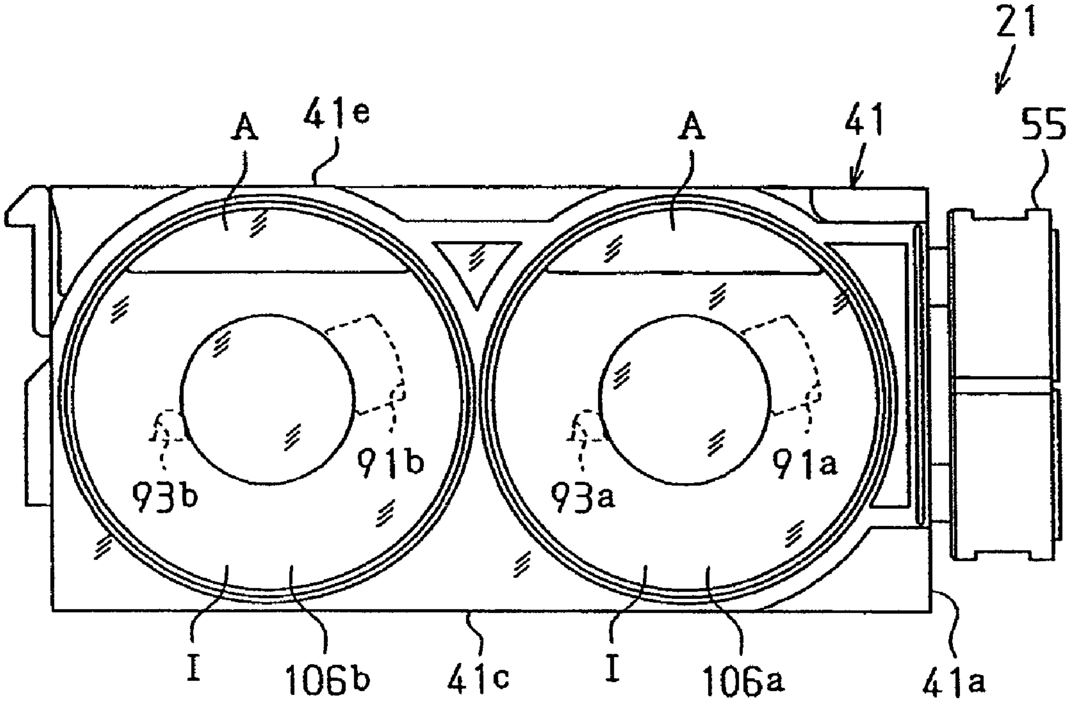
FIG. 41 is a view showing the operating state of the valve unit.

As shown in FIG. 41, since the first ink inflow hole 91*a* and the first ink outflow hole 93*a* are located in the vicinity of the central portion of the vertical direction of the first pressure chamber 106*a*, a bubble A contained in ink I flowed into the first pressure chamber 106*a* moves to a ceiling portion of the vertical direction of the first pressure chamber 106*a* due to the difference in specific gravity with the ink I. As a result, the bubble A is unable to flow out of the first pressure chamber 106 through the first ink outflow hole 93*a*, and is in a trapped state within the first pressure chamber 106*a*. In this way, the bubble in the ink passing through the valve unit 21 during the printing is trapped in the first pressure chamber 106*a*. Consequently, bubbles contained in the ink supplied to the recording head 20 are reduced, thereby improving printing quality.

With respect to the ink also supplied to the second ink introduction chamber 84*b* through the second ink introduction chamber 57*b*, similarly to the ink supplied to the first ink introduction chamber 84*a*, it is adjusted to have a pressure of predetermined range in the second pressure chamber 106*b*, and the bubble thereof is trapped.

Next, the operation of the ink jet recording apparatus 11 for the choke cleaning will be described. In the present embodiment also, similarly to each of the above described embodiments, an input portion 115 (see FIG. 9) is operated by the user so that choke cleaning is performed. When an ON signal is inputted to a CPU 111 by the operation of the input portion 115, the CPU 111 first drives a carriage motor 17 according to a choke cleaning program, and moves a carriage 15 to the home position.

Further, the CPU 111 stops the driving of the pressure pump 125 so as not to allow the pressurized air to be delivered from a pressure pump 25. As a result, the ink is in a state of being supplied in a non-pressurized state from the ink cartridge 23 to the valve unit 21. Subsequently, the CPU 111 drives a cap lifting motor 123, and lifts a cap 26*a* so as to seal the nozzle surface of the recording head 20. When the CPU 111 lifts the cap 26*a*, it advances to a flow amount reducing step, and drives a tube pump motor 127, and forms a negative pressure within the cap 26*a*.

As a result, the ink is drawn through the recording head 20, and the ink within the first and second pressure chambers 106*a* and 106*b* of the valve unit 21 begins to be reduced. In FIG. 11 a state is shown of the ink being reduced in the pressure chamber 106*a*, and with respect to the second pressure chamber 106*b*, as it is the same as the first pressure chamber 106*a*, the illustration thereof is omitted. As shown in FIG. 11, the pressure within the first and second pressure chambers 106*a* and 106*b* is reduced to lower than the predetermined pressure, so that, similarly to at printing time, the second film member 51 and the first and second valve member main bodies 97*a* and 97*b* and the like operate. As a result, a communication state is established between the first and second communication holes 81*a* and 81*b* and the first and second ink inflow holes 91*a* and 91*b*.

Then, the ink within the first and second ink introduction chambers 84*a* and 84*b* flows within the first and second pressure chambers 106*a* and 106*b*. However, for this choke cleaning, as described above, the ink from the ink cartridge 23 is supplied in the non-pressurized state within the first and second ink introduction chambers 84*a* and 84*b*. Consequently, the pressure within the first and second ink introduction chambers 84*a* and 84*b* also begins to reduce as a communication state is established between the first and second communication holes 81*a* and 81*b* and the first and second ink inflow holes 91*a* and 91*b*.

When the pressure within the first and second ink introduction chambers 84*a* and 84*b* is reduced to lower than the predetermined pressure, the first film member 45 is flexed, the first film member 45 abuts against the first and second filters 43*a* and 43*b*. As a result, the flow of the ink passing through the first and second filers 43*a* and 43*b* is blocked.

Next, the CPU 111 advances to drawing and flow amount changing steps, and in this state, allows the suction operation to be continued by the tube pump 26*e*. As a result, with the first and second ink introduction chambers 84*a* and 84*b* as a boundary, negative pressure is accumulated in the downstream side thereof. The degree of flexing of the second film member 51 becomes large, and the volume of the first and second pressure chambers 106*a* and 106*b* approaches the second volume V2. Then, the flow path resistance within the first and second pressure chambers 106*a* and 106*b* approaches the second flow path resistance value K2, and becomes larger than the flow path resistance of the first and second sigmoid flow paths 95*a* and 95*b*. As a result, the ink flowing into the first and second ink inflow holes 91*a* and 91*b* positively flows into the first and second sigmoid flow paths 95*a* and 95*b*.

The bubble A (see FIG. 41) trapped during printing is stagnated within the first and second pressure chambers 106*a* and 106*b*. However, the bubble A has no place to go within the first and second pressure chambers 106*a* and 106*b* as the degree of flexing of the second film member 51 becomes large by the continuation of the suction operation of the tube pump 26*e*. As a result, the bubble A moves to the first and second sigmoid flow paths 95*a* and 95*b* through the first and second ink inflow holes 91*a* and 91*b*.

As described above, since the first and second sigmoid flow paths 95*a* and 95*b* are formed relatively small in the flow path cross-sectional area thereof, in the first and second sigmoid flow paths 95*a* and 96*a*, the ink flows at a relatively high speed. Consequently, the bubble A flowed into the first and second sigmoid flow paths 95*a* and 95*a* is guided to the first and second ink outflow holes 93*a* and 93*b* without being stagnated in the first and second sigmoid flow paths 95*a* and 96*a*.

As a result, the bubble A trapped within the first and second pressure chambers 106*a* and 106*b* is moved to the recording head 20 through the first and second sigmoid flow paths 95*a* and 95*b*, and is discharged to the cap 26*a* through the nozzle of the recording head 20.

The CPU 111 measures the driving time of the tube pump 127 according to the choke cleaning program, and when a predetermined time elapses, it advances to a flow amount increasing step, and starts the driving of the pressure pump motor 125. The CPU 111 completes the processing of the choke cleaning program when the driving of the pressure pump motor 125 is started.

As a result, the delivery of the pressurized air from the pressure pump 25 is started, the ink is supplied in a pressurized state from the ink cartridge 23 to the valve unit 21. Then, the ink is supplied to the first and second ink introduction chambers 84*a* and 84*b* of the valve unit 21, and the flexing of the first film member 45 is eliminated. In this way, the first film member 45 is isolated from the first and second filters 43*a* and 43*b*, and the flow of the ink passing through the first and second filters 43*a* and 43*b* is allowed.

The ink flows instantly from the upstream side to eliminate the negative pressure accumulated in the section downstream of the first and second ink introduction chambers 84*a* and 84*b*, and the ink speeds up instantaneously in the and flows. As a result, the bubbles and impurities stagnated in the section downstream of the first and second ink introduction chambers 84*a* and 84*b* are discharged instantly together with the ink from the nozzle of the recording head 20, thereby performing the so-called choke cleaning operation.

As a result, after the completion of the choke cleaning, the ink is filled in the first and second pressure chambers 106*a* and 106*b* with the trapped bubble A in a state of being removed. Consequently, by performing the choke cleaning periodically, a bubble A trapped within the first and second pressure chambers 106*a* and 106*b* is periodically and reliably removed. As a result, trapping ability for bubbles in the first and second pressure chambers 106*a* and 106*b* is maintained without being reduced.

According to the fifth embodiment, the following effects are obtained.

(1) In the fifth embodiment, in the valve unit 21, the ink flowed into the first and second ink introduction chambers 57*a* and 57*b* is supplied to the recording head 20 by passing through at least either of the first and second sigmoid flow paths 95*a* and 95*b* or the first and second pressure chambers 106*a* and 106*b*. The first and second pressure chambers 106*a* and 106*b* are constituted to be able to easily trap a bubble. Further, the first and second sigmoid flow paths 95*a* and 95*b* have the flow path cross-sectional areas therefore formed in a size capable of securing the flow speed of the ink to the extent that a bubble contained in the ink is not stagnated within the first and second sigmoid flow paths 95*a* and 95*b*. Consequently, the first and second sigmoid flow paths 95*a* and 95*b* are constituted to be difficult to trap a bubble. Further, the distribution of the flow amount of the ink flowing into the first and second pressure chambers 106*a* and 106*b* and the first and second sigmoid flow paths 95*a* and 95*b* is changed by the flexing of the second film member 51.

Consequently, by the flexing size of the second film member 51, during printing, plenty of ink is allowed to flow into the first and second pressure chambers 106*a* and 106*b*. A probability of trapping the bubble contained in the ink supplied to the recording head 20 is enhanced. As a result, deterioration of printing performance by the discharge of bubbles together with ink from the recording head 20 is prevented.

Further, when the bubble trapped in the first and second pressure chambers 106*a* and 106*b* grows, and there arises a limit to the trapping ability of the bubble, the ink is allowed to flow into the first and second sigmoid flow paths 95*a* and 95*b* in plenty by the flexing size of the second film member 51. In this way, by the flow of the ink from the first and second sigmoid flow paths 95*a* and 95*b* to the recording head 20, the bubble trapped within the first and second pressure chambers 106*a* and 106*b* are guided to the first and second sigmoid flow paths 95*a* and 95*b*, and is discharged from the recording head 20. As a result, the removal of the bubble stagnated in the first and second pressure chambers 106*a* and 106*b* is reliably performed, and the trapping ability of the bubble in the first and second pressure chambers 106*a* and 106*b* is restored.

(2) In the above described embodiment, in the valve unit 21, the first and second ink inflow holes 91*a* and 91*b* and the first and second ink outflow holes 93*a* and 93*b* are provided substantially in the center of the vertical direction of the first and second pressure chambers 106*a* and 106*b*. Consequently, when the ink flows into the first and second pressure chambers 106*a* and 106*b*, a bubble contained in the liquid rises within the first and second pressure chambers 106*a* and 106*b* due to the difference in specific gravity with the ink, so that the bubble is not allowed to outflow from the first and second outflow holes 93*a* and 93*b*. As a result, the bubble is trapped by a simple mechanism, and there is no need to provide a complicated device for trapping bubbles, and therefore, the whole structure of the ink jet recording apparatus 11 is simplified.

(3) In the above described embodiment, the larger the degree of flexing of the second film member 51, the more the volume within the first and second pressure chambers 106*a* and 106*b* is reduced. The more the volume within the first and second pressure chambers 106*a* and 106*b* is reduced, the higher the flow path resistance with the first and second pressure chambers 106*a* and 106*b*, and the distribution of the flow amount of the ink flowing into the first and second sigmoid flow paths 95*a* and 95*b* is increased.

Consequently, when a bubble having been trapped in the first and second pressure chambers 106*a* and 106*b* grows, the flow amount of the ink flowing along the first and second sigmoid flow paths 95*a* and 95*b* is increased by sharply flexing the second film member 51. At this time, since the first and second pressure chambers 106*a* and 106*b* have the volume thereof reduced by the flexing of the second film member 51, the bubble within the first and second pressure chambers 106*a* and 106*b* is in a state of having no place to flow. Consequently, when the flow amount of the first and second sigmoid flow paths 95*a* and 95*b* is increased, and the bubble having no place to flow, is more reliably guided to the first and second sigmoid flow paths 95*a* and 95*b*, and the bubble trapped within the first and second pressure chambers 106*a* and 106*b* is more reliably removed.

(4) In the above described embodiment, the second film member 51 is a member flexed by the pressure difference between the inside and the outside of the first and second pressure chambers 106*a* and 106*b*. The inside and outside pressure difference is generated inside and outside of the first and second pressure chambers 106*a* and 106*b* by the driving of the pressure pump 25 and a capping device 26.

Consequently, the second film member 51 is indirectly flexed by a pressure change within the first and second pressure chambers 106*a* and 106*b*, which is generated by driving the pressure pump 25 and the capping device 26. That is, since driving means such as an actuator is not provided to directly bend the second film member 51, the driving means for displacing the second film member 51 is provided in a position spaced away from the second film member 51. As a result, the degree of freedom for design of the ink jet recording apparatus 11 is increased.

Further, to perform the choke cleaning, the device originally provided for the ink jet recording apparatus 11 is used also as a device for generating the pressure difference between the inside and the outside of the first and second pressure chambers 106*a* and 106*b*, and therefore, the mechanism of the device is simplified.

(5) In the above described embodiment, the first and second pressure chambers 106*a* and 106*b* provided for stabilizing the supply of the ink to the recording head 20 is used also as a liquid reservoir chamber for trapping the bubble. Consequently, the structure of the ink jet recording apparatus 11 is simplified.

(6) In the above described embodiment, the first and second sigmoid flow paths 95*a* and 95*b* are formed in an S-shape. According to this, in a totally compact state, the first and second sigmoid flow paths 95*a* and 95*b* are formed so that the length of the flow path is in a relatively long shape. As a result, the flow resistance of the first and second sigmoid flow paths 95*a* and 95*b* is made relatively high, and during printing, the constitution is made such that the inflow of ink is made difficult.

The above described embodiment may be modified as follows.

In the above embodiment, the first and second pressure chambers 106*a* and 106*b* as the liquid reservoir chambers trap the bubble by providing the first and second ink inflow holes 91*a* and 91*b* and the first and second ink outflow holes 93*a* and 93*b* substantially in the central portion of the vertical direction of the first and second pressure chambers 106*a* and 106*b*. If the holes are to be below the ceiling portions of the first and second pressure chambers 106*a* and 106*b*, the positions of the first and second ink inflow holes 91*a* and 91*b* and the first and second ink outflow holes 93*a* and 93*b* may be changed to other positions.

Further, if the bubble contained in the ink passing through the first and second pressure chambers 106*a* and 106*b* is trapped, the first and second pressure chambers 106*a* and 106*b* is changed to other constitutions.

In the fifth embodiment, the flow path resistance is changed by the second film member 51 and the like which change the volumes of the first and second pressure chambers 106*a* and 106*b*. The distribution factor of the flow amount of the ink between the first and second pressure chambers 106*a* and 106*b* and the first and second sigmoid flow paths 95*a* and 95*b* is changed. If the distribution factor of the flow amount of the ink between the first and second pressure chambers 106*a* and 106*b* and the first and second sigmoid flow paths 95*a* and 95*b* is changed, it may be changed by other distributing means. For example, the distribution factor of the flow amount of the ink between the first and second pressure chambers 106*a* and 106*b* and the first and second sigmoid flow paths 95*a* and 95*b* may be mechanically distributed by an on-off valve and the like.

In the fifth embodiment, the volumes of the first and second pressure chambers 106*a* and 106*b* are changed by flexing the second film member 51. These volumes may be changed by other flexible members. Further, the volumes of the first and second pressure chambers 106*a* and 106*b* may be changed by other volume changing means other than the flexible member.

In the fifth embodiment, the second film member 51 is flexed by a pressure adjusting step for changing the internal and external pressure of the first and second pressure chambers 106*a* and 106*b*. The second film member 51 may be flexed by displacing means other than the pressure adjusting means. For example, the actuator and the like directly flexing the second film member may be used as the displacing means.

In the fifth embodiment, the second film member 51 is flexed by adjusting the pressure of the ink by operation of the capping device 26 constituting the pressure adjusting means, the pressure pump 25, the first and second filters 43*a* and 43*b*, the first film member 45, and the first and second ink introduction chambers 84*a* and 84*b*. The second film member 51 may be flexed by generating the pressure difference between the inside and the outside of the first and second pressure chambers 106*a* and 107 by other pressure adjusting means.

In the fifth embodiment, the suction means is implemented as the capping device 26. This may be changed to another suction means capable of drawing the ink from the nozzle of the recording head 20.

In the fifth embodiment, the flow amount adjusting means comprises the pressure pump 25, the first and second filters 43*a* and 43*b*, the first film member 45, and the first and second ink introduction chambers 84*a* and 84*b*. This may be materialized into other flow amount adjusting means if the flow amount of the ink in the section upstream of the first and second pressure chambers 106*a* and 106*b* and the first and second sigmoid flow paths 95*a* and 95*b* is changed. For example, it may be materialized into the choke valve and the like which adjust the flow amount by crushing an ink supply tube 35.

In the fifth embodiment, at the negative pressure accumulation time, the first film member 45 abuts against the first and second filters 43*a* and 43*b*, so that the flow of the ink passing through the first and second filters 43*a* and 43*b* is blocked. If this increases the flow resistance to the ink passing through the first and second filers 43*a* and 43*b*, incomplete blocking of the flow may be performed.

In the fifth embodiment, the liquid reservoir chamber is materialized into the first and second pressure chambers 106*a* and 106*b* provided for the valve unit 21. This liquid reservoir chamber may be provided so as to be a separate body from the first and second pressure chambers 106*a* and 106*b*.

In the fifth embodiment, the first and second sigmoid flow paths 95*a* and 95*b* are formed in an S-shape. These flow paths may be formed in a serpentine shape other than the S-shape. Further, if the first and second sigmoid flow paths 95*a* and 95*b* have the magnitude of the flow path resistance thereof to be a value between the first flow path resistance value K1 and the second flow path resistance value K2, and at the same time, have the flow path cross-sectional areas capable of securing the flow speed, and capable of moving the bubble by opposing the buoyancy of the bubble, those flow paths may be changed to the flow paths of the other shapes.

In the fifth embodiment, as shown in FIG. 39, the choke valve 21 using the first film member 45 is provided for the valve unit 21. Further, the valve unit 21 is provided with the ink supply flow path (the first and second pressure chambers 106*a* and 106*b*) to the head at the normal printing time and the bubble discharge flow path (the first and second sigmoid flow paths 95*a* and 95*b*), and is provided with a flow path changing mechanism to selectively use the bubble discharge flow path in the choke cleaning.

Such a flow path changing mechanism is adapted for the device of the second embodiment. In this case, for example, a valve unit 155 shown in FIG. 18 is provided with the first and second sigmoid flow paths 95*a* and 95*b* in addition to the first and second pressure chambers 106*a* and 106*b*, and by the second film member 189 and the like changing the volume of the first and second pressure chambers 106*a* and 106*b*, the flow path resistance may be changed so as to change the distribution factor of the flow amount of the ink between the first and second pressure chambers and the first and second sigmoid flow paths.

Further, in each of the above described embodiments, though the first film member 45, the film 157, and the first film 228 may be made of the material capable of being hot-welded to thermoplastic resin, they may be formed of an elastic material such as an elastomer formed in a film shape. In this case, the film is attached to the flow path forming member 41 by adhesive agent and the like. By so doing, the film serves also as a function for the seal material.

In each of the above described embodiments, the suction means is implemented into the capping device 26. This may be changed to other suction means capable of drawing the ink from the nozzle of the recording head 20.

In each of the above described embodiments, the pressure adjusting means is implemented into the pressure pump 25 and the pressure tube 37. If this changes the pressure of the ink supplied to the first and second ink introduction chambers 84*a* and 84*b* of the valve unit 21, the ink introduction chamber 178 of the flow concentration path 151 or the first ink introduction chamber S1 to the sixth ink introduction chamber S6 of the choke valve 221, it may be implemented into another pressure adjusting means.

In each of the above described embodiments, the choke cleaning program is a program, which allows the CPU 111 to measure the driving time of the tube pump motor 127, and start the driving of the pressure pump motor 125 when the predetermined time elapses. The choke cleaning program may be a program where the CPU 111 starts the driving of the pressure pump motor 125 based on a factor other than the measuring result of the driving time of the tube pump motor 127.

In each of the above described embodiments, the valve units 21 and 155 correspond to ink of two colors, and one section each of the valve units 21 and 155 comprises two each of the ink introduction chamber, the pressure chamber and the like. The number of ink introduction chambers, pressure chambers and the like may be changed so that the valve units 21 and 155 correspond to ink of one color or ink of three colors.

In each of the above described embodiments, the ink cartridge 23 as the liquid cartridge comprises the ink pack 32 as the liquid accommodating portion, and the ink case 31 as the pressure chamber. This may be implemented into a liquid cartridge comprising another liquid accommodation portion and pressure chamber. As for the other liquid accommodating portion, it may be implemented into a portion forming the liquid accommodating portion and pressure chamber by partitioning the inside of a case by a film and the like as a flexible portion.

In each of the above described embodiments, a liquid ejection apparatus is described by using an ink jet recording apparatus 11 (including a printing apparatus such as a facsimile, a copier and the like) for ejecting the ink as the liquid ejection apparatus. This may be implemented into a liquid ejection apparatus for ejecting other liquid. For example, as for the liquid ejection apparatus for ejecting other liquid, it may be a liquid ejection apparatus for ejecting a liquid such as an electrode material, a color material and the like used in the manufacture of a liquid crystal display, an EL display and a surface-emission type display, a liquid ejection apparatus for ejecting a bioorganic substance used in the manufacture of a biochip, and a sample ejection apparatus as a precision pipette.

Sixth Embodiment

A sixth embodiment of the present invention will be explained with reference to FIGS. 42 to 46.

Figure 42:
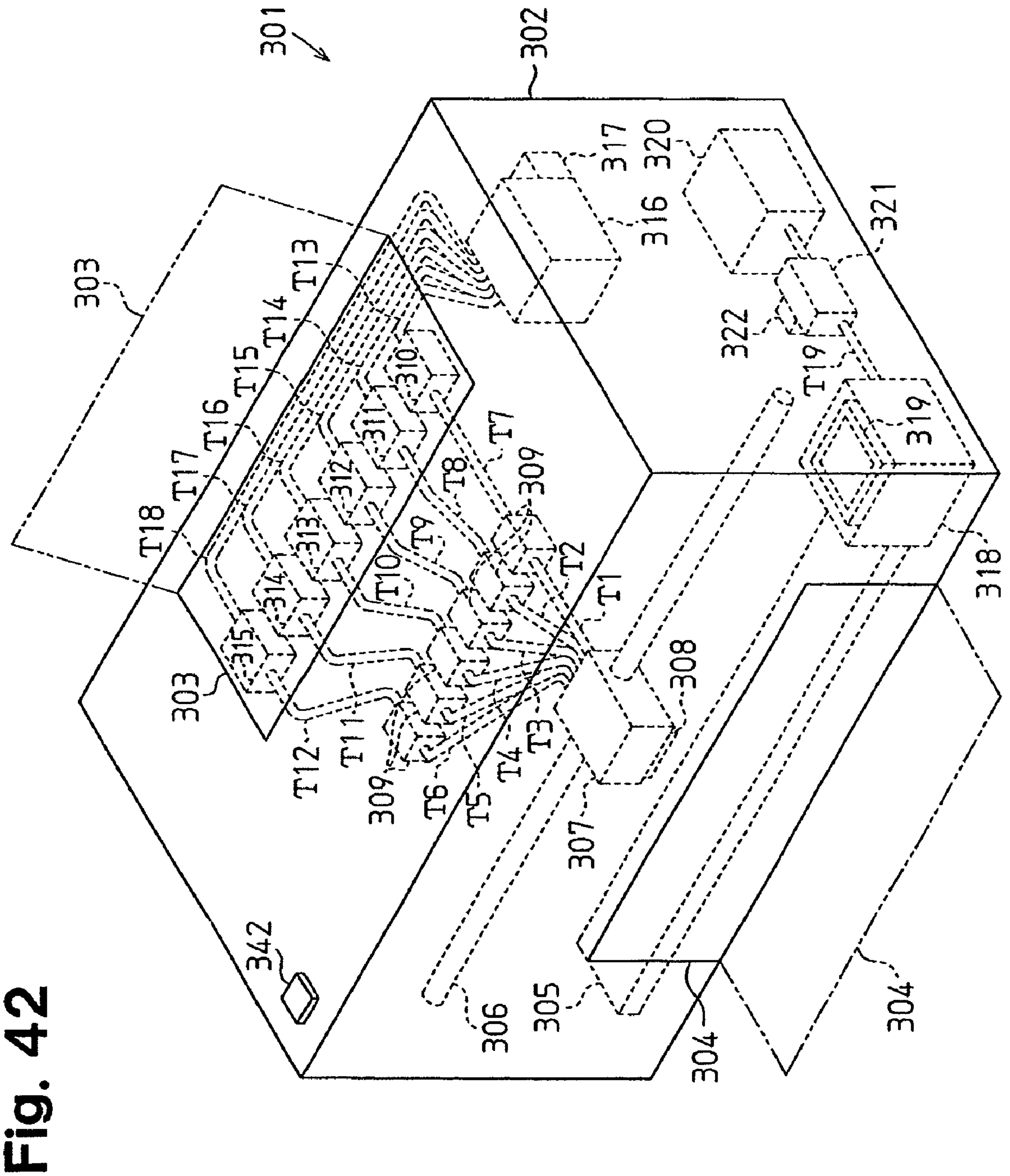
FIG. 42 is a perspective view for schematically explaining a printer according to a sixth embodiment.

As shown in FIG. 42, a printer 301 as the liquid ejection apparatus includes a frame 302 having a substantially rectangular parallelepiped shape. A paper feeder tray 303 is provided on the upper surface of the frame 302. A paper outlet tray 304 is formed at the front side of the frame 302. A non-illustrated hinge mechanism allows the paper feeder tray 303 and the paper outlet tray 304 to be received in the frame 302 in a folded manner.

A platen 305 extends longitudinally in the space defined by the frame 302. A non-illustrated paper supply mechanism supplies a recording paper to the platen 305. The recording paper is inserted into the frame 302 through the paper feeder tray 303. The recording paper is sent out of the frame 302 through the paper outlet tray 304.

A guide member 306 is also provided in the frame 302, extending parallel with the platen 305. A carriage 307 movable along the guide member 306 is passed through and supported by the guide member 306. A carriage motor (not shown) provided in the space defined by the frame 302 is operably connected to the carriage 307 through a timing belt (not shown), which is wound around a pair of pulleys secured to the frame 302. When powered by the carriage motor through the timing belt, the carriage 307 is enabled to reciprocate parallel with the platen 305 (in the main scanning direction), while being guided by the guide member 306.

Figure 43:
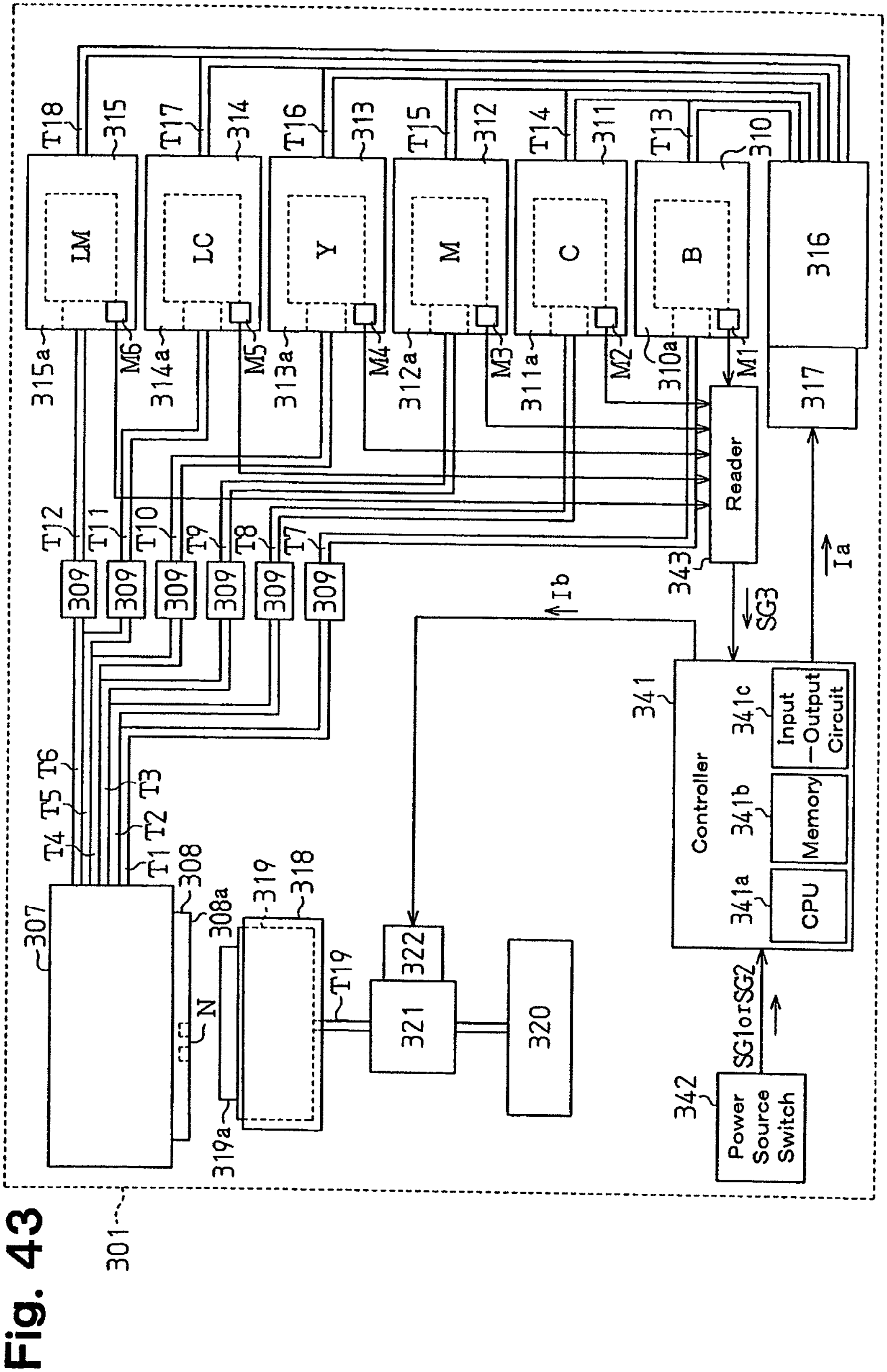
FIG. 43 is a block diagram for explaining the configuration of the printer.

The carriage 307 includes a recording head 308 serving as a liquid ejection head. As shown in FIG. 43, the recording head 308 has a nozzle surface 308*a* including six nozzle lines, each of which is formed by nozzles N for ejecting ink. Six choke valves 309 (six outlet ports P2 of the choke valves 309), each serving as a valve provided in the space defined by the frame 302, are connected to the recording head 308 through corresponding tubes T1 to T6 each serving as a supply path. First to sixth ink cartridges 310 to 315, each of which serves as liquid reservoir means formed in the space defined by the frame 302, are connected to the associated choke valves 309 (inlet ports P1 of the associated choke valves 309) through corresponding tubes T7 to T12 each serving as a supply path. That is, the choke valves 309 are each provided between the recording head 308 and the corresponding one of the first to sixth ink cartridges 310 to 315. Each of the first to sixth cartridges 310 to 315 includes an accommodation casing 310*a* to 315*a*. Each of the accommodation casings 310*a* to 315*a* accommodates a corresponding one of ink packs B, C, M, Y, LC, LM, each serving as a liquid reservoir bag. Each of the ink packs B, C, M, Y, LC, LM retains a corresponding ink (in the sixth embodiment, black, cyan, magenta, yellow, light cyan, or light magenta) and is connected to the corresponding tube T7 to T12, which is connected to the associated one of the first to sixth ink cartridges 310 to 315. Further, memory chips M1 to M6 are each provided for the corresponding one of the ink cartridges 310 to 315. Each memory chip M1 to M6 is formed by a contact type memory IC or the like, storing various information including the serial number of the corresponding ink cartridge 310 to 315 and the type of ink retained in the ink cartridge 310 to 315.

A pressurization pump 316, serving as pressurizing means, is connected to the first to sixth ink cartridges 310 to 315, which are configured as above-described, through corresponding tubes T13 to T18. The pressurization pump 316 is operably connected to a first drive motor 317 and is driven by the first drive motor 317 for pressurizing the air. The pressurized air is then supplied to the space formed by the accommodation casing 310*a* to 315*a* of each of the first to sixth ink cartridges 310 to 315 through the corresponding tube T13 to T18. In this manner, each ink pack B, C, M, Y, LC, LM of the first to sixth ink cartridges 310 to 315 is pressurized by the pressurized air and thus pressure-transfers the ink retained in the ink pack B, C, M, Y, LC, LM to the recording head 308. After being supplied to the recording head 308, the ink is ejected from the corresponding nozzles N of the recording head 308.

If the first drive motor 317 is stopped and the supply of the pressurized air from the pressurization pump 316 to the spaces defined by the accommodation casings 310*a* to 315*a* of the first to sixth ink cartridges 310 to 315 is suspended, the ink packs B, C, M, Y, LC, LM are released from the pressurization by the pressurized air. The pressure-transferring of the ink from the ink packs B, C, M, Y, LC, LM to the recording head 308 is thus also suspended.

In the printer 301, the area in which printing is carried out by reciprocating the carriage 307 and ejecting ink drops toward the recording paper is defined as a printing area. Also, a non-printing area is defined in the printer 301 as the space for sealing the nozzles when printing is not being carried out. As shown in FIG. 42, a cap holder 318 is formed in the non-printing area.

The cap holder 318 includes a capping member 319 opposed to the nozzle surface 308*a* of the recording head 308. The capping member 319 includes a flexible contact portion 319*a* at an opening end opposed to the nozzle surface 308*a* of the recording head 308. The cap holder 318 holds the contact portion 319*a* of the capping member 319 in tight contact with the nozzle surface 308*a* by means of a non-illustrated drive mechanism. The nozzles N of the nozzle surface 308*a* are thus sealed. The capping member 319 receives the ink ejected from the nozzles N.

A non-illustrated communication hole communicating with the interior of the capping member 319 is defined in the bottom of the capping member 319. A waste ink reservoir 320 is connected to the communication hole through a tube T19. The ink received by the capping member 319 is discharged into the waste ink reservoir 320 through the tube T19. A suction pump 321 formed by a tube pump or the like is provided in the tube T19 as negative pressure generating means. A second drive motor 322 is operably connected to the suction pump 321. As driven by the second drive motor 322, the suction pump 321 applies negative pressure to the interior of the capping member 319 through the tube T19. The ink is thus drawn from the interior of the capping member 319 and introduced into the waste ink reservoir 320.

When the printer 301 constructed as above-described performs the cleaning operation, the contact portion 319*a* of the capping member 319 is placed in tight contact with the nozzle surface 308*a*. Further, the pump 321 is driven in such a manner that the negative pressure is applied to the nozzle surface 308*a* (the nozzles N). In this manner, the bubbles trapped in the recording head 308 or the highly viscous ink adhered to the walls of the nozzles N are drawn from the nozzles N. The recording head 308 is thus cleaned.

In the sixth embodiment, the printer 301 may operate in accordance with two cleaning modes, a normal cleaning mode and a choke cleaning mode.

In accordance with the normal cleaning mode, cleaning is carried out while ink is being supplied (pressure-transferred) from the first to sixth ink cartridges 310 to 315 to the recording head 308. The cleaning is performed by applying negative pressure to the nozzle surface 308*a* through the capping member 319.

In contrast, in accordance with the choke cleaning mode, the supply (pressure-transferring) of the ink from the first to sixth ink cartridges 310 to 315 to the recording head 308 is stopped, or suspended by the choke valves 309. In this state, the negative pressure is continuously applied to the nozzle surface 308*a* through the capping member 319, thus increasing the negative pressure acting on the nozzle surface 308*a*. More specifically, if the increased negative pressure is applied to the interior of the recording head 308 through the nozzles N of the nozzle surface 308*a*, the choke valves 309 are opened for resuming the supply (pressure-transferring) of the ink from the first to sixth ink cartridges 310 to 315. Accordingly, the accumulated negative pressure causes the ink to flow rapidly to the interior of the recording head 308, thus allowing the ink to be ejected from the nozzles N of the recording head 308. In this state, the bubbles trapped in the recording head 308 and the highly viscous ink adhered to the walls of the nozzles N are ejected from the nozzles N, together with the ink flowing to the interior of the recording head 308. In the sixth embodiment, since the negative pressure applied to the nozzle surface 308*a* is greater in the choke cleaning mode than in the normal cleaning mode, the ink consumption in the choke cleaning mode is greater than that in the normal cleaning mode.

The configuration of each of the choke valves 309, which are provided in the printer 301, will be described with reference to FIGS. 44 and 45.

The following description focuses on the configuration of the choke valve 309 arranged between the recording head 308 and the first ink cartridge 310. Since the remaining choke valves 309 are configured identically with the aforementioned choke valve 309, description thereof will be omitted. Each of FIGS. 44 and 45 is a longitudinal cross-sectional view explaining the choke valve 309 of the sixth embodiment.

Figure 44:
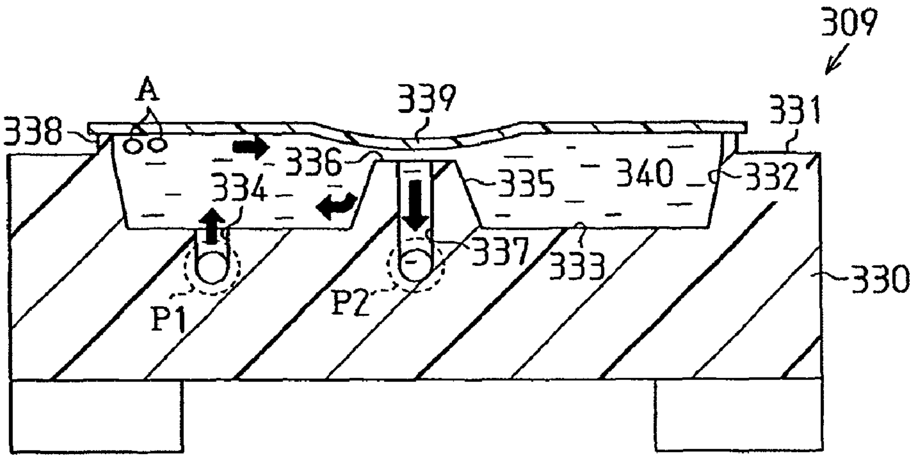
FIG. 44 is a longitudinal cross-sectional view for explaining a choke valve of the sixth embodiment.
Figure 45:
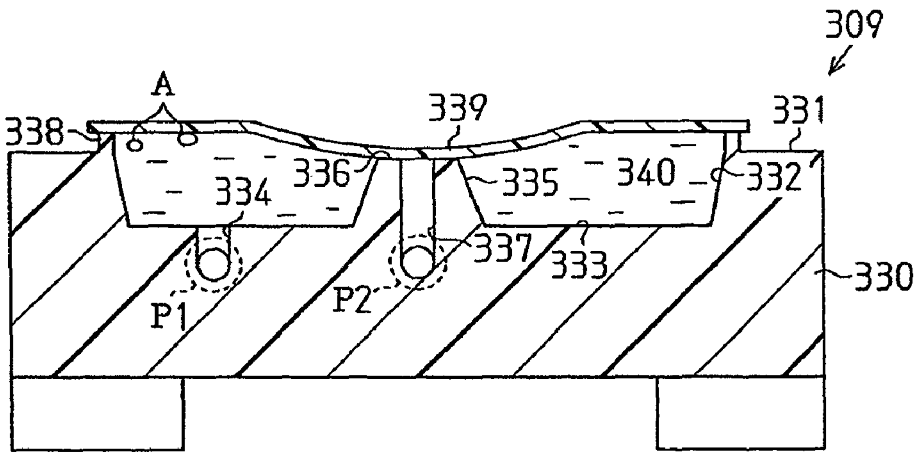
FIG. 45 is a longitudinal cross-sectional view for explaining the choke valve of FIG. 44.

As shown in FIG. 44, the choke valve 309 includes a valve housing 330. The valve housing 330 is formed in a relatively thin, rectangular parallelepiped shape and has an annular recess 332, which is defined in an annular shape in an upper surface 331 of the housing 330. A first passage 334 is defined in a bottom surface 333 of the annular recess 332 and communicates with the introduction port P1. Further, by providing the annular recess 332, a truncated cone-like projection 335 is projected from a middle portion of the bottom surface 333 of the annular recess 332 and configures bubble retaining means. The projection 335 includes a flat upper surface 336 located lower than an upper surface 331 of the valve housing 330. A second passage 337 is defined in the upper surface 336 and communicates with the passage defined by the outlet port P2.

An annular deposit portion 338 projects from the upper surface 331 of the hosing 330. The deposit portion 338 is formed along the opening end of the annular recess 332. A film 339 is deposited on the deposit portion 338 in such a manner as to cover the annular recess 332 and the projection 335, while being flexibly deformed toward the annular recess 332. By sealing the annular recess 332 and the projection 335, the film 339 defines a valve chamber 340 in the housing 330. The film 339 is formed of material having gas barrier properties and flexibility, such as resin. Since the film 339 is deposited on the opening end of the annular recess 332, a middle portion of the film 339 is allowed to contact or separate from the upper surface 336 of the projection 335. When the film 339 is held in contact with the upper surface 336 of the projection 335, the second passage 337 defined in the projection 335 is disconnected from the valve chamber 340. In contrast, when the film 339 is spaced from the upper surface 336 of the projection 335, the second passage 337 is connected to the valve chamber 340.

In the choke valve 309, when the valve chamber 340 is supplied with and filled with the ink from the ink pack B, the film 339 is raised by the ink and thus spaced from the upper surface 336. Further, by flowing around the outer circumferential surface of the projection 335, the ink produces a convective flow in the valve chamber 340, in the direction indicated by the arrows of FIG. 44. The convective flow makes it easy to trap bubbles A in an upper left section of the valve chamber 340, as viewed in the drawing. Thus, the valve chamber 340 is allowed to trap and retain the bubbles A, if the bubbles A are contained in the ink supplied from the ink pack B.

Also, when the ink is supplied from the valve chamber 340 to the recording head 308 through the second passage 337 with the ink supply from the ink pack B to the valve chamber 340 stopped, the pressure in the valve chamber 340 and the pressure in the second passage 337 become negative. The negative pressure acts to bring the film 339 in contact with the upper surface 336 of the projection 335, thus blocking the second passage 337. This disconnects the second passage 337 from the valve chamber 340.

When cleaning is carried out in accordance with the choke cleaning mode and the pressurization pump 319 is deactivated so as to stop pressure-transferring of the ink from the ink pack B, the ink flow from the first passage 334 to the valve chamber 340 of the choke valve 309 is suspended. In this state, if negative pressure acts on the nozzle surface 308*a* of the recording head 398, the negative pressure is applied to the valve chamber 340 through the tube T1, the outlet port P2, and the second passage 337. In correspondence with the negative pressure, the film 339 is flexibly deformed toward the projection 335. Accordingly, as shown in FIG. 45, the film 339 is placed in tight contact with the upper surface 336 of the projection 335, thus blocking the second passage 337. This disconnects the second passage 337 from the valve chamber 340.

In this manner, the ink flow from the valve chamber 340 to the recording head 308 is blocked. Therefore, as has been described, the negative pressure in the recording head 308, the tube T1, the outlet port P2, and the valve chamber 340 is increased by continuous operation of the suction pump 321. If the pressurization pump 316 is driven for pressurizing the ink pack B and thus resuming the ink supply from the ink pack B, the ink is introduced from the first passage 334 to the valve chamber 340 of the choke valve 309. The valve chamber 340 is thus filled with the ink. In this state, the film 339 is raised by the ink and thus separated from the upper surface 336 of the projection 335. This opens the second passage 337, and the second passage 336 communicates with the valve chamber 340. The ink thus flows from the valve chamber 340 to the recording head 308. More specifically, at this stage, the increased negative pressure causes the ink to rapidly flow to the recording head 308 through the second passage 337 and the tube T1. Thus, together with the rapid flow of the ink, the bubbles A trapped in the valve chamber 340 flow from the second passage 337 to the ink outlet port P2 and then to the tube T1, and are finally ejected and discharged from the nozzles N of the recording head 308.

For performing the cleaning operation in accordance with the normal cleaning mode, the ink pack B is pressurized through actuation of the pressurization pump 316. The ink in the ink pack B is thus supplied to the valve chamber 340 of the choke valve 309, so that the valve chamber 340 is filled with the ink. In this state, if negative pressure acts on the nozzle surface 308*a* in the valve chamber 340, the negative pressure is applied to the valve chamber 340 through the tube T1, the outlet port P2, and the second passage 337. Since the ink is continuously pressure-transferred to the valve chamber 340, the film 339 is maintained in a state raised from the projection 335. Thus, the negative pressure causes the ink to flow to the recording head 308 via the second passage 337 and the tube T1.

Further, unlike the choke cleaning mode, the quick ink flow does not occur when the cleaning operation according to the normal cleaning mode is performed. Thus, the bubbles A trapped in the valve chamber 340 are maintained in the valve chamber 340 without being sent out of the valve chamber 340. Afterwards, when the cleaning operation is performed in accordance with the choke cleaning mode, the bubbles A are discharged from the valve chamber 340.

The electrical configuration of the printer 301 will hereafter be explained.

With reference to FIG. 43, the printer 301 has a controller 341. The controller 341 includes a central processing unit (CPU) 341*a* for controlling the printer 301, a memory 341*b*, and an input-output circuit 341*c*. Through the input-output circuit 341*c*, the CPU 341*a* supplies a first drive current Ia and a second drive current Ib to the first drive motor 317 and the second drive motor 322, respectively, so as to drive and control the first and second drive motors 317, 322. By controlling the first and second drive motors 317, 322 in accordance with a cleaning control program stored in the memory 341*b*, the controller 341 controls actuation of the pressurization pump 316 and the suction pump 321. In this manner, the choke cleaning or the normal cleaning is selectively performed.

More specifically, for enabling the printer 301 to perform the cleaning operation in accordance with the normal cleaning mode, the CPU 341*a* of the controller 341 supplies the first and second drive currents Ia, Ib to the first and second drive motors 317, 322. The first and second drive motors 314, 322 are thus actuated. Contrastingly, for enabling the printer 301 to perform the cleaning operation in accordance with the choke cleaning mode, the CPU 341*a* of the controller 341 blocks the supply of the first drive current Ia to the first drive motor 317, thus stopping the first drive motor 317. Meanwhile, the CPU 341*a* permits the supply of the second drive current Ib to the second drive motor 322, thus actuating the second drive motor 322. In this manner, the negative pressure acting on the recording head 308 is accumulated.

A power source switch 342 formed on the upper surface of the frame 302 is electrically connected to the controller 341 through the input-output circuit 341*c*. When the power source switch 342 is selectively turned on or off by the user, a turning-on signal SR1 or a turning-off signal SG2 is sent from the power source switch 342 to the CPU 341*a*. When receiving the turning-on signal SR1 or the turning-off signal SG2, the CPU 341*a* correspondingly activates or deactivates the printer 301.

Further, a contact type reader 343 provided in the space defined by the frame 302 is electrically connected to the CPU 341*a* through the input-output circuit 341*c*. The CPU 341*a* receives information including the manufacturer's serial number of any of the first to sixth ink cartridges 310 to 315, which is read by the reader 343 from the corresponding memory chip M1 to M6, as an information signal SG3. In response to the information signal SG3, the CPU 341*a* operates the memory 341*b* to store the information carried by the information signal SG3 including the aforementioned manufacturer's serial number. Further, the CPU 341*a* operates the memory 341*b* to store the number of replacement independently for each of the first to sixth ink cartridges 310 to 315.

Figure 46:
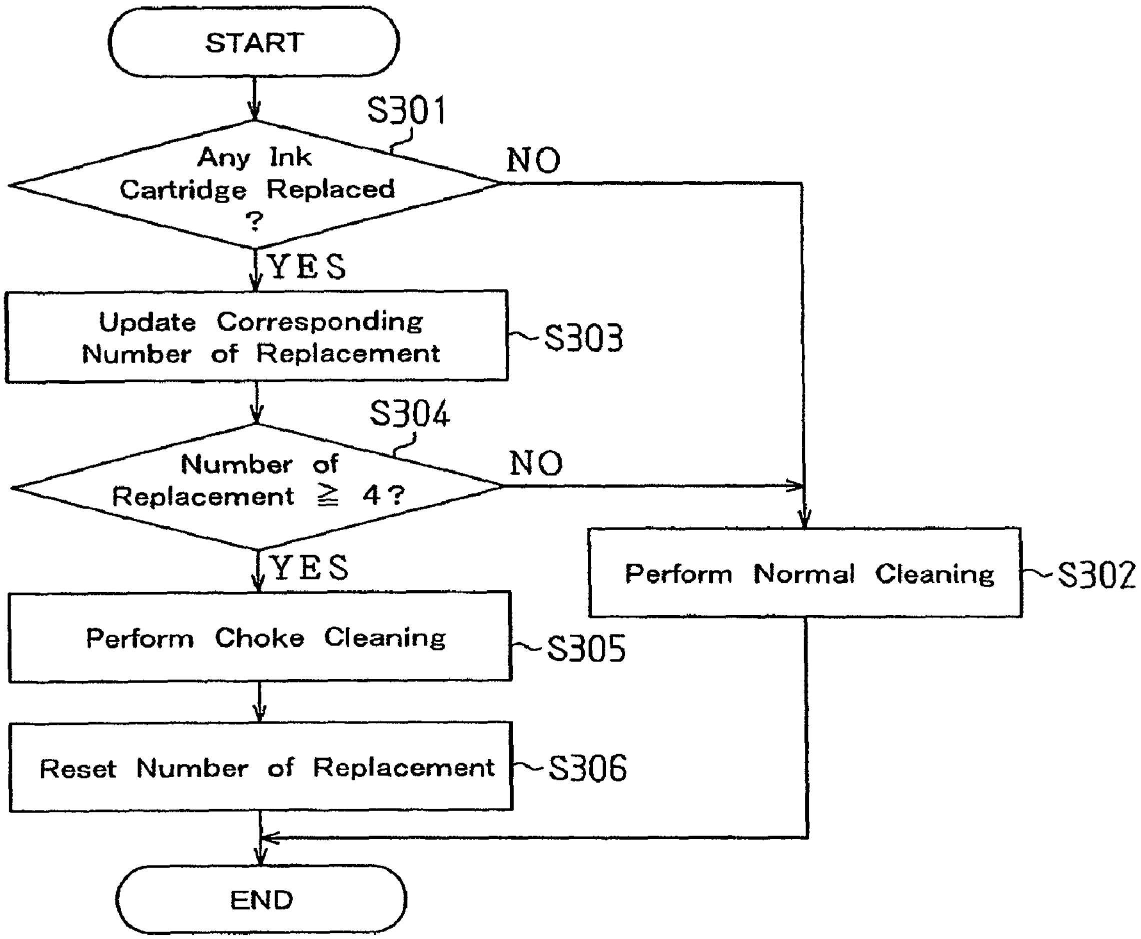
FIG. 46 is a flowchart for explaining the operation of a CPU of the sixth embodiment.

The operation of the controller 341 when the printer 301 is turned on will now be explained referring to FIG. 46.

When the printer 301 is turned on, the CPU 341*a* determines whether or not the bubbles in the valve chamber 340 are likely to flow to the recording head 308, depending on the number of replacement of each of the first to sixth ink cartridges 310 to 315. Based on the determination, the CPU 341*a* selects between the normal cleaning mode and the choke cleaning mode and performs the cleaning accordingly.

When the power source switch 342 is turned on, the turning-on signal SG1 is sent from the power source switch 342 to the CPU 341*a*. In response to the turning-on signal SG1, the CPU 341*a* activates the printer 301. The CPU 341*a* then acquires information regarding the serial numbers of the first to sixth ink cartridges 310 to 315 by means of the reader 343. The CPU 341*a* then compares the acquired information with the serial numbers of the first to sixth ink cartridges 310 to 315 that are stored in the memory 341*b*. Based on the comparison, the CPU 341*a* determines whether or not any one of the ink cartridges 310 to 315 has been replaced (in step S301).

When determining that none of the ink cartridges 310 to 315 has been replaced (NO in step S301), the CPU 341*a* actuates the first and second drive motors 317, 322, thus performing the cleaning operation in accordance with the normal cleaning mode (in step S302). On completion of the cleaning operation, the CPU 341*a* executes a printing procedure in accordance with a printing program.

In contrast, when determining that at least one of the first to sixth ink cartridges 310 to 315 has been replaced (YES in step S301), the CPU 341*a* updates the number of replacement of the replaced ink cartridge 310 to 315 that is stored in the memory 341*b* (in step S303).

Next, the CPU 341*a* determines whether or not the updated number of replacement is equal to or greater than four (in step S304). If the number of replacement is less than four (NO in step S304), the CPU 341*a* determines that the bubbles A in the valve chamber 340 are unlikely to flow to the recording head 308. The CPU 341*a* thus actuates the first and second drive motors 317, 322 and performs the cleaning operation in accordance with the normal cleaning mode, as a liquid discharge operation (in step S302). When the cleaning operation is completed, the CPU 341*a* executes the printing procedure in accordance with the printing program.

In contrast, if the updated number of replacement is not less than four (YES in step S304), the CPU 341*a* determines that the bubbles A in the valve chamber 340 are likely to flow to the recording head 308. Accordingly, the CPU 341*a* actuates the second drive motor 322 but not the first drive motor 317, thus carrying out the choke cleaning (in step S305: discharge operation). When the choke cleaning is completed, the CPU 341*a* resets the number of replacement stored in the memory 341*b* (in step S305), ending the cleaning operation on the activation of the printer 301.

The sixth embodiment has the following advantages.

(1) In the sixth embodiment, the choke valve 309 has the truncated cone-like projection 335. This structure causes the ink in the valve chamber 340 to move along the outer circumferential surface of the projection 335, thus generating a convective flow in the valve chamber 340. Further, the upper surface 336 of the projection 335 is located lower than the upper surface 331 of the housing 330 and the film 339 deposited on the deposit portion 338 is located higher than the upper surface 331 of the housing 330.

Therefore, if the ink sent to the valve chamber 340 contains bubbles A, the convective flow acts to trap the bubbles A at an upper position of the valve chamber 340 (at an upper position spaced from the upper surface 336 of the projection 335) at which the bubbles A are hardly introduced into the second passage 337.

Accordingly, if any of the first to sixth ink cartridges 310 to 315 has been replaced and the ink supplied from the replaced ink cartridge 310 to 315 contains the bubbles A, the choke valve 309 maintains the bubbles A and prevents the bubbles A from entering the recording head 308. As a result, the printer 301 becomes free from printing problems caused by the bubbles A, such as missing dots. The printing is thus carried out in an optimal state. Further, by maintaining the bubbles A in the valve chamber 340, the choke cleaning does not necessarily have to be performed every time any of the first to sixth ink cartridges 310 to 315 is replaced. The ink consumption by the printer 301 is thus saved, and the running cost of the printer 301 is also lowered.

(2) In the sixth embodiment, the selection between the choke cleaning mode and the normal cleaning mode in step S304 is based on the determination whether or not the number of replacement is equal to or greater than four. This saves the ink consumption by the printer 301, as compared to the case in which the choke cleaning is performed every time any of the first to sixth ink cartridges 310 to 315 is replaced. As a result, the running cost of the printer 301 is saved.

The bubbles A must be discharged from the valve chamber 340 before the number of replacement of any of the first to fifth ink cartridges 310 to 315 reaches the extent at which accumulation of the bubbles A in the valve chamber 340 becomes excessive and thus makes it likely that the bubbles A flow to the recording head 308. The bubbles A are discharged when a certain condition is met, or the number of replacement becomes equal to or greater than four. The number of replacement of the condition is set through tests in such a manner that the bubbles A can be maintained in the valve chamber 340 in an optimal state, even when the number of replacement of any of the ink cartridges 310 to 315 becomes four and accumulation of the bubbles A reaches the corresponding extent.

Seventh Embodiment

Figures 47, 48:
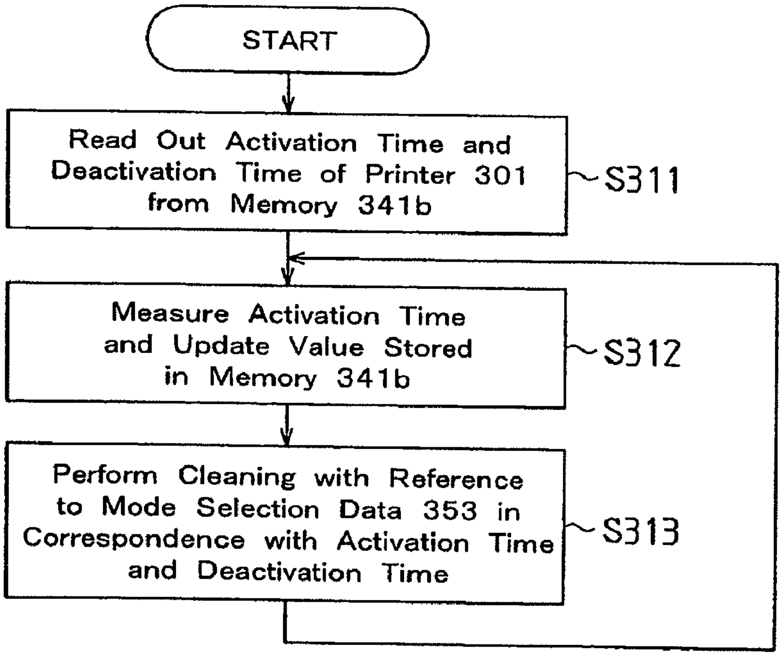
FIG. 47 is a view for explaining a map data of a seventh embodiment.
FIG. 48 is a flowchart for explaining the operation of a CPU of the seventh embodiment.

A seventh embodiment of the present invention will hereafter be described with reference to FIGS. 47 and 48.

The printer of the seventh embodiment is characterized in that cleaning is carried out periodically, in addition to the cleaning after replacement of any of the first to sixth ink cartridges 310 to 315, which has been described about the sixth embodiment. The following description thus focuses on the difference between the seventh embodiment and the sixth embodiment. Same or like reference numerals are given to parts of the seventh embodiment that are the same as or like corresponding parts of the sixth embodiment and explanation thereof will be omitted.

The controller 341 of the seventh embodiment stores a map data in the memory 341*b*. In accordance with a cleaning control program stored in the memory 341*b*, the CPU 341*a* of the controller 341 determines whether or not the bubbles in the valve chamber 340 are likely to flow to the recording head 308, with reference to a predetermined time period, or, in the seventh embodiment, activation time and deactivation time, as well as the map data. Depending on the determination, the CPU 341*a* operates the printer 301 to perform the cleaning operation selectively in accordance with the normal cleaning mode or the choke cleaning mode. The activation time corresponds to the time in which the printer 301 is maintained activated in response to turning on of the power source switch 342. The activation time is measured by a timer (not shown) incorporated in the controller 341. Such measurement is started when the CPU 341*a* receives the turning-on signal SG1 from the power source switch 342 and ended when the CPU 341*a* receives the turning-off signal SG2. The deactivation time corresponds to the time in which the printer 301 is maintained deactivated in response to turning off of the power source switch 342. The deactivation time is also measured by the timer. The measurement is initiated when the CPU 341*a* receives the turning-off signal SG2 and ended when the CPU 341*a* receives the turning-on signal SG1. The measurements of the activation time and the deactivation time are stored by the CPU 341*a* in the memory 341*b* and updated when necessary.

An example of the map data stored in the memory 341*b* will be explained with reference to FIG. 47.

The map data 350 is used for determining whether the choke cleaning mode or the normal cleaning mode should be selected depending on the activation time and the deactivation time. Referring to FIG. 47, the map data 350 includes a first time axis 351 and a second time axis 352.

The first time axis 351 corresponds to the activation time of the printer 301 and the second time axis 352 corresponds to the deactivation time of the printer 301. The map data 350 includes a set of mode selection data 353 corresponding to the first and second time axes 351, 352. The mode selection data 353 includes indications "choke" each representing the choke cleaning mode and indications "normal" each representing the normal cleaning mode. When the above-described cleaning operation is performed, the CPU 341*a* uses the mode selection data 353 for reference. Therefore, if the activation time of the printer 301 corresponds to two hours and the deactivation time three hours, the CPU 341*a* selects the "normal" for reference. Further, if the activation time of the printer 301 corresponds to two hours and the deactivation time five hours or longer, the CPU 341*a* selects the "choke" for reference.

That is, the CPU 341*a* selects the "normal" or the "choke" with reference to the mode selection data 353 of the map data 350. Depending on the selection, the CPU 341*a* operates the printer 301 to perform the cleaning operation in accordance with the normal cleaning mode or the choke cleaning mode.

The operation of the CPU 341*a* for operating the printer 301 to perform the cleaning operation will hereafter be explained.

In response to activation of the printer 301, the CPU 341*a* reads out the activation time and the deactivation time of the printer 301 from the memory 341*b* (in step S311).

Subsequently, the CPU 341*a* operates the timer to start the measurement of the activation time of the printer 301 and updates the activation stored in the memory 341*b* (in step S312). In correspondence with the updated activation time and the deactivation time stored in the memory 341*b*, the CPU 341*a* refers to the mode selection data 353 of the map data 350 for determining the extent of accumulation of the bubbles A maintained in the valve chamber 340. The CPU 341*a* thus determines whether or not the bubbles A are likely to flow from the valve chamber 340 to the recording head 308. The CPU 341*a* then operates the printer 301 to carry out cleaning in accordance with the cleaning mode indicated by the mode selection data 353 (in step S313: discharge operation). As long as the printer 301 is maintained activated, the CPU 341*a* continuously operates the timer to measure the activation time and updates the activation time stored in the memory 341*b* (in step S312), thus operating the printer 301 to perform the above-described cleaning operation repeatedly.

If both of the activation time and the deactivation time correspond to five hours or longer, the CPU 341*a* selects the "choke" with reference to the mode selection data 353 and operates the printer 301 to perform the cleaning operation in accordance with the choke cleaning mode. The CPU 341*a* then resets the activation time and the deactivation time stored in the memory 341*b*.

The seventh embodiment has the following advantage in addition to those of the sixth embodiment.

(3) In the seventh embodiment, the printer 301 determines whether or not the bubbles A in the valve chamber 340 are likely to flow to the recording head 308, in correspondence with the activation time and the deactivation time of the printer 301. Based on the determination, the choke cleaning mode or the normal cleaning mode is selected and the cleaning operation is conducted correspondingly. Thus, although a small quantity of gas may permeate through the film 339 and develop as the bubbles A in the valve chamber 340 as time elapses, the bubbles A can be discharged from the valve chamber 340 effectively before the bubbles A are accumulated excessively, through the cleaning operation performed in correspondence with the activation time and the deactivation time of the printer 301. Accordingly, the printer 301 is allowed to stop the bubbles A from entering the recording head 308 further reliably, and the printing is performed in a further optimal state. Also, by performing the cleaning operation selectively in accordance with the choke cleaning mode or the normal cleaning mode, the printer 301 is allowed to save the ink consumption, as compared to the case where cleaning is carried out exclusively in accordance with the choke cleaning.

Eighth Embodiment

An eighth embodiment of the present invention will be explained with reference to FIGS. 49 and 50.

Figure 49:
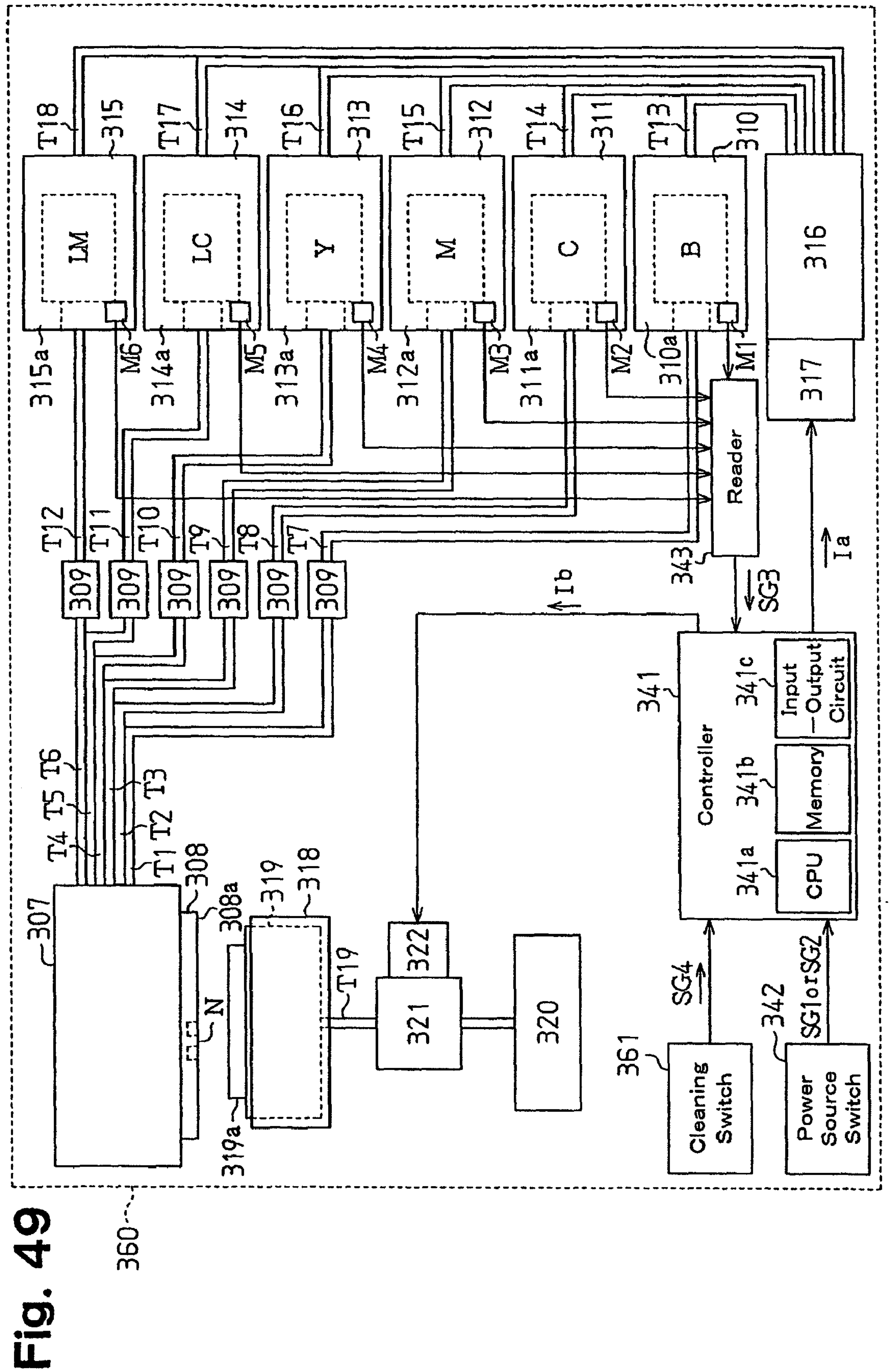
FIG. 49 is a block diagram for explaining the configuration of a printer according to an eighth embodiment.
Figure 50:
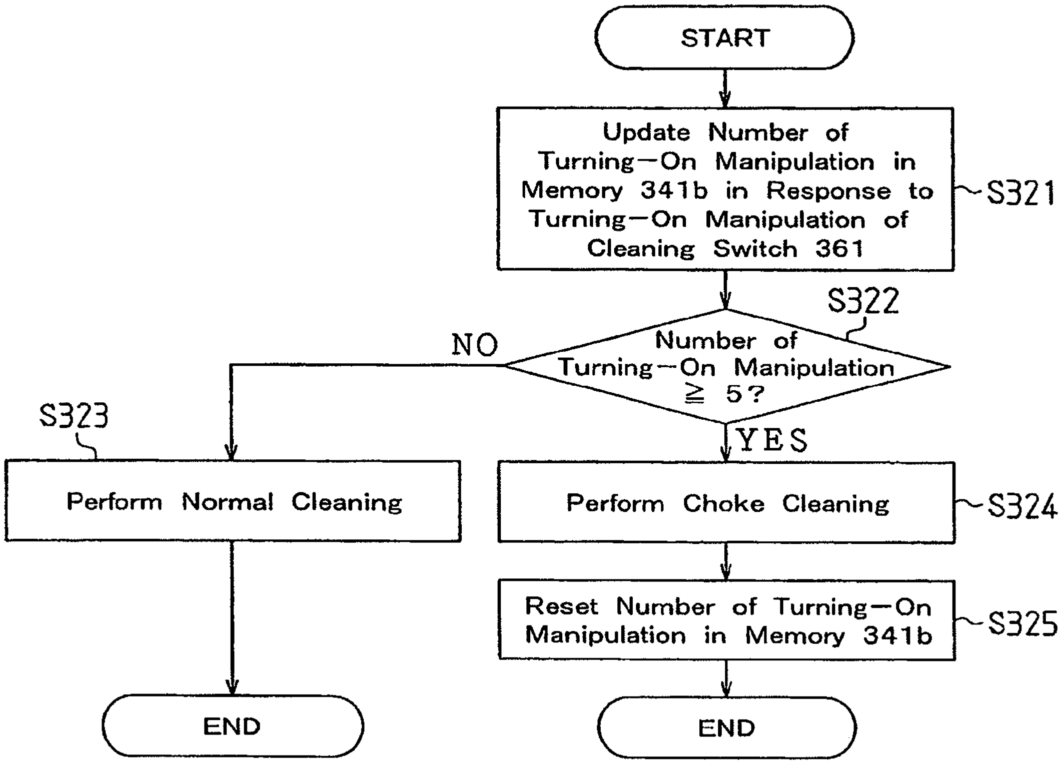
FIG. 50 is a flowchart for explaining the operation of a CPU of the eighth embodiment.
Figure 51A:
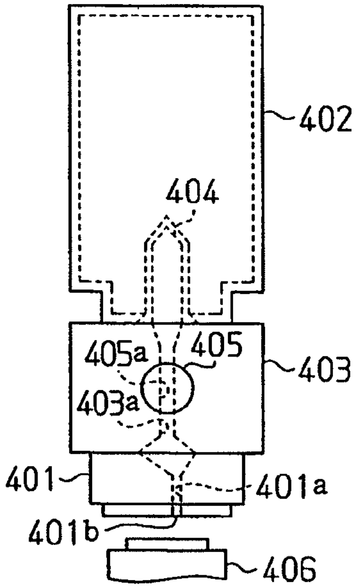
Fig. 51(a) (Prior Art)
FIG. 51(*a*) is a front view for explaining a conventional valve device.
Figure 51B:
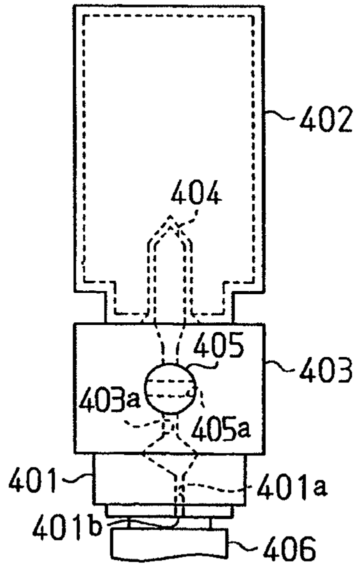
Fig. 51(b) (Prior Art)

As shown in FIG. 49, a printer 360 of the eighth embodiment is characterized in that the printer 301 of the fifth embodiment is further provided with a cleaning switch 361. The following description thus focuses on the difference between the eighth embodiment and the sixth embodiment. Same or like reference numerals are given to parts of the eighth embodiment that are the same as or like corresponding parts of the sixth embodiment and explanation thereof will be omitted.

The cleaning switch 361 is electrically connected to the CPU 341*a* of the controller 341 through the input-output circuit 341*c*. When the cleaning switch 361 is turned on by the user, a cleaning signal SG4 is sent from the cleaning switch 361 to the CPU 341*a*. In response to the cleaning signal SG4, the CPU 341*a* performs the cleaning operation in accordance with the cleaning control program stored in the memory 341*b*. The CPU 341*a* then stores the number of turning-on manipulation of the cleaning switch 361 in the memory 341*b*. In accordance with the stored number of turning-on manipulation, the CPU 341*a* determines whether or not the bubbles A in the valve chamber 340 are likely to flow to the recording head 308. Based on the determination, the CPU 341*b* selects between the normal cleaning mode and the choke cleaning mode and operates the printer 360 to perform the cleaning operation accordingly.

The operation of the CPU 341*a* for operating the printer 360 to perform the cleaning operation will now be described with reference to FIG. 50.

When the power source switch 342 of the printer 360 is turned on by the user, the turning-on signal SG1 is sent from the power source switch 342 to the CPU 341*a*. In response to the turning-on signal SG1, the CPU 341*a* activates the printer 360.

When the cleaning switch 361 is turned on by the user, the cleaning signal SG4 is sent from the cleaning switch 361 to the CPU 341*a*. In response to the cleaning signal SG4, the CPU 341*a* adds "1" to the number of turning-on manipulation stored in the memory 341*b*, thus updating the number (in step S321).

The controller 341 then determines whether or not the updated number of turning-on manipulation is equal to or greater than five, for detecting the extent of accumulation of the bubbles A in the valve chamber 340 (in step S322). If the number of turning-on manipulation is less than five (NO in step S322), the CPU 341*a* determines that the bubbles A in the valve chamber 340 are unlikely to flow to the recording head 308. The CPU 341*a* thus operates the printer 360 to perform the cleaning operation in accordance with the normal cleaning mode (in step S323). When the operation in accordance with the normal cleaning mode is completed, the CPU 341*a* carries out printing in accordance with the printing program.

In contrast, if the CPU 341*a* determines that the number of turning-on manipulation is five or greater (YES in step S322), the CPU 341*a* determines that the bubbles A in the valve chamber 340 are likely to flow to the recording head 308. The CPU 341*a* thus operates the printer 360 to perform the cleaning operation in accordance with the choke cleaning mode (in step S324: discharge operation). Further, the CPU 341*a* resets the number of turning-on manipulation stored in the memory 341*b* to "zero" (in step S325). The CPU 341*a* then performs printing in accordance with the printing program.

The eighth embodiment has the following advantages.

(4) In the eighth embodiment, the printer 360 is configured by adding the cleaning switch 361 to the printer 301 of the sixth embodiment. This configuration allows the user to operate the printer 360 to perform cleaning when desired. Thus, when the printer 360 causes a printing problem such as missing dots in a printing medium, the user may turn on the cleaning switch 361 and enables the printer 360 to perform cleaning. The printing problem is thus quickly solved.

(5) In the eighth embodiment, the cleaning mode is selected in step S322 in accordance with a certain condition, or determination whether or not the number of turning-on manipulation of the cleaning switch 361 becomes equal to or greater than five. That is, if the number of turning-on manipulation becomes five, the CPU 341*a* determines that the bubbles A in the valve chamber 340 are likely to flow to the recording head 308. The printer 360 is thus operated to perform the cleaning operation in accordance with the choke cleaning mode. Accordingly, if a printing problem such as missing dots is caused by the bubbles A entering the recording head 308 but not solved by the cleaning operation according to the normal cleaning mode, the cleaning switch 361 may be turned on repeatedly. In this manner, the printer 360 is allowed to perform the cleaning operation in accordance with the choke cleaning mode, thus solving the problem.

Further, as has been described, the bubbles A in the valve chamber 340 cannot be discharged from the valve chamber 340 by the cleaning operation in accordance with the normal cleaning mode. However, by operating the cleaning operation in accordance with the choke cleaning mode after the cleaning switch 361 has been turned on five times, the bubbles A can be removed from the valve chamber 340. The bubbles A are thus prevented from being accumulated excessively.

The present invention is not restricted to the illustrated embodiments but may be embodied in the following forms.

In the sixth embodiment, the condition for selecting between the normal cleaning mode and the choke cleaning mode in step S304 (see FIG. 46) is the determination whether or not the number of replacement is equal to or greater than four. However, the number of the condition is not restricted to this number but may be changed as necessary, depending on any structural modification of the printer 301.

In the sixth embodiment, the projection 335 has a truncated cone-like shape. However, the shape of the projection 335 is not restricted to this but may be modified as needed. For example, the projection 335 may be formed in a columnar shape.

In the seventh embodiment, the activation time indicated by the first time axis 351 and the deactivation time indicated by the second time axis 352 in the map data 350 may be changed as needed. For example, the first time axis 351 may indicate the total of the actual printing time in which the printer 301 has performed actual printing and the second time axis 352 may indicate the deactivation time. In operation, the controller 341 (the CPU 341*a*) refers to this modified map data 350.

In the eighth embodiment, the condition for selecting between the normal cleaning mode and the choke cleaning mode in step S322 (see FIG. 50) is the determination whether or not the number of turning-on manipulation is equal to or greater than five. However, the number of the condition is not restricted to this number but may be changed as necessary, depending on any structural modification of the printer 360.

In the sixth to eighth embodiments, the first to sixth ink cartridges 310 to 315 are connected to the corresponding choke valves 309 through the associated tubes T7 to T12. However, a check valve may be provided in each of the tubes T7 to T12 for permitting the ink flow exclusively from the associated ink cartridge 310 to 315 to the corresponding choke valve 309. This structure suppresses ink leakage from the corresponding tubes T7 to T12 when any of the ink cartridges 310 to 315 is replaced.

In each of the sixth to eighth embodiments, the liquid ejection apparatus is embodied as the printer 301 or the printer 360. However, the present invention may be applied to other types of liquid ejection apparatuses ejecting different types of liquid. These apparatuses include, for example, liquid ejection apparatuses ejecting electrode material or color material used in the fabrication of liquid crystal displays or EL displays or surface emitting displays, liquid ejection apparatuses ejecting bioorganic substances used in the fabrication of biochips, and sample ejection apparatuses as precision pipettes. If the present invention is applied to any one of these apparatuses, it is desirable that the configuration of each choke valve 309 is modified as needed.

What is claimed is:

1. A liquid ejection apparatus comprising:

a liquid reservoir for retaining liquid, wherein the liquid reservoir includes an accommodation casing and a liquid reservoir bag accommodated in the casing;

a liquid ejection head for ejecting the liquid retained in the liquid reservoir;

a valve arranged between the liquid reservoir and the liquid ejection head; and a capping member for sealing the liquid ejection head;

negative pressure generating means for applying negative pressure to the liquid ejection head through the capping member; and pressurizing means for pressurizing the liquid reservoir bag in the accommodation casing, the liquid in the liquid reservoir bag being supplied to the liquid ejection head through the valve through pressurization of the liquid reservoir bag by the pressurizing means;

wherein the valve includes:

a valve housing having a recess defined in an upper surface of the valve housing, the recess including a bottom;

a film for sealing the recess of the valve housing, a liquid reservoir chamber being defined by the recess and the film;

a projection projecting from the bottom of the recess, the projection having an upper surface opposed to the film, the upper surface of the projection being located lower than the upper surface of the valve housing, wherein the projection is a non-moving member;

a first passage extending through the bottom of the recess for introducing a liquid into the liquid reservoir chamber; and a second passage extending through the projection and having an opening at the upper surface of the projection, the second passage sending the liquid out from the liquid reservoir chamber;

wherein the second passage is selectively opened or closed with respect to the liquid reservoir chamber by separating the film from the upper surface of the projection or bringing the film into contact with the upper surface of the projection without movement of the projection, wherein the second passage is closed by the film while maintaining the nozzle surface under the negative pressure by the negative pressure generating means with the liquid reservoir bag held in a non-pressurized state, and wherein the film is separated from the upper surface of the projection by pressurizing the liquid reservoir bag by the pressurizing means and thus introducing the liquid into the liquid reservoir chamber, thereby opening the second passage.

2. The liquid ejection apparatus according to claim 1, further comprising an annular deposit portion projecting from the upper surface of the hosing, the annular deposit portion being formed along an opening end of the recess.

* * * * *